US010123022B2

(12) United States Patent
Kaya et al.

(10) Patent No.: US 10,123,022 B2
(45) Date of Patent: Nov. 6, 2018

(54) PICTURE ENCODING DEVICE, PICTURE DECODING DEVICE, AND PICTURE COMMUNICATION SYSTEM

(71) Applicant: RENESAS ELECTRONICS CORPORATION, Kawasaki-shi (JP)

(72) Inventors: Toshiyuki Kaya, Kawasaki (JP); Seiji Mochizuki, Kawasaki (JP); Tetsuya Shibayama, Kawasaki (JP); Kenichi Iwata, Kawasaki (JP); Hiroshi Ueda, Kawasaki (JP); Ren Imaoka, Kawasaki (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 240 days.

(21) Appl. No.: 14/749,505

(22) Filed: Jun. 24, 2015

(65) Prior Publication Data

US 2016/0007025 A1 Jan. 7, 2016

(30) Foreign Application Priority Data

Jul. 7, 2014 (JP) ................................. 2014-139488

(51) Int. Cl.
*H04N 19/12* (2014.01)
*H04N 19/159* (2014.01)
(Continued)

(52) U.S. Cl.
CPC ........... *H04N 19/159* (2014.11); *H04N 19/12* (2014.11); *H04N 19/176* (2014.11);
(Continued)

(58) Field of Classification Search
CPC .................................................... H04N 19/159
(Continued)

(56) References Cited

U.S. PATENT DOCUMENTS 5,767,898 A * 6/1998 Urano ..................... G06T 9/007
348/43
2001/0053183 A1* 12/2001 McVeigh ............. H04N 19/105
375/240.16
(Continued)

FOREIGN PATENT DOCUMENTS

JP 2009-111797 A 5/2009
JP 2009-267689 A 11/2009
(Continued)

OTHER PUBLICATIONS

European Search Report dated Dec. 4, 2015.
(Continued)

*Primary Examiner* — Christopher S Kelley
*Assistant Examiner* — Asmamaw G Tarko
(74) *Attorney, Agent, or Firm* — McGinn I. P. Law Group, PPLC

(57) ABSTRACT

In a picture encoding device and a picture decoding device, the access to a reference frame memory is suppressed. The picture encoding device is comprised of a first encoder for intra picture encoding, a second encoder for inter picture encoding, and an intermediate buffer. A local decoded picture generated by the first encoder is stored as a reference picture in the intermediate buffer, and the inter picture encoding by the second encoder is performed by referring to the local decoded picture in the intermediate buffer. A picture decoding device is comprised of a first decoder for intra picture decoding, a second decoder for inter picture decoding, and an intermediate buffer. A local decoded picture generated by the first decoder is stored as a reference picture in the intermediate buffer, and the inter picture decoding by the second decoder is performed by referring the local decoded picture in the intermediate buffer.

13 Claims, 57 Drawing Sheets

(51) Int. Cl.
 H04N 19/176 (2014.01)
 H04N 19/433 (2014.01)
 H04N 19/436 (2014.01)
 H04N 19/597 (2014.01)
 H04N 19/105 (2014.01)
 H04N 19/16 (2014.01)

(52) U.S. Cl.
 CPC ......... H04N 19/433 (2014.11); H04N 19/436 (2014.11); *H04N 19/105* (2014.11); *H04N 19/16* (2014.11); *H04N 19/597* (2014.11)

(58) Field of Classification Search
 USPC .................................................. 375/240.13
 See application file for complete search history.

(56) References Cited

U.S. PATENT DOCUMENTS

| | | | | |
|---|---|---|---|---|
| 2002/0057740 A1* | 5/2002 | Yamada | ................ | H04N 19/61 375/240.12 |
| 2004/0247032 A1 | 12/2004 | Aihara et al. | | |
| 2007/0274393 A1* | 11/2007 | Toma | ................ | G11B 27/3027 375/240.23 |
| 2008/0056603 A1* | 3/2008 | Xue | ................ | H04N 19/44 382/268 |
| 2008/0212684 A1* | 9/2008 | Valente | ................ | H04N 19/51 375/240.24 |
| 2010/0040348 A1* | 2/2010 | Toma | ................ | G11B 27/322 386/248 |
| 2010/0156917 A1* | 6/2010 | Lee | ................ | H04N 19/423 345/543 |
| 2010/0316123 A1* | 12/2010 | Inokuma | ................ | H04N 19/51 375/240.12 |
| 2011/0311152 A1* | 12/2011 | Takahashi | ................ | H04N 19/159 382/236 |
| 2015/0312578 A1 | 10/2015 | Sato | | |

FOREIGN PATENT DOCUMENTS

| | | |
|---|---|---|
| JP | 2009-290387 A | 12/2009 |
| JP | 2012-009934 A | 1/2012 |
| JP | 2012-175332 A | 9/2012 |
| WO | WO 2004/012460 A1 | 2/2004 |
| WO | WO 2014/103763 A1 | 7/2014 |

OTHER PUBLICATIONS

European Communication pursuant to Article 94(3) EPC, dated Apr. 28, 2017.

Pin Tao, et al.: "Intra Prediction Using Localized Horizontal Spatial Prediction (LATE)", No. JCTVC-B117, Jul. 24, 2010 (Jul. 24, 2010), XP030007695.

Japanese Office Action, dated Mar. 13, 2018, in Japanese Application No. 2014-139488 and English Translation thereof.

* cited by examiner

ONE PIXEL LINE

FIG. 23
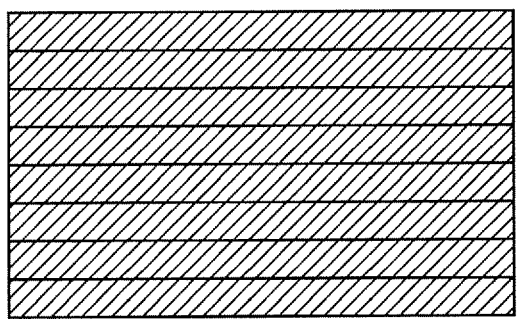
FIRST FIELD
(BOTTOM FIELD)
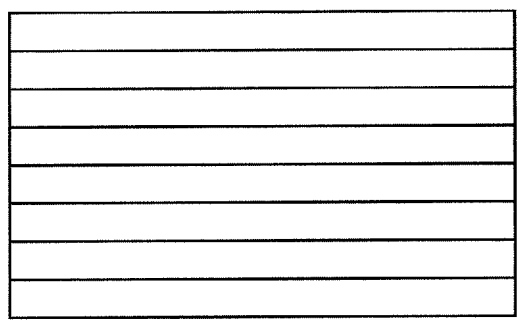
SECOND FIELD
(TOP FIELD)

FIG. 35
FIRST PICTURE
(LEFT COLUMN PICTURE)
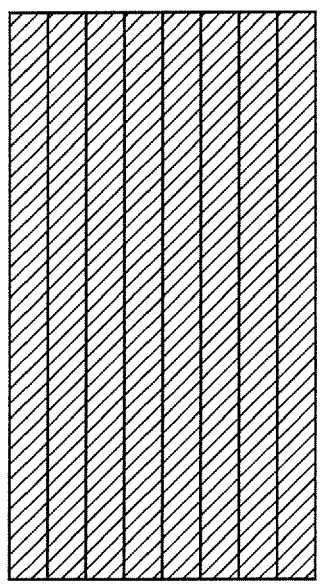
SECOND PICTURE
(RIGHT COLUMN PICTURE)
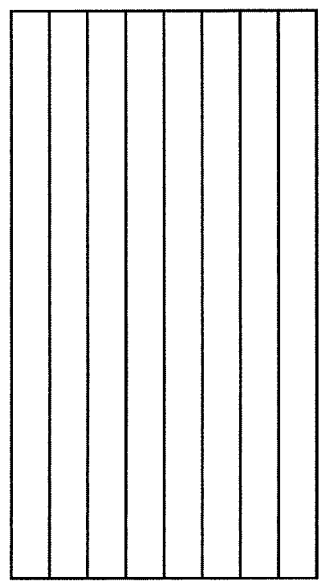

PICTURE ENCODING DEVICE, PICTURE DECODING DEVICE, AND PICTURE COMMUNICATION SYSTEM

CROSS-REFERENCE TO RELATED APPLICATIONS

The disclosure of Japanese Patent Application No. 2014-139488 filed on Jul. 7, 2014 including the specification, drawings and abstract is incorporated herein by reference in its entirety.

BACKGROUND

The present invention relates to a picture encoding device, a picture decoding device, and a picture communication system, and is suitably applicable to picture encoding and picture decoding with low delay at low cost.

Pictures have a huge amount of information; however, there is a strong correlation between pictures closely located within the same frame or between pictures located in the same coordinates in adjacent frames. Accordingly, this correlation is used for compression of the amount of code. For example, as typical international standards, the compression encoding and decoding methods of moving pictures are standardized, such as MPEG-2 (ITU-T Rec. H.262|ISO/IEC 13818-2), MPEG-4 (ISO/IEC 14496-2), and H.264 (ITU-T Rec. H.264|ISO/IEC 14496-10). According to these coding methods, in the intra frame coding, an original picture is orthogonal-transformed, and the result is quantized, variable-length-encoded, and transmitted. On the other hand, inverse quantization and inverse orthogonal transformation are performed to create a reference picture, and the reference picture are stored in a reference frame memory in preparation to be used for subsequent inter frame coding. In the inter frame coding, a subtraction is calculated between the original picture of an inputted frame as an encoding target and the reference picture of a frame in the past, or in the future in some cases, stored in the reference frame memory, and the subtraction result is encoded. A picture encoded using the picture information of only the frame as an encoding target is called an "I picture", a picture encoded using the picture information of the past frame in addition to the picture information of the present frame as an encoding target is called a "P picture", and a picture encoded also using the picture information of the frame of the future is called a "B picture." Various encoding and decoding methods which combine an I picture, a P picture, and also a B picture are adopted. The compression efficiency of an I picture is lower than others, however, the I picture is certainly necessary as a starting point of other inter frame coding in order to complete encoding and decoding with the picture information of the frame alone. In order to improve encoding efficiency, one I picture is combined with one or more P pictures and also one or more B pictures.

Patent Document 1 discloses an encoding device (a picture encoding device) which can reduce the frequency of access to a reference memory to store reference pictures. As illustrated in FIG. 1 of the Patent Document 1, the encoding device 100 is comprised of a motion compensation unit 003 and a frequency conversion unit 004. The motion compensation unit 003 is coupled to the reference memory 010 via an intermediate memory 009. The encoding device 100 reads, from the reference memory 010, the information of the reference frame which the motion compensation unit 003 uses in the encoding, and stores it in the intermediate memory 009. The reference memory 010 is arranged in a common use SDRAM (Synchronous Dynamic Random Access Memory) in the system, and the intermediate memory 009 is arranged as a dedicated memory of the encoding device 100. Compared with the case where the intermediate memory 009 is not arranged, the present configuration can reduce the frequency of access to the reference memory 010. For example, as illustrated in FIG. 3 of Patent Document 1, when P5 (a fifth inputted frame to be encoded as a P picture) is encoded, I2 in the reference memory 010 is once read and stored in the intermediate memory 009, and is used for the encoding of P5. When B3 and B4 are encoded, I2 and P5 in the reference memory 010 are stored in the intermediate memory 009, and are used for the encoding of both B3 and B4 simultaneously. Originally it is necessary to read I2 and P5 from the reference memory 010 when encoding B3, and it is necessary to read I2 and P5 again when encoding B4. However, when B3 and B4 refer to the same region of the same frame (I2 and P5 in the present case), it is possible to use the same data by encoding B3 and B4 simultaneously; accordingly, it is possible to reduce the access to the reference memory 010 which is otherwise necessary in the encoding of B4.

Patent Document 2 discloses a picture encoding device and a picture decoding device which can reduce the encoding arithmetic amount and the decoding arithmetic amount, suppressing deterioration in the encoding efficiency. An input picture is divided into blocks of size n×m. Furthermore each block is divided into K sub-blocks of size n1×m1. A divided picture Pk (k=1–K) is created by collecting sub-blocks in the same position in a block. The divided picture P0 is intra-picture-encoded and the divided pictures P1-PK are inter-picture-encoded. The reference picture of the sub-block Bk of Pk is created from the sub-block B0 of the surrounding P0 with a filter specified by the relative position of the pixel. Accordingly, it is possible to suppress the coding arithmetic amount to a smaller value than in the intra picture prediction coding in the past.

(Patent Document 1) Japanese Unexamined Patent Application Publication No. 2009-111797
(Patent Document 2) Japanese Unexamined Patent Application Publication No. 2012-175332

SUMMARY

As a result of the examination of Patent Documents 1 and 2 by the present inventors, it turned out that there are new issues as follows.

Patent Document 1 discloses the picture encoding device which can reduce the frequency of access to the reference memory 010. However, it turned out that it is difficult to reduce the access to the reference memory 010 to zero for example, at the time of encoding of a B frame; accordingly the effect of reducing the memory access is not enough.

The following will explain a solution to such an issue. The other issues and new features of the present invention will become clear from the description of the present specification and the accompanying drawings.

One embodiment according to the present application goes as follow.

A picture encoding device which encodes plural time-series pictures is comprised of an intra picture encoder, an inter picture encoder, and an intermediate buffer. A local decoded picture created by the intra picture encoder is stored as a reference picture in the intermediate buffer. The inter picture encoding which refers to the local decoded picture is performed while the local decoded picture concerned is stored in the intermediate buffer. When the local decoded picture concerned does not need to be referred to any more after that, the reference frame memory for storing the local decoded picture is omitted. Similarly, a picture decoding device is comprised of an intra picture decoder, an inter picture decoder, and an intermediate buffer. A local decoded picture created by the intra picture decoder is stored as a reference picture in the intermediate buffer. The inter picture decoding which refers to the local decoded picture is performed while the local decoded picture concerned is stored in the intermediate buffer. When the local decoded picture concerned does not need to be referred to anymore after that, the reference frame memory for storing the local decoded picture is omitted.

The effect obtained by one embodiment described above is explained briefly as follows.

That is, the frequency of access to the reference frame memory is suppressed to a low level, and in some cases, it is possible to adopt the configuration in which the reference frame memory is omitted.

BRIEF DESCRIPTION OF THE DRAWINGS

FIG. 23 is an explanatory drawing illustrating a field structure (bottom field first) of a picture;

FIG. 35 is an explanatory drawing (a vertically divided right and left column picture) illustrating vertical division of a picture;

FIG. 51 is a block diagram illustrating an example of the entire configuration of a picture decoding device according to Embodiment 8a;

FIG. 52 is a block diagram illustrating a configuration example of the picture decoding device according to Embodiment 8a;

DETAILED DESCRIPTION

1. Outline of Embodiment

Figure 1:
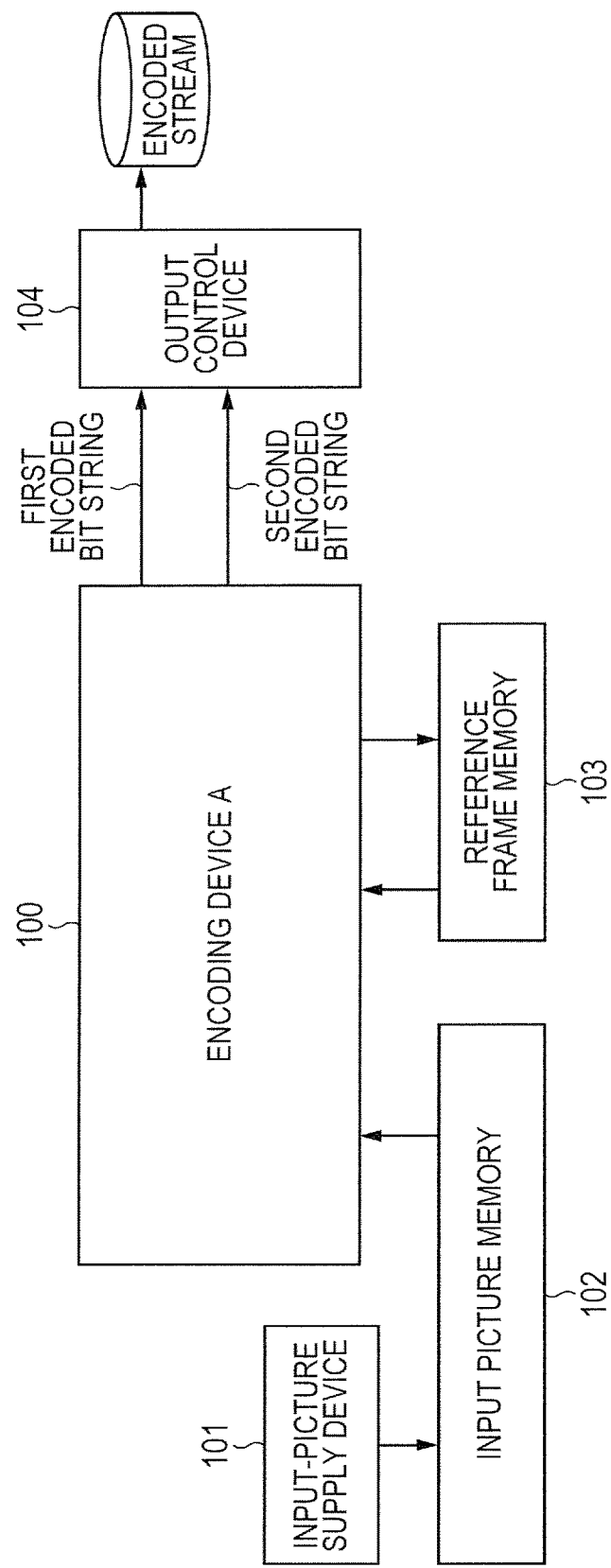
FIG. 1 is a block diagram illustrating an example of the entire configuration of a picture encoding device according to Embodiment 1.

First, an outline of a typical embodiment disclosed in the present application is explained. A numerical symbol of the drawing referred to in parentheses in the outline explanation about the typical embodiment only illustrates what is included in the concept of the component to which the numerical symbol is attached.

(1) <A First (Intra Picture) Encoder+ a Second (Inter Picture) Encoder+ an Intermediate Buffer>

The typical embodiment disclosed in the present application is a picture encoding device (100-700) which encodes plural time-series pictures. The picture encoding device is comprised of a first encoder (an intra picture encoder 001), a second encoder (an inter picture encoder 002), an intermediate buffer (005, 006), and an encoding target picture controller (003, 004, 007).

The first encoder uses picture information in a picture of an encoding target to encode the picture information of the picture concerned, creates a reference picture from the encoding result, and writes the reference picture in the intermediate buffer.

The second encoder refers to picture information in a picture of an encoding target and the reference picture stored in the intermediate buffer to encode the picture information of the picture concerned.

The encoding target picture controller makes the second encoder start encoding the picture with reference to the reference picture concerned, before the following reference picture is written in the intermediate buffer by the first encoder.

According to this configuration, it is possible to keep the access to the reference frame memory (103) at a minimum, and in another embodiment, it is possible to omit the reference frame memory.

(2) <Field Division (Embodiment 4)>

In Paragraph 1, each of the time-series pictures is a frame composed of plural pixel lines, and the frame includes a first field composed only of even-numbered pixel lines and a second field composed only of odd-numbered pixel lines.

The encoding target picture controller (043, 044) supplies the first field and the second field to the first encoder (040) and the second encoder (041), respectively.

The first encoder uses picture information in a field of an encoding target to encode the picture information of the picture concerned, and creates a reference picture from the encoding result, and writes the reference picture in the intermediate buffer (045).

The second encoder refers to picture information in a field of an encoding target and the reference picture stored in the intermediate buffer to encode the picture information of the field concerned.

According to this configuration, it is possible to omit the reference frame memory (103).

(3) <Field Division in a Smaller Unit (Embodiment 5)>

In Paragraph 1, each of the time-series pictures is a frame composed of plural pixel lines, and the frame is composed of plural macroblocks. Each of the plural time-series pictures includes a first field composed only of even-numbered pixel lines included in two macroblocks which adjoin mutually in an orthogonal direction to a pixel line among the macroblocks and a second field composed only of odd-numbered pixel lines included in the two macroblocks concerned.

The encoding target picture controller (053, 054) supplies one of the first field and the second field to the first encoder (050) and the other to the second encoder (051).

The first encoder refers to picture information in a field of an encoding target to encode the picture information of the picture concerned, creates a reference picture from the encoding result, and writes the reference picture in the intermediate buffer (052).

The second encoder refers to picture information in a field of an encoding target and the reference picture stored in the intermediate buffer to encode the picture information of the field concerned.

According to this configuration, it is possible to compose the intermediate buffer (052) with a memory element of smaller storage capacity, and at the same time it is possible to suppress the delaying amount of the encoding to a low level.

(4) <Change of Reference Direction (Embodiment 5b)>

In Paragraph 3, the encoding target picture controller (053, 058, 059) supplies selectively one of the first field and the second field to the first encoder (050) and the other to the second encoder (051), by making the selection for every two macroblocks concerned.

According to this configuration, it is possible to suitably choose the reference direction with higher encoding efficiency.

(5) <Division in a Vertical Direction (Embodiment 6)>

In Paragraph 1, each of the plural time-series pictures is a frame including plural pixel lines, each composed of plural pixels, and the frame is composed of plural macroblocks. Each of the plural time-series pictures includes a first column picture composed of only even-numbered pixels of each pixel line included in two macroblocks adjoining mutually in the extension direction of the pixel line among the macroblocks and a second column picture composed of only odd-numbered pixels of each pixel line included in the two macroblocks concerned.

The encoding target picture controller (063, 064) supplies one of the first column picture and the second column picture to the first encoder (060), and the other to the second encoder (061).

The first encoder refers to picture information in a column picture of an encoding target to encode the picture information of the picture concerned, creates a reference picture from the encoding result, and writes the reference picture in the intermediate buffer (065).

The second encoder refers to picture information in a column picture of an encoding target and the reference picture stored in the intermediate buffer to encode the picture information of the column picture concerned.

According to this configuration, it is possible to compose the intermediate buffer (065) with a memory element of smaller storage capacity, and at the same time it is possible to suppress the delaying amount of the encoding to a still lower level than in Paragraph 3.

(6) <Change of Reference Direction>

In Paragraph 5, the encoding target picture controller (063, 064, 068) supplies selectively one of the first column picture and the second column picture and the other to the second encoder, by making the selection for every two macroblocks concerned.

According to this configuration, it is possible to suitably choose the reference direction with higher encoding efficiency.

(7) <An I Encoder+ a P Encoder+ an Intermediate Buffer (Embodiment 3)>

In Paragraph 1, the first encoder is an I-picture encoder (030) and the second encoder is a P-picture encoder (031), and the encoding target picture controller (033, 034) supplies two consecutive pictures to the first encoder and the second encoder and makes the encoders perform encoding in parallel.

According to this configuration, in the picture encoding device which creates an encoded stream including an I picture and a P picture alternately, it is possible to omit the reference frame memory.

(8) <A Position Control Circuit (Embodiment 3)>

In Paragraph 7, each of the plural time-series pictures includes plural macroblocks.

The first encoder (030) performs the encoding for every macroblock, creates a reference picture from the encoding result, and writes the reference picture in the intermediate buffer (035). The second encoder (031) refers to the reference picture of the macroblock within a prescribed range among the reference pictures to perform the encoding.

The encoding target picture controller (032) makes the second encoder (031) start the encoding after the completion of the writing of the reference picture of the macroblock within the prescribed range, from the first encoder (030) to the intermediate buffer (035).

According to this configuration, the latency time with which the P-picture encoder starts the encoding can be suppressed to necessary minimum; accordingly, it is possible to provide an picture encoding device with low delay as a whole.

(9) <An I Encoder+ a P Encoder+ a B Encoder+ an Intermediate Buffer (Embodiment 2)>

In Paragraph 1, the first encoder is an I-picture encoder (020) and the second encoder includes a P-picture encoder (021) and a B-picture encoder (022). The intermediate buffer operates as a first intermediate buffer (025), and the picture encoding device (200) is further provided with a second intermediate buffer (026).

The I-picture encoder (020) encodes picture information of a first picture supplied, creates a first local decoded picture from the encoding result, and writes the first local decoded picture in the first intermediate buffer (025).

The P-picture encoder (021) refers to picture information in a second picture supplied and the first local decoded picture to encode the picture information of the second picture, creates a second local decoded picture from the encoding result, and writes the second local decoded picture in the second intermediate buffer (026).

The B-picture encoder (022) refers to picture information in a third picture supplied, the first local decoded picture, and the second local decoded picture, to encode the picture information of the third picture.

The encoding target picture controller (027) makes the P-picture encoder (021) start encoding the picture with reference to the reference picture concerned, before the following first local decoded picture is written in the first intermediate buffer (025) from the first I-picture encoder (020). The encoding target picture controller (028) makes the B-picture encoder (022) start encoding of the picture with reference to the reference picture concerned, before the following second local decoded picture is written in the second intermediate buffer (026) from the P-picture encoder (021).

According to this configuration, in the picture encoding device (200) which creates an encoded stream including an I picture and a P picture alternately, it is possible to omit the reference frame memory (103). At this time, the P picture refers to the local decoded picture of the I picture as a reference picture, and the B-picture refers to the local decoded picture of the I picture and the local decoded picture of the P picture as a reference picture. The encoding of the I picture, the P picture, and the B picture is performed in parallel. It is preferable to include plural B-picture encoders which refer to the local decoded picture of the same I picture and the local decoded picture of the P picture as a reference picture.

(10) <A Position Control Circuit (Embodiment 2)>

In Paragraph 9, each of the plural time-series pictures includes plural macroblocks.

The I-picture encoder (020) performs the encoding for every macroblock, creates a first local decoded picture from the encoding result, and writes the first local decoded picture in the first intermediate buffer (025).

The P-picture encoder (021) performs the encoding, referring to the reference picture of a macroblock within a prescribed range among the first local decoded pictures, creates a second local decoded picture from the encoding result, and writes the second local decoded picture in the second intermediate buffer (026).

The B-picture encoder (022) performs the encoding, referring to the reference picture of a macroblock within the prescribed range, out of the first local decoded picture and the second local decoded picture.

The encoding target picture controller (027) makes the P-picture encoder start the encoding after the completion of the writing of the first local decoded picture of the macroblock within the prescribed range, from the I-picture encoder to the first intermediate buffer. The encoding target picture controller (028) makes the B-picture encoder (022) start the encoding after the completion of the writing of the second local decoded picture of the macroblock within the prescribed range, from the P-picture encoder (021) to the second intermediate buffer (026).

According to this configuration, the latency time with which the P-picture encoder (021) and the B-picture encoder (022) start the encoding can be suppressed to a necessary minimum, and accordingly, it is possible to provide the picture encoding device (200) with low delay.

(11) <An I/P Encoder+ n B Encoders+2 Intermediate Buffers+ a Reference Memory (Embodiment 1)>

In Paragraph 1, the picture encoding device (100) further comprises the first encoder (001) operating as an I-picture encoder or a P-picture encoder; the second encoder (002) operating as a B-picture encoder; the intermediate buffer operating as a first intermediate buffer (006); a third intermediate buffer (005); and a reference memory (103) externally coupled.

When operating as the I-picture encoder, the first encoder (001) encodes picture information of a first picture supplied, creates a first local decoded picture from the encoding result, and writes the first local decoded picture in the first intermediate buffer (006) and the reference memory (103).

The encoding target picture controller reads the first local decoded picture from the reference memory (103) and stores it in the third intermediate buffer (005).

When operating as the P-picture encoder, the first encoder (001) refers to the first local decoded picture stored in the third intermediate buffer (005) to encode picture information of a second picture supplied, creates a second local decoded picture from the encoding result, and writes the second local decoded picture in the first intermediate buffer (006).

The B-picture encoder refers to the first local decoded picture and the second local decoded picture to encode the third picture supplied.

The encoding target picture controller (007) makes the B-picture encoder (002) start encoding of the picture with reference to the reference picture concerned, after the second local decoded picture is written from the first encoder (001) to the first intermediate buffer (006) and before the following first local decoded picture or the following second local decoded picture is written.

According to this configuration, it is possible to perform the encoding of the I picture and the encoding of the B picture, and the encoding of the P picture and the encoding of the B picture, respectively in parallel, and accordingly, it is possible to reduce the frequency of access to the reference memory (103). The local decoded picture of the I picture is once stored in the reference memory and read to the third intermediate buffer (005), referred to as a reference picture in the encoding of the P picture, and also referred to in parallel as a reference picture in the encoding of the B picture. The local decoded picture of the P picture is stored in the first intermediate buffer and referred to as a reference picture in the encoding of the B picture. In this way, the encoding of the I picture or the encoding of the P picture, and the encoding of the B-picture which refers to the local decoded picture of the same I picture or the local decoded picture of the P picture are performed in parallel. Accordingly, it is possible to suppress the number of read-out of the local decoded picture from the reference memory to a minimum.

(12) <A Position Control Circuit (Embodiment 1)>

In Paragraph 11, each of the time-series pictures is composed of plural macroblocks.

The first encoder (001) performs encoding for every macroblock, and when operating as the P-picture encoder, the first encoder creates a second local decoded picture from the encoding result and writes the second local decoded picture in the first intermediate buffer (006).

The B-picture encoder (002) refers to the reference picture of the macroblock within the respectively prescribed range, out of the first local decoded picture and the second local decoded picture, to perform the encoding.

The encoding target picture controller (007) makes the B-picture encoder (002) start the encoding after the completion of the writing of the second local decoded picture of the macroblock within the prescribed range, from the first encoder (001) to the first intermediate buffer (006).

According to this configuration, the latency time with which the B-picture encoder (002) starts the encoding can be suppressed to necessary minimum; accordingly, it is possible to provide the picture encoding device (100) with low delay.

(13) <Multi-View Coding (Embodiment 7)>

In Paragraph 1, the time-series pictures include plural time-series pictures respectively seen from multi-view points, and a time-series picture seen from one viewpoint is defined as a main picture and a time-series picture seen from another viewpoint is defined as a sub picture.

The first encoder (071) sets the main picture as an encoding target, refers to picture information in the main picture of the encoding target to encode the picture information of the main picture concerned, creates a reference picture from the encoding result, and writes the reference picture in the intermediate buffer (076).

The second encoder (072) sets the sub picture temporally corresponding to the main picture as an encoding target, and refers to picture information in the sub picture of the encoding target and the reference picture stored in the intermediate buffer, to encode the picture information of the sub picture concerned.

According to this configuration, in the picture encoding device (700) which performs the multi-view coding, it is possible to omit the reference memory (103).

(14) <Multi-View Coding=an I/P Encoder for a Main Picture+ a B Encoder for a Sub Picture+ a First and a Third Intermediate Buffer+ a Reference Frame Memory (Embodiment 7)>

In Paragraph 1, the time-series pictures include plural time-series pictures respectively seen from multi-view points, a time-series picture seen from one viewpoint is defined as a main picture and a time-series picture seen from another viewpoint is defined as a sub picture. The picture encoding device is further comprised of the first encoder (071-1) operating as a base view encoder; the second encoder (071-2) operating as an inter-view encoder; the intermediate buffer operating as a first intermediate buffer (076-1); a third intermediate buffer (075); and a reference memory (103) externally coupled.

The first encoder (071-1) encodes picture information of a first main picture supplied, creates a first local decoded picture from the encoding result, and writes the first local decoded picture in the first intermediate buffer (076-1) and the reference memory (103).

The encoding target picture controller reads the first local decoded picture from the reference memory (103) and stores it in the third intermediate buffer (075).

When encoding a second main picture next to the first main picture, the first encoder (071-1) refers to the first local decoded picture stored in the third intermediate buffer to encode picture information of the second main picture supplied, creates a second local decoded picture from the encoding result, and writes the second local decoded picture in the first intermediate buffer (076-1).

The second encoder (071-2) refers to the second local decoded picture to encode picture information of a first sub picture corresponding to the first main picture supplied.

The encoding target picture controller (077-2) makes the second encoder (071-2) start encoding of the picture with reference to the reference picture concerned, after the second local decoded picture is written from the first encoder to the first intermediate buffer (076-2) and before the following local decoded picture is written.

According to this configuration, it is possible to perform the I-picture encoding of the main picture and the B-picture encoding of the following main picture, and the inter-view encoding of the sub picture and the inter-view encoding of the following sub picture, respectively in parallel; accordingly, it is possible to reduce the frequency of access to the reference memory (103), as in the case with Paragraph 11.

(15) <A First (Intra Picture) Decoder+ a Second (Inter Picture) Decoder+ an Intermediate Buffer>

The typical embodiment disclosed in the present application is a picture decoding device (800, 810) which decodes plural time-series pictures from a first and a second encoded stream supplied. The picture decoding device is comprised of a first decoder (intra picture decoder 081); a second decoder (inter picture decoder 082); an intermediate buffer (086); and a decoding target image controller (083, 084, 087).

The first decoder (081) refers to the first encoded stream to decode picture information of a picture corresponding to the first encoded stream, creates a reference picture from the decoding result, and writes the reference picture to the intermediate buffer (086).

The second decoder (082) refers to the second encoded stream and the reference picture stored in the intermediate buffer to decode picture information of a picture corresponding to the second encoded stream.

The decoding target image controller (087) makes the second decoder start decoding a picture with reference to the reference picture concerned, before the following reference picture is written in the intermediate buffer from the first decoder.

According to this configuration, in the picture decoding device, it is possible to keep the access to the reference memory (803) to a minimum. In another embodiment, it is possible to omit the reference memory.

(16) <An I Decoder+ a P Decoder+ an Intermediate Buffer (Embodiment 8b)>

In Paragraph 15, the first decoder is an I-picture decoder (088), and the second decoder is a P-picture decoder (089).

The decoding target image controller (083, 084) supplies a first encoded stream and a second encoded stream, corresponding to two consecutive pictures, to the first decoder (088) and the second decoder (089), respectively, and makes the two decoders perform decoding in parallel.

According to this configuration, in the picture decoding device which decodes an encoded stream including an I picture and a P picture alternately, it is possible to omit the reference memory.

(17) <An I/P Decoder+ n B Decoders+2 Intermediate Buffers+ an Reference Memory (Embodiment 8a)>

In Paragraph 15, the picture decoding device (800) is further comprised of the first decoder (081) operating as an I-picture decoder or a P-picture decoder; the second decoder (082) operating as a B-picture decoder; the intermediate buffer operating as a first intermediate buffer (086); a third intermediate buffer (085); and a reference memory (803) externally coupled.

When operating as the I-picture decoder, the first decoder (081) decodes an encoded stream corresponding to a first picture, creates a first local decoded picture from the decoding result concerned, and writes the first local decoded picture in the first intermediate buffer (086) and the reference memory (803).

The decoding target image controller reads the first local decoded picture from the reference memory (803) and stores it in the third intermediate buffer (085).

When operating as the P-picture decoder, the first decoder (081) refers to the first local decoded picture stored in the third intermediate buffer (085) to decode an encoded stream corresponding to a second picture, creates a second local decoded picture from the decoding result concerned, and writes the second local decoded picture in the first intermediate buffer (086).

The B picture decoder (082) refers to the first local decoded picture and the second local decoded picture to decode an encoded stream corresponding to a third picture supplied.

The decoding target image controller (087) makes the B-picture decoder (082) start decoding of a picture with reference to the reference picture concerned, after the second local decoded picture is written from the first decoder (081) to the first intermediate buffer and before the following first local decoded picture is written.

According to this configuration, it is possible to perform the decoding of the I picture and the decoding of the B picture, and the decoding of the P picture and the decoding of the B picture, respectively in parallel, and it is possible to reduce the frequency of access to the reference memory, as is the case with the picture encoding device described in Paragraph 11.

(18) <A Picture Communication System (Embodiment 9)>

The typical embodiment disclosed in the present application is comprised of a transmitter (1000, 1100, 1200, 1300) including a picture encoding device (100) and an output control device (104); a transmission line (1002); and a receiver (1001, 1101, 1201, 1301) including a picture decoding device (800, 805, 806, 807).

The picture encoding device (100) encodes plural time-series pictures, and is comprised of a first encoder (001), a second encoder (002), an intermediate buffer (005, 006), and an encoding target picture controller (003, 004, 007).

The first encoder refers to picture information in a picture of an encoding target to encode the picture information of the picture concerned, outputs a first encoded bit string, creates a reference picture from the encoding result, and writes the reference picture in the intermediate buffer.

The second encoder refers to picture information in a picture of an encoding target and the reference picture stored in the intermediate buffer, to encode the picture information of the picture concerned and outputs a second encoded bit string.

The encoding target picture controller makes the second encoder start encoding a picture with reference to the reference picture concerned, before the following reference picture is written in the intermediate buffer by the first encoder.

The output control device applies time-division multiplexing to the first encoded bit string and the second encoded bit string, and sends them out to the transmission line as an encoded stream.

The receiver supplies the encoded stream inputted from the transmission line to the picture decoding device, and makes the picture decoding device decode the encoded stream.

According to this configuration, it is possible to provide the picture communication system with low delay. As is the case with Paragraph 1, it is possible to keep the access to the reference memory to a minimum in the picture encoding device, and it is possible to omit the reference memory in another embodiment.

(19) <Multiplexing of an Encoded Bit String (Embodiment 10)>

In Paragraph 18, the output control device (104) applies time-division multiplexing to the first encoded bit string and the second encoded bit string in a unit finer than a picture, and sends them out to the transmission line as an encoded stream.

The receiver is further comprised of an input control device (801).

The input control device applies demultiplexing (833) to the encoded stream inputted from the transmission line, divides the encoded stream into a first encoded bit stream corresponding to the first encoded bit string, and a second encoded bit stream corresponding to the second encoded bit string, and supplies the first encoded bit stream and the second encoded bit stream to the picture decoding device (805).

According to this configuration, it is possible for the receiver to reconstruct the first and the second encoded bit stream which are in conformity to the coding standard, from the encoded stream received from the transmission line. Therefore, it is possible to decode an image with the use of a general-purpose picture decoding device.

(20) <Multiplexing of an Encoded Bit String (Embodiment 12)>

In Paragraph 19, the picture decoding device is comprised of a first decoder (081), a second decoder (082), a first intermediate buffer (086), a third intermediate buffer (085), a decoding target image controller (083, 084, 087), and a reference memory (803) externally coupled.

The first decoder (081) operates as an I-picture decoder or a P-picture decoder, and when operating as the I-picture decoder, the first decoder decodes the first encoded stream corresponding to a first picture, creates a first local decoded picture from the decoding result concerned, and writes the first local decoded picture in the first intermediate buffer (086) and the reference memory (803).

The decoding target image controller reads the first local decoded picture from the reference memory (803) and stores it in the third intermediate buffer (085).

When operating as the P-picture decoder, the first decoder (081) refers to the first local decoded picture stored in the third intermediate buffer (085) to decode the first encoded stream corresponding to a third picture, creates a second local decoded picture from the decoding result concerned, and writes the second local decoded picture in the first intermediate buffer (086).

The second decoder operates as a B-picture decoder, and refers to the first local decoded picture and the second local decoded picture to decode the second encoded stream corresponding to a second picture.

The decoding target image controller (087) makes the B-picture decoder start decoding of a picture with reference to the local decoded picture concerned, after the second local decoded picture is written from the first decoder (081) to the first intermediate buffer and before the following first local decoded picture is written.

The decoding target image controller (087) supplies the first encoded stream, the second encoded stream, and the third encoded stream, respectively corresponding to consecutive three pictures, the first picture, the second picture, and the third picture, to the first decoder and the second decoder sequentially, and makes the two decoders perform decoding in parallel.

According to this configuration, it is possible to provide the picture communication system with low delay which combines the picture encoding device (100) described in Paragraph 11 and the picture decoding device (800) described in Paragraph 17. In the picture encoding device, it is possible to perform the encoding of the I picture and the encoding of the B picture, and the encoding of the P picture and the encoding of the B picture, respectively in parallel, and as is the case with Paragraph 11, it is possible to reduce the frequency of access to the reference memory (103). Also in the picture decoding device, it is possible to perform the decoding of the I picture and the decoding of the B picture, and the decoding of the P picture and the decoding of the B picture, respectively, in parallel, and as is the case with Paragraph 17, it is possible to reduce the frequency of access to the reference memory (803).

2. Details of Embodiment

Embodiment is further explained in full detail.

Embodiment 1

A typical embodiment disclosed in the present application is a picture encoding device which encodes plural time-series pictures. The picture encoding device is comprised of an intra picture encoder, an inter picture encoder, an intermediate buffer, and an encoding target picture controller. The term "picture" indicates not only a frame and a field but also a block and a macroblock which compose them, that is, it indicates a batch of images which is used as the unit of encoding or decoding.

The intra picture encoder refers to picture information in a picture as an encoding target to encode the picture information of the picture concerned, creates a reference picture such as a local decoded picture from the encoding result, and writes the reference picture in the intermediate buffer. For example, an encoder of an I picture corresponds to this. The intra picture encoder may further be provided with the function of inter picture encoding (for example, encoding of a P picture or a B picture) which refers to the reference picture (local decoded picture) created from pictures other than the picture as the encoding target and encodes the picture information of the picture concerned.

The inter picture encoder refers to picture information in a picture as an encoding target and the reference picture (local decoded picture) stored in the intermediate buffer and encodes the picture information of the picture concerned. For example, an encoder of a P picture or a B picture accompanied by motion compensation corresponds to this.

The encoding target picture controller makes the inter picture encoder start encoding the picture with reference to the reference picture concerned, before a reference picture created for the encoding of the next picture is written from the intra picture encoder to the intermediate buffer.

According to this configuration, after the reference picture (local decoded picture) is once stored in the reference frame memory, it is not necessary to read anew the reference picture for reference before the encoding which refers to it (inter picture encoding). Therefore, it is possible to keep the access to the reference frame memory at a minimum, and it is possible to omit the reference frame memory in another embodiment. When plural pieces of encoding which refer to the same reference picture are performed in parallel, it is possible to keep the access to the reference frame memory at a minimum, without reading the same reference picture from the reference frame memory repeatedly.

The above is a fundamental technical thought and it can be applied to various embodiments. The present invention is explained in concrete forms in Embodiment 1 through Embodiment 7 in the following; however, the present invention is not restricted to these embodiments. Based on the corresponding technical thought, a picture decoding device is illustrated in Embodiment 8 and a picture communication system is illustrated in Embodiments 9-12. As for the picture decoding device and the picture communication system, the present invention is not restricted to the embodiments to be disclosed and can be materialized in various other forms.

The details are explained in the following with concrete examples.

<An I/P Encoder+ n B Encoders+2 Intermediate Buffers+ an Reference Memory>

Figure 2:
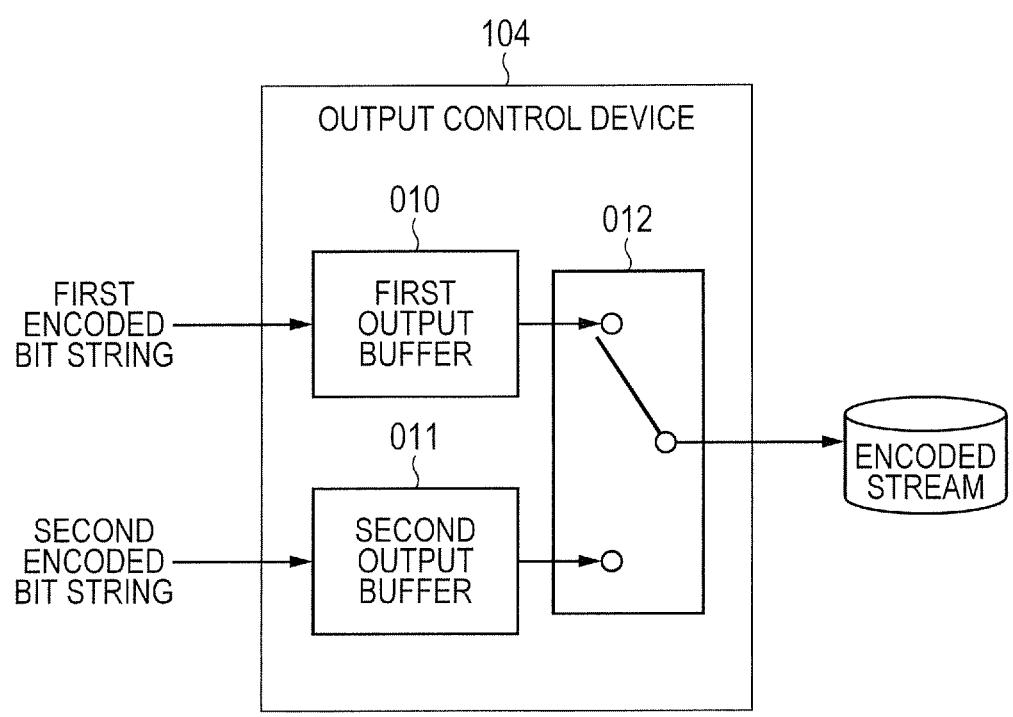
FIG. 2 is a block diagram illustrating a configuration example of an output control device.

FIG. 1 is a block diagram illustrating an example of the entire configuration of a picture encoding device according to Embodiment 1. FIG. 2 is a block diagram illustrating a configuration example of an output control device 104. A signal line in each block diagram quoted by the present description is implemented with a signal line with one bit or plural bits. However, the drawing of a bus is omitted.

The entire configuration of the picture encoding device according to Embodiment 1 includes an input-picture supply device 101, an input picture memory 102, an encoding device A (100), a reference frame memory 103, and an output control device 104. The input-picture supply device 101 supplies an original picture as an encoding target and it is exemplified by an imaging device, such as a camera. The input picture memory 102 stores an original picture supplied from the input-picture supply device 101, and the reference frame memory 103 stores a reference picture, such as a local decoded picture. Although the input picture memory 102 and the reference frame memory 103 are shown as separate memories, they may be implemented as one memory. For example, by the address mapping scheme, they may be implemented in an external SDRAM which is shared by the whole system. The encoding device A (100) reads the original picture as an encoding target from the input picture memory 102 in units of encoding and in order of encoding, and performs encoding. The encoding device A (100) stores a reference picture such as a local decoded picture created in the process, in the reference frame memory 103, and reads for reference a reference picture necessary in encoding from the reference frame memory 103. The encoding device A (100) outputs plural encoded bit strings as a result of encoding, and the output control device 104 creates an encoded stream from the plural encoded bit strings. A first encoded bit string and a second encoded bit string are illustrated in FIG. 1. However, further more encoded bit strings may be created and outputted. As illustrated in FIG. 2, the output control device 104 is comprised of a first output buffer 010 which stores the first encoded bit string temporarily, a second output buffer 011 which stores the second encoded bit string temporarily, and a switch 012 which switches the first and the second encoded bit string to create an encoded stream.

Figure 3:
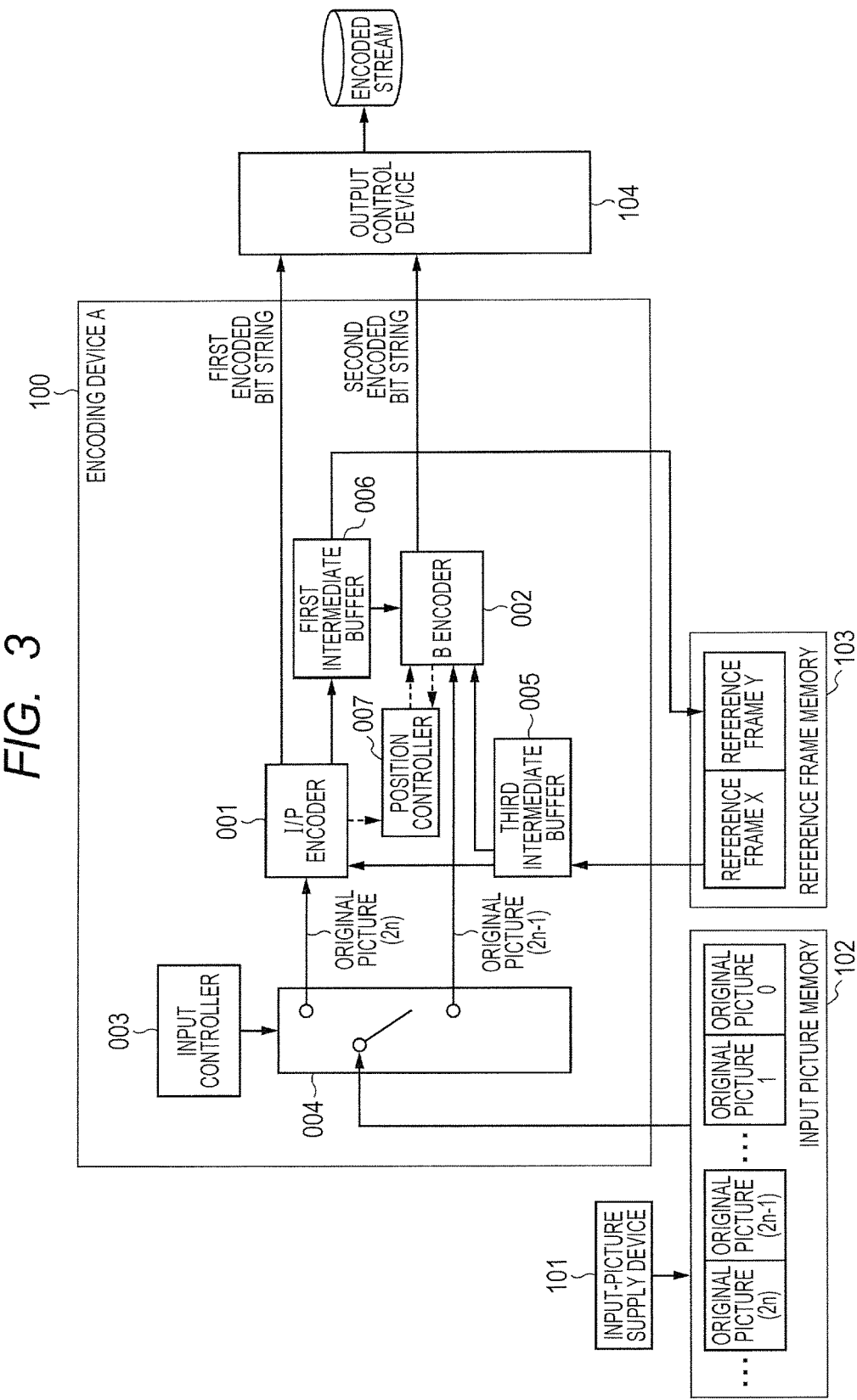
FIG. 3 is a block diagram illustrating a configuration example of a picture encoding device according to Embodiment 1.

FIG. 3 is a block diagram illustrating a configuration example of a picture encoding device A (100) according to Embodiment 1. The input-picture supply device 101, the input picture memory 102, the reference frame memory 103, and the output control device 104 are also illustrated in the figure. The same symbol is attached to the same component as that in FIG. 1, and the repeated explanation thereof is omitted. In the input picture memory 102 and the reference frame memory 103, original pictures 0, 1, . . . , 2n−1, 2n, . . . , and reference frames X and Y are illustrated typically. Here, n is arbitrary natural number, and 2n−1 indicates an odd-numbered frame and 2n indicates an even-numbered frame.

The encoding device A (100) is comprised of an I/P encoder 001, a B encoder 002, an input controller 003, a switch 004, a third intermediate buffer 005, a first intermediate buffer 006, and a position controller 007. The I/P encoder 001 encodes an I picture or a P picture, and the B encoder 002 encodes a B picture. The I picture, the P picture, and the B picture are described below. The input controller 003 controls the switch 004, reads an original picture from the input picture memory 102, and supplies it to the I/P encoder 001 and the B encoder 002. The I/P encoder 001 writes a reference picture created in encoding into the reference frame memory 103, and at the same time stores it in the first intermediate buffer 006 temporarily. The third intermediate buffer 005 stores temporarily a reference picture (reference frame) suitably read from the reference frame memory 103. When the I/P encoder 001 encodes a P picture, a reference picture (reference frame) stored in the third intermediate buffer 005 is referred to. When the B encoder 002 encodes a B picture, a reference picture (reference frame) stored in the first intermediate buffer 006 temporarily and a reference picture (reference frame) stored at the third intermediate buffer 005 are referred to. The position controller 007 controls the processing position of the I/P encoder 001 and the B encoder 002, that is, the position of the picture data of the processing target in encoding. The details thereof will be described below.

The I/P encoder 001 does not need to be an encoder which performs only the I-picture encoding and the P-picture encoding, but it may be replaced with an I/P/B encoder which performs encoding including the B-picture encoding. Similarly, the B encoder 002 does not need to be an encoder which performs only the B-picture encoding, but it may be replaced with an I/P/B encoder. The number of B encoders may not be one. By mounting N-piece B encoders, it is possible to set the number of B pictures between two P pictures (or I pictures) to N sheets. In that case, the reference region X and the reference region Y used as an input are common to the N-piece B encoders, and the N-piece B encoders can share the third intermediate buffer 005 and the first intermediate buffer 006. The plural (N sheets) B pictures inserted between the same I picture or P picture group, refer in common to the reference picture (local decoded picture) created in the encoding of the I picture or P picture group concerned. Accordingly, during the period when the encoding of the plural (N sheets) B pictures is performed, it is only necessary to store the reference picture (local decoded picture) to be referred to in the encoding, in the third intermediate buffer 005 and the first intermediate buffer 006, and it is not necessary to access the reference frame memory 103 to read another reference picture. An example of configuration in the case of N=2 is illustrated in FIG. 4.

Figure 4:
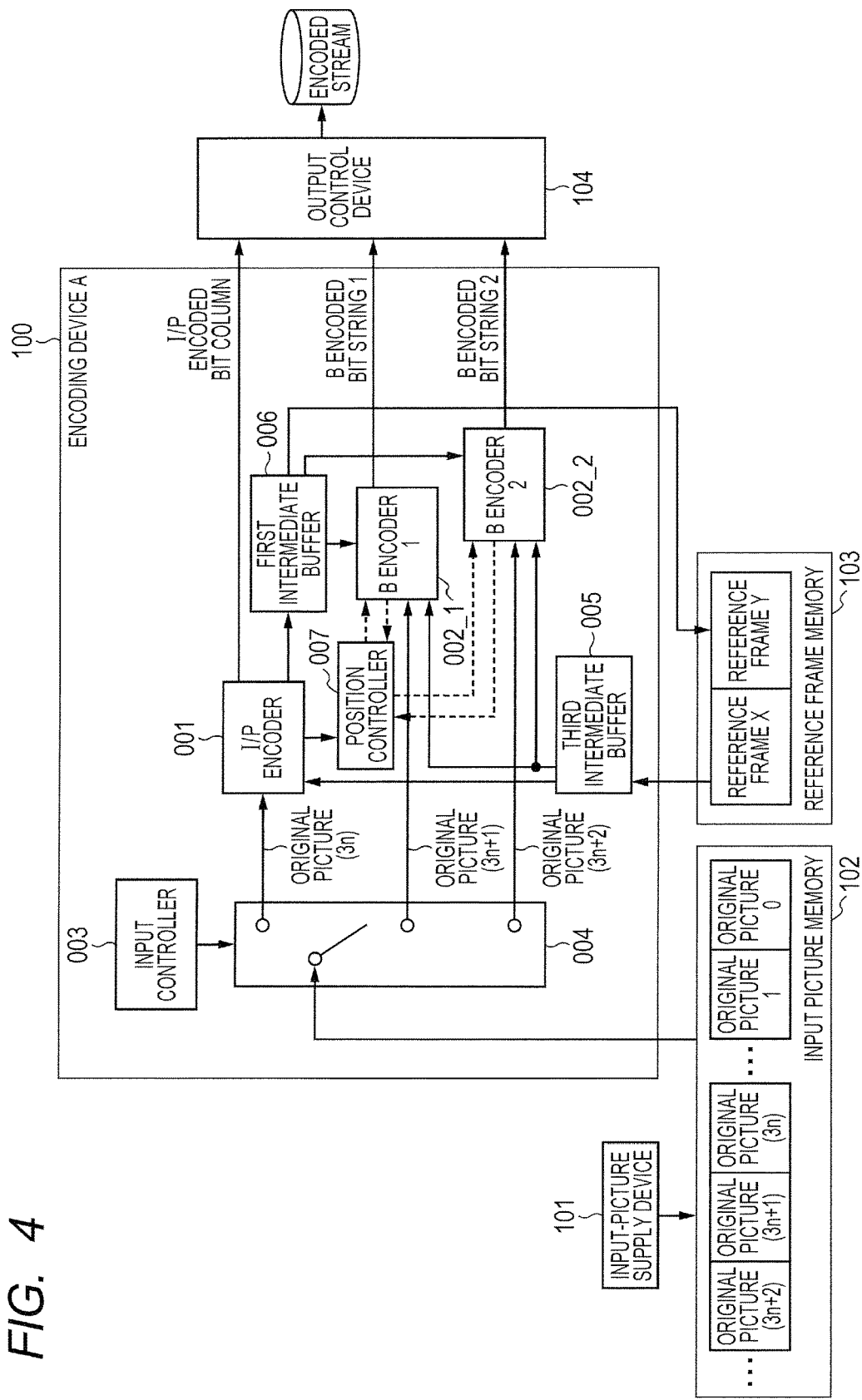
FIG. 4 is a block diagram illustrating another configuration example of the picture encoding device according to Embodiment 1.

FIG. 4 is a block diagram illustrating another configuration example of the picture encoding device A (100) according to Embodiment 1. As is the case with FIG. 3, the input-picture supply device 101, the input picture memory 102, the reference frame memory 103, and the output control device 104 are also illustrated in the figure. The encoding device A (100) is comprised of the I/P encoder 001, the input controller 003, the switch 004, the third intermediate buffer 005, the first intermediate buffer 006, and the position controller 007. What is different from FIG. 3 is that two B encoders 002-1 and 002-2 are provided corresponding to N=2. Two B encoders 002-1 and 002-2 refer to the same reference picture. Accordingly, the picture data of the same reference frame is supplied from the first intermediate buffer 006 and the third intermediate buffer 005, respectively. Two B encoders 002-1 and 002-2 output a B encoded bit string 1 and a B encoded bit string 2 to the output control device 104, respectively. Unlike in FIG. 3, the output control device 104 receives three inputs, and creates an encoded stream composed of the I/P encoded bit string, the B encoded bit string 1, and the B encoded bit string 2. If the number of the B pictures inserted between the same I picture or P picture group increases, it is possible to meet it by increasing the number of the B encoder and by increasing the number of inputs to the output control device 104.

The operation of the picture encoding device is explained.

Figure 5:
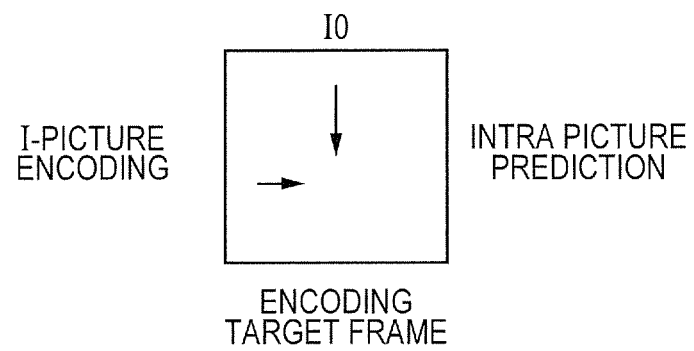
FIG. 5 is an explanatory drawing of I-picture encoding.
Figure 6:
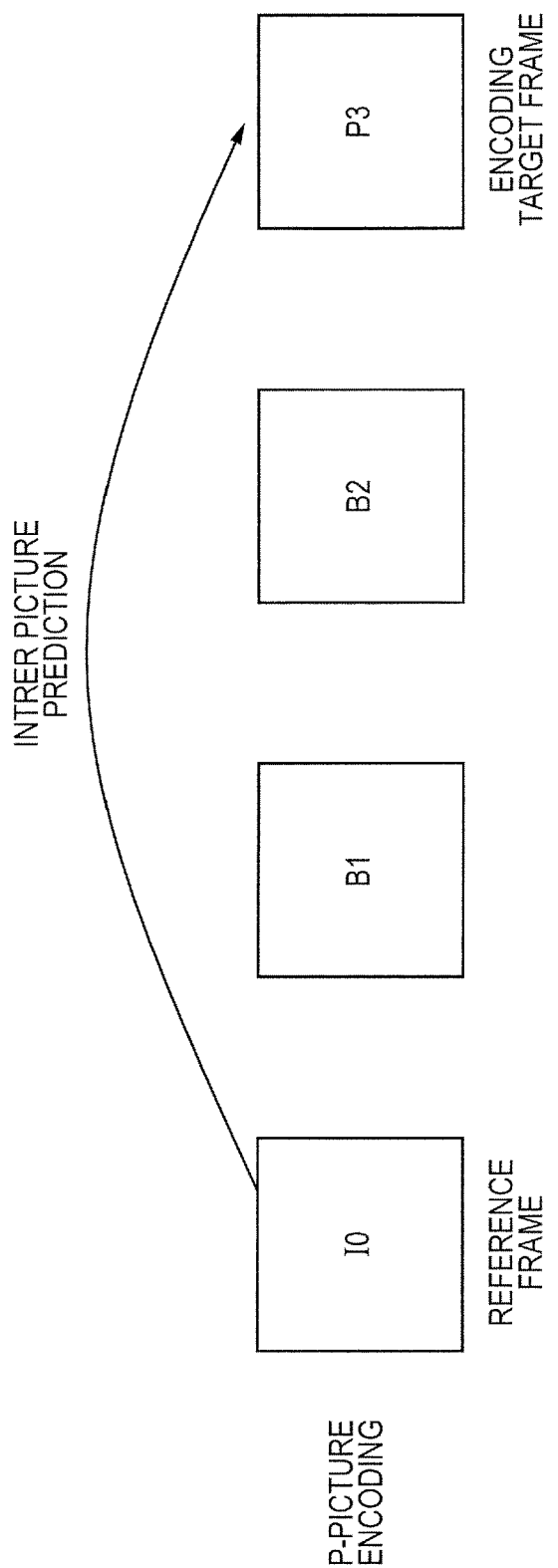
FIG. 6 is an explanatory drawing of P-picture encoding.
Figure 7:
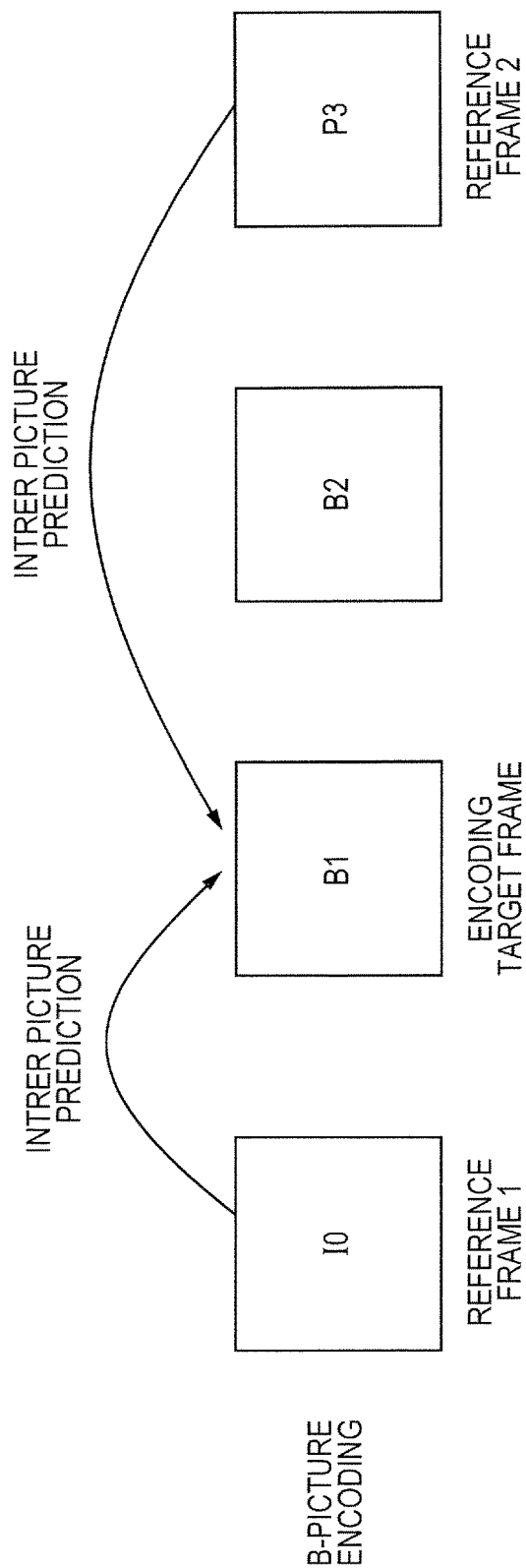
FIG. 7 is an explanatory drawing of B-picture encoding.

First, an I picture, a P picture, and a B picture are explained. FIG. 5-FIG. 7 are explanatory drawings about the encoding of an I picture, a P picture, and a B picture, respectively. The I picture, the P picture, and the B picture are picture types adopted in a moving image coding system. The I picture is a picture type which performs encoding by the intra picture prediction with the use of the picture information in the picture. The P picture is a picture type which performs encoding by the inter picture prediction with the use of one reference frame. The B picture is a picture type which performs encoding by the inter picture prediction with the use of two reference frames. In FIG. 5-FIG. 7, the pictures are shown in the order of photographing, with the past on the left and the future on the right. In the I picture I0 illustrated in FIG. 5, the encoding is performed by the intra picture prediction which uses picture information in the picture. In the P picture P3 illustrated in FIG. 6, the encoding is performed by the inter picture prediction which uses I0 as a reference frame. In the B picture B1 illustrated in FIG. 7, the encoding is performed by the inter picture prediction which uses the past picture I0 as a reference frame and the inter picture prediction which uses the future picture P3 as a reference frame. Here, although not shown in the figure, the B picture B2 uses I0 and P3 as the reference picture. The P picture refers to one past picture and the B picture refers to one past picture and one future picture. The number of the P pictures between the I pictures and the number of the B pictures between the I pictures or the P pictures are arbitrary respectively. However, depending on the kind of coding standards, such as H.264, it is possible to refer to two past pictures. Accordingly, in the present embodiment and other embodiments disclosed by the present application, the order of encoding is not necessarily specified. When actually performing encoding by the encoding device according to the present application, the order of encoding is changed to input the picture into the encoding device so that the picture to be referred to is encoded earlier than the picture to refer to.

The following explains the operation of the picture encoding device illustrated in FIG. 3 when the encoding is performed so that one B picture is inserted between I pictures or P pictures like IBPBPB . . . . The input picture memory 102 is supplied with an original picture as the encoding target on a time-series basis from the input-picture supply device 101; such as an original picture 0, an original picture 1, . . . , an original picture (2n−1), an original picture (2n), . . . . When encoding like IBPBPB . . . , the original picture 0 is encoded as the I picture, the original picture 1 as the B picture, the original picture 2 as the P picture, and henceforth the odd-numbered original picture (2n−1) is encoded as the B picture and the even-numbered original picture (2n) as the I picture or the P picture (n is one or a greater integer). It is assumed that the original picture (2n) is encoded as a P picture, the P picture (2n) uses the picture (2n−2) as a reference frame, and the B picture (2n−1) uses the picture (2n) and the picture (2n−2) as a reference frame.

The encoding device A (100) encodes every two pictures in parallel. Generally, encoding is performed in units of blocks each of which is a divided rectangle of a picture. This processing unit block is called a "macroblock" (hereinafter abbreviated as "MB"). It is possible to restrict the reference frame used for the inter picture encoding to a certain region in a picture, and it is called as a reference region. In the present application, by processing in units of MB, the data of an MB which the I/P encoder 001 has finished encoding can be used in an MB which the B encoder is going to encode, allowing the parallel encoding of two pictures.

The order of the encoding in the I/P encoder 001 is explained.

(1) An encoding target MB of the original picture (2*n*) is inputted into the I/P encoder 001 from the input picture memory 102.

(2) A reference region X to be used for the P-picture encoding is inputted into the third intermediate buffer 005 from a reference frame X in the reference frame memory 103.

(3) The I/P encoder 001 performs the P-picture encoding by the inter picture prediction from the original picture (2*n*) MB and the reference region X in the third intermediate buffer 005, and outputs a first encoded bit string to the output control device 104. Subsequently, a picture which is decoded from the encoded bit string (hereinafter called a local decoded picture) is written and stored in the first intermediate buffer 006.

(4) The local decoded picture stored in the first intermediate buffer 006 is written in the reference frame Y of the reference frame memory 103, in order to be used as a reference frame by the subsequent encoding.

After the above processing (1)-(4) is performed for all the MBs in the original picture (2*n*), the encoding of one picture is completed. When performing the I-picture encoding, the I-picture encoding is performed by the intra picture prediction in (3). At this time, the reference region X in the third intermediate buffer 005 is not used. However, even when the I-picture encoding is performed, the reference region X is stored into the third intermediate buffer 005 in (2).

The order of the encoding in the B encoder 002 is explained.

(5) An encoding target MB of the original picture (2*n*−1) is inputted into the B encoder 002 from the input picture memory 102.

(6) The B encoder 002 performs the B-picture encoding by the inter picture prediction, from the original picture (2*n*−1) MB, the reference region X in the third intermediate buffer 005, and the reference region Y composed of the local decoded picture in the first intermediate buffer 006, and outputs the second encoded bit string to the output control device 104.

After the above processing (5)-(6) is performed for all the MBs in the original picture (2*n*−1), the encoding of one picture is completed.

The processing of (1)-(4) by the I/P encoder 001 and the processing of (5)-(6) by the B encoder 002 are performed in parallel (two-picture parallel encoding).

Figure 8:
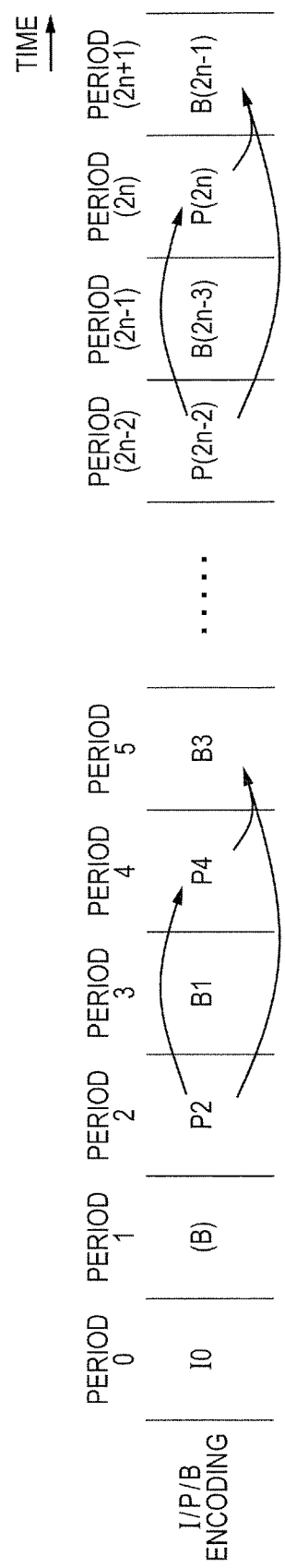
FIG. 8 is an explanatory drawing illustrating the processing order of the encoding in a comparative example.
Figure 9:
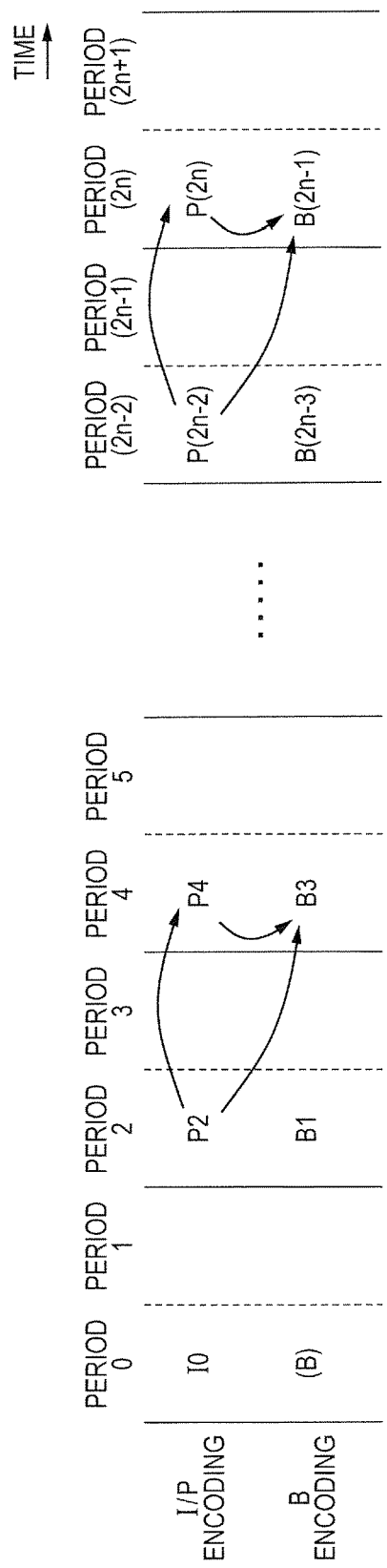
FIG. 9 is an explanatory drawing illustrating an example of the processing order of the encoding in Embodiment 1.
Figure 10:
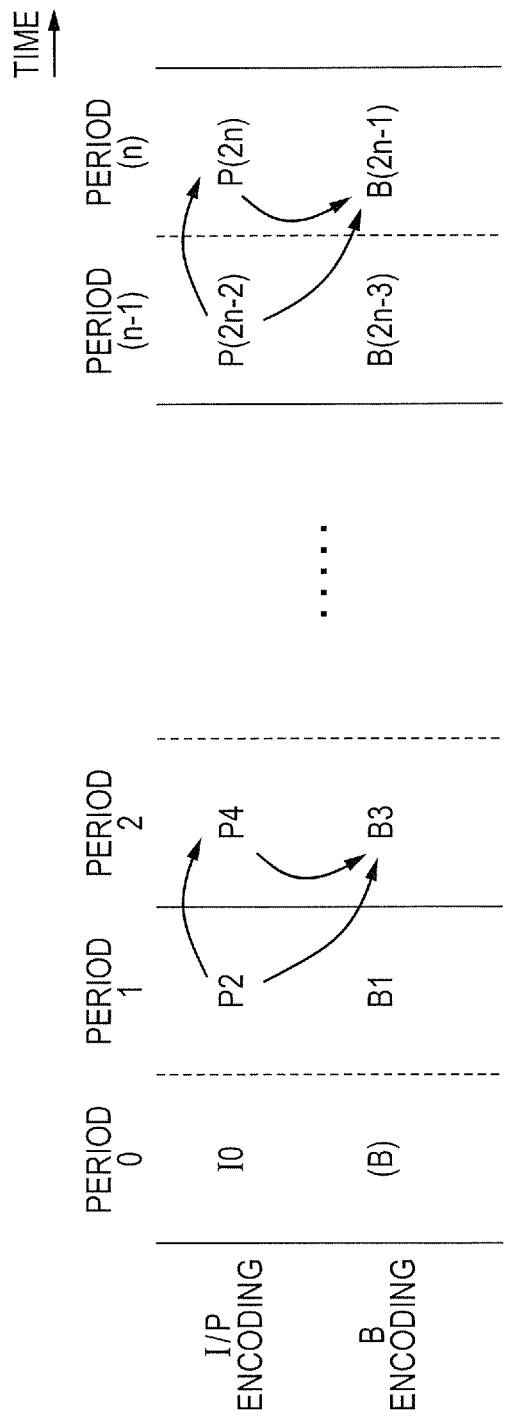
FIG. 10 is an explanatory drawing illustrating another example of the processing order of the encoding in Embodiment 1.

The processing order of the encoding of the I picture, the P picture, and the B picture is illustrated in FIG. 8-FIG. 10 typically. FIG. 8 illustrates the processing order of the encoding in a comparative example. FIG. 9 and FIG. 10 illustrate two kinds of processing order which can be employed in Embodiment 1. Period N (N=0, 1, . . . , 2*n*+1, . . . ) is a processing time of one picture. A smaller N expresses the anterior (past) time, and a larger N expresses the posterior (future) time. The numeric character attached to the characters I, P, and B expresses the order of the pictures being captured.

As illustrated in FIG. 8, in the comparative example, only the encoding of one kind of picture type is performed in one period. Encoding is performed for I0 at Period 0, a B picture captured before I0 at Period 1, P2 at Period 2, B1 at Period 3, P4 at Period 4, and B3 at Period 5. Subsequently, encoding is performed for P (2*n*−2) at Period (2*n*−2), B (2*n*−3) at Period (2*n*−1), P (2*n*) at Period (2*n*), and B (2*n*−1) at Period (2*n*+1). The arrow in the figure expresses the reference relation of the reference picture. That is, when encoding the picture at the tip of an arrow, the reference picture (local decoded picture) created by the encoding of the picture at the origin of the arrow is referred to. When performing the encoding of P4 at Period 4, the reference picture (local decoded picture) created by the encoding of P2 performed at Period 2 is referred to. When performing the encoding of B3 at Period 5, the reference picture (local decoded picture) created by the encoding of P2 performed at Period 2 is referred to, and in addition the reference picture (local decoded picture) created by the encoding of P4 performed at Period 4 is referred to. In this way, the original picture is read from the input picture memory 102 not in the order of capturing but in the order of encoding, and is supplied. Although B3 is a picture between P2 and P4 in the order of capturing, it is the B picture and uses not only the past reference picture of P2 but the reference picture of P4 of the future; therefore B3 is inputted after P4. Hereafter, in the encoding of P (2*n*) performed at Period (2*n*), the reference picture (local decoded picture) created by the encoding of P (2*n*−2) performed at Period (2*n*−2) is referred to. When performing the encoding of B (2*n*−1) at Period (2*n*+1), the reference picture (local decoded picture) created by the encoding of P (2*n*−2) performed at Period (2*n*−2) is referred to, and in addition, the reference picture (local decoded picture) created by the encoding of P(2*n*) performed at Period (2*n*) is referred to. Here, the reference picture (local decoded picture) created by the encoding of P2 performed at Period 2 is written in the reference frame memory at Period 2. After that, the reference picture concerned is read for the encoding of P4 at Period 4, and is read again for the encoding of B3 at Period 5. Generally, the reference picture (local decoded picture) created by the encoding of P (2*n*−2) performed at Period (2*n*−2) is written in the reference frame memory at Period (2*n*−2). After that, the reference picture concerned is read for the encoding of P(2*n*) at Period (2*n*), and is read again for the encoding of B(2*n*−1) at Period (2*n*+1). In this way, the reference frame memory is accessed once at write and at least twice at read, per one piece of reference picture.

The encoding device A (100) illustrated in Embodiment 1 can perform the parallel operation of the I/P encoder 001 and the B encoder 002 simultaneously. Accordingly, it is possible to perform the encoding of an I picture or a P picture and the encoding of a B picture in parallel.

FIG. 9 is an explanatory drawing illustrating an example of the processing order of the encoding in Embodiment 1. At Period 0, the I/P encoder 001 performs the encoding of I0, and the B encoder 002 performs the encoding of the B picture captured before I0. Subsequently, the encoding is performed in parallel for P2 and B1 at Period 2, P4 and B3 at Period 4, P(2*n*−2) and B (2*n*−3) at Period (2*n*−2), and P (2*n*) and B (2*n*−1) at Period (2*n*), respectively. Here, the reference picture (local decoded picture) created by the encoding of P2 performed at Period 2 is written in the reference frame memory at Period 2. After that, the reference picture concerned is read for the encoding of P4 at Period 4, and is used for the encoding of B3 at the same Period 4. Generally, the reference picture (local decoded picture)

created by the encoding of P (2n-2) performed at Period (2n-2) is written in the reference frame memory at Period (2n-2). After that, the reference picture concerned is read for the encoding of P (2n) at Period (2n), and is used for the encoding of B(2n-1) at the same Period (2n). Accordingly, it does not need to be read again. In this way, the frequency of access to the reference frame memory is suppressed to once at write and once at read, per one piece of reference picture. In the encoding of B3 at Period 4, the reference picture created by the encoding of P4 performed at the same Period 4 is used. Therefore, the reference picture needed in the encoding of B3 is already created in the encoding of P4, and is written in the first intermediate buffer 006. After that, the encoding of B3 can be started. Such control is performed by the position controller 007 as will be described later.

FIG. 10 is an explanatory drawing illustrating another example of the processing order of the encoding in Embodiment 1. At Period 0, the I/P encoder 001 performs the encoding of I0, and the B encoder 002 performs the encoding of the B picture captured before I0. Subsequently, the encoding is performed in parallel for P2 and B1 at Period 1, P4 and B3 at Period 2, P(2n-2) and B(2n-3) at Period (n-1), and P(2n) and B(2n-1) at Period (n), respectively. Here, the reference picture (local decoded picture) created by the encoding of P2 performed at Period 1 is written in the reference frame memory at Period 1. After that, the reference picture concerned is read for the encoding of P4 at Period 2, and is used for the encoding of B3 at the same Period 2. Generally, the reference picture (local decoded picture) created by the encoding of P(2n-2) performed at Period (n-1) is written in the reference frame memory at Period (n-1). After that, the reference picture concerned is read for the encoding of P(2n) at Period (n), and is used for the encoding of B(2n-1) at the same Period (n). Accordingly, it does not need to be read again. In this way, as is the case with the example described above in FIG. 9, the frequency of access to the reference frame memory is suppressed to once at write and once at read, per one piece of reference picture. In the example illustrated in FIG. 9, in order to perform encoding at the same interval as the frame interval of capturing, the encoding of two pictures is performed at two picture periods. Therefore, it is possible to lower the operating frequency and to suppress the power consumption. Or after performing the encoding of two pictures at one picture period, the clock is stopped till the end of two picture periods, thereby suppressing the power consumption. On the other hand, in the example illustrated in FIG. 10, the encoding of two pictures is performed at one picture period. In this case, it becomes possible to improve the processing capability twice.

Next, the operation of the position controller 007 is explained. As described above, in the encoding of B3 at Period 4 illustrated in FIG. 9, the reference picture created by the encoding of P4 performed at the same Period 4 is used. Accordingly, it must be controlled such that the reference picture needed in the encoding of B3 is already created in the encoding of P4 and is written in the first intermediate buffer 006 and then the encoding of B3 is started.

Figure 11:
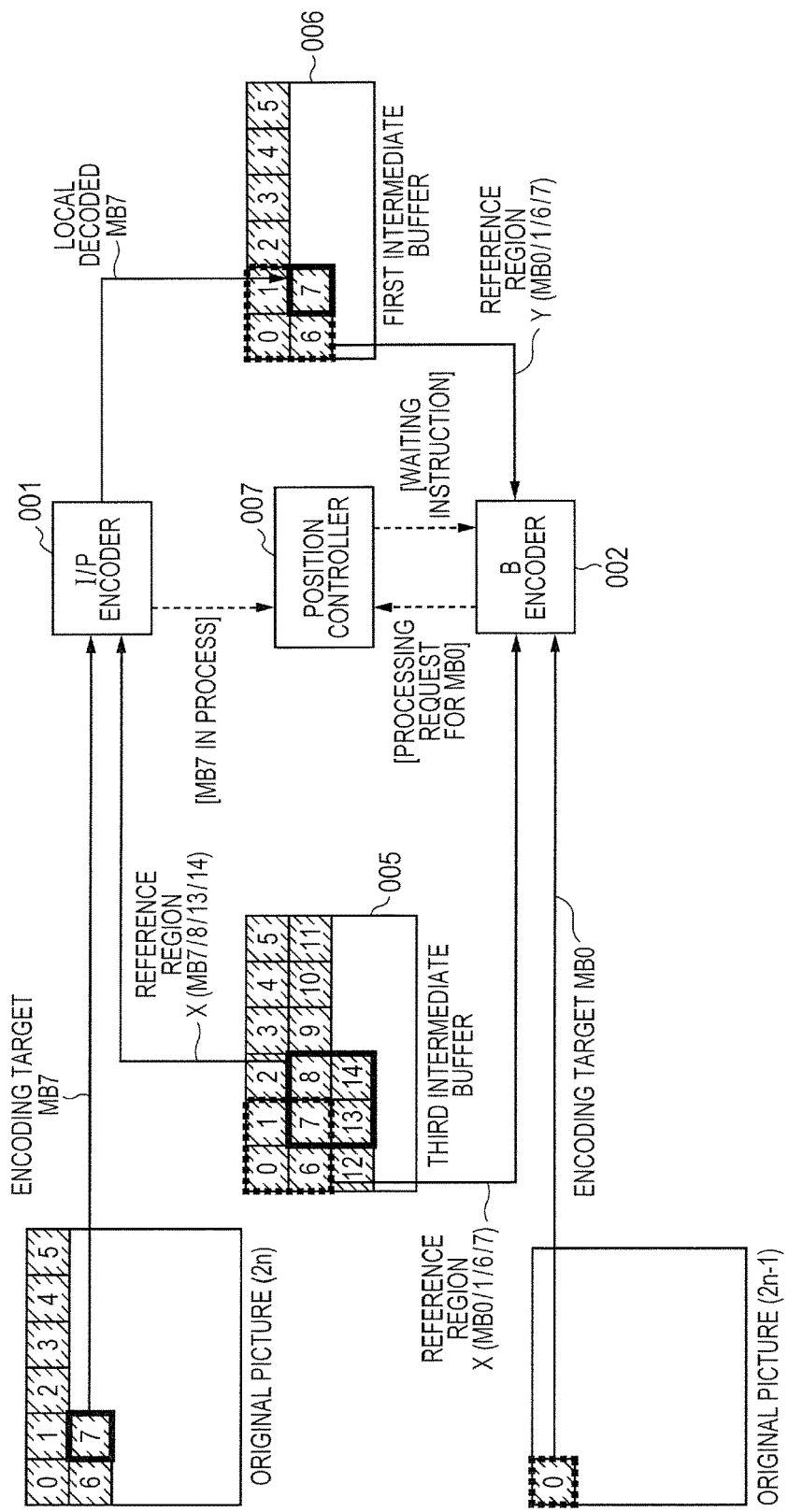
FIG. 11 is an explanatory drawing illustrating an example of control (waiting instruction) by a position controller.
Figure 12:
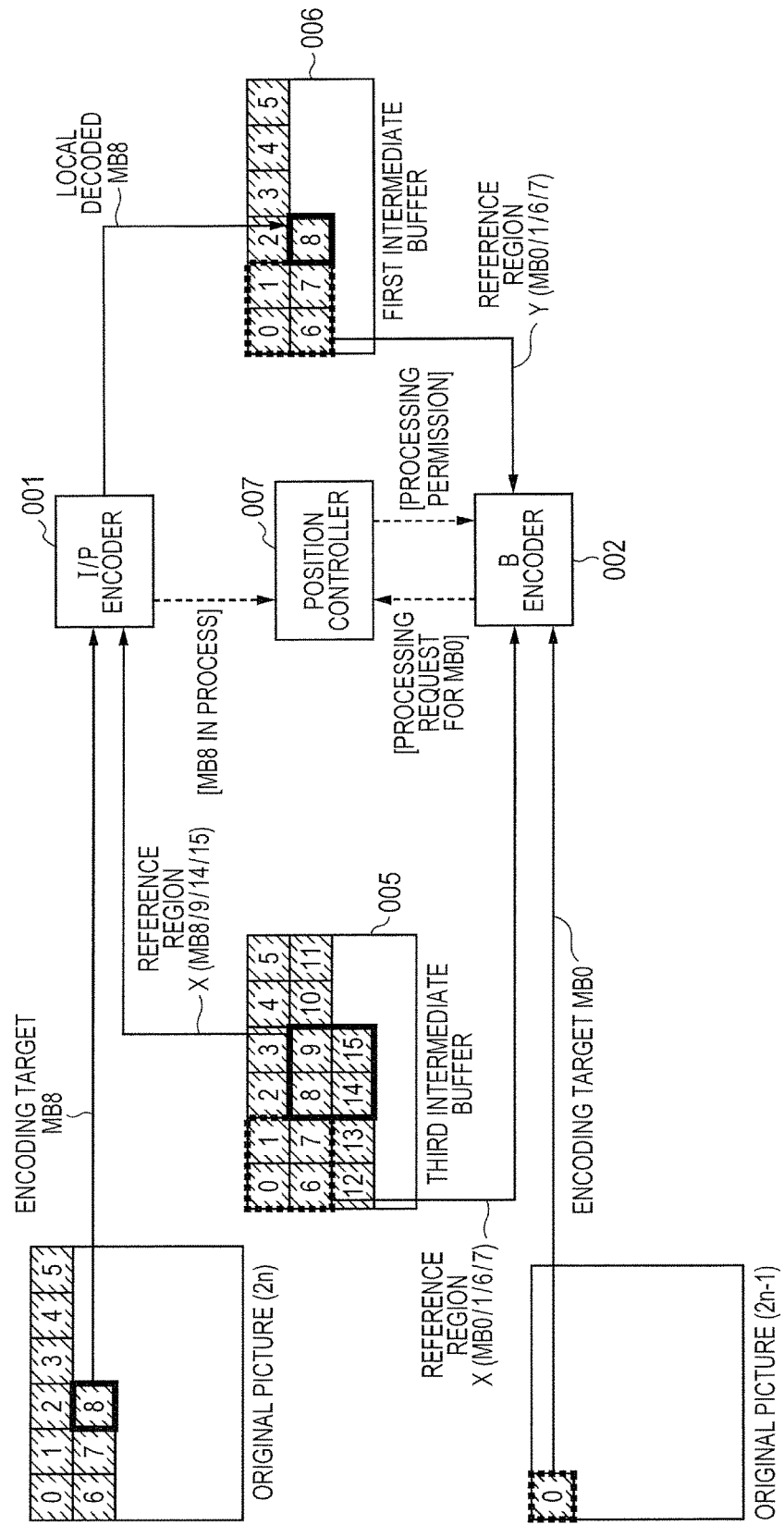
FIG. 12 is an explanatory drawing illustrating an example of control (processing permission) by the position controller.

FIG. 11 and FIG. 12 are explanatory drawings illustrating the example of control by the position controller 007; FIG. 11 illustrates the state of waiting instruction, and FIG. 12 illustrates the state of processing permission. In the present explanation, for simplicity, a picture horizontally composed of six MBs is used, and a reference region is a 2×2 4-MB region with a starting point of the same position as the encoding target MB. For example, the number of MBs which compose one picture, such as one frame, and the size of the reference region are arbitrary, and are prescribed by the standard of picture encoding or prescribed as specifications of an image system. The reference region X of the I/P encoder 001, the reference region X of the B encoder 002, and the reference region Y do not need to be the same size, respectively.

FIG. 11 illustrates the I/P encoder 001, the B encoder 002, the position controller 007, the first intermediate buffer 005, and the third intermediate buffer 006. An original picture (2n) inputted into the I/P encoder 001 is illustrated for every MB, and an original picture (2n-1) inputted into the B encoder 002 is illustrated for every MB. A hatched MB expresses an already inputted MB and a thick-framed MB expresses an encoding target MB at present. FIG. 11 illustrates an example in which the B encoder 002 is about to start the processing of MB0 and the I/P encoder 001 is currently performing the processing of MB7. MB0-MB6 are already inputted into the I/P encoder 001, the encoding is already finished, and the local-decoded MB0-MB6 are stored in the first intermediate buffer 006. The necessary reference picture of the reference frame is read from the reference frame memory 103 and stored in the third intermediate buffer 005. As illustrated in FIG. 11, MB7 of the original picture (2n) is inputted into the I/P encoder 001, encoding is performed with reference to 4 blocks of MB7, MB8, MB13, and MB14 as the reference regions X, from the third intermediate buffer 005, and the local-decoded MB7 is written to the first intermediate buffer 006. The I/P encoder 001 notifies the position controller 007 of the information expressing that "MB7 is in process." On the other hand, the B encoder 002 sends a "processing request for MB0" to the position controller 007. The position controller 007 manages whether the data of the reference region Y required by the B encoder 002 is ready, and notifies the B encoder 002 of "waiting instruction" or "processing permission." FIG. 11 illustrates the state where the "waiting instruction" is notified because the I/P encoder 001 has not completed the processing of MB7 and the reference region Y (MB0/MB1/MB6/MB7) necessary for the processing of MB0 by the B encoder 002 is not ready. Upon receiving the "waiting instruction", the B encoder 002 goes into a waiting state, and does not start the encoding.

FIG. 12 illustrates an example in which the B encoder 002 is starting the processing of MB0 while the I/P encoder 001 has finished the processing of MB7 and is performing the processing of MB8. In this case, the I/P encoder 001 has completed the processing of MB7 and the reference region Y (MB0/MB1/MB6/MB7) necessary for the processing of MB0 by the B encoder 002 is ready in the first intermediate buffer 006; accordingly, the position controller 007 notifies "processing permission" to the B encoder 002. Upon receiving the "processing permission", the B encoder 002 starts the encoding using MB0 of the original picture (2n-1), (MB0/MB1/MB6/MB7) of the reference region X, and (MB0/MB1/MB6/MB7) of the reference region Y.

As explained in FIG. 9 and FIG. 10, the I/P encoding and the B encoding are macroscopically performed in parallel at the same picture period. However, as already explained with reference to FIG. 11 and FIG. 12, microscopically, the control (processing-position control) is performed to start the encoding after the completion of the encoding of MB of the necessary reference region, in units of MB as the processing unit of the encoding. The reference region is determined depending on the range and size of a motion vector which are allowed in the motion compensation, for example, and is less than one frame at the maximum. When the reference region is the greatest one frame, after the I/P encoding of the referenced side is completed for one frame, the "processing permission" is notified to the B encoding on the referring side. Accordingly, for example, the processing of B3 in FIG. 9 is postponed until Period 5. Even in this case, the B encoding on the referring side is uniformly delayed. Therefore, it is possible to perform in parallel the encoding of two pictures in one picture period, as illustrated in FIG. 10. On the other hand, it is preferable that the B encoding on the referring side is made start before the contents of the intermediate buffer, especially the first intermediate buffer 006, are overwritten by the reference frame (local decoded picture) by the encoding of the next picture (frame). According to this configuration, it is possible to suppress the storage capacity of the intermediate buffer to a value equal to one picture (one frame). On the other hand, when the reference region is restricted, the storage capacity of the intermediate buffer can be made still smaller.

The picture encoding device according to Embodiment 1 encodes the first picture by the I/P encoder 001, stores the local decoded picture created by the encoding in the first intermediate buffer 006, the B encoder 002 encodes the second picture in parallel with reference to the local decoded picture, and the position controller 007 performs the control between both encoders. As described above, the present configuration is effective in reducing the frequency of access to the reference frame memory 103. In the present configuration, the B encoder 002 which encodes the B picture uses the data already stored in the third intermediate buffer 005 and the first intermediate buffer 006, as the reference region. Accordingly, the access to the reference frame memory 103 does not take place at the time of the B-picture encoding. Accordingly, it is only at the time of the P-picture encoding that data is read out from the reference frame memory 103.

In the picture encoding device disclosed by Patent Document 1, it is necessary to read data equal to one picture at the time of the P-picture encoding, and in addition to it, it is necessary to read data equal to two pictures at the time of the B-picture encoding. On the contrary, in the present configuration, it is necessary to read only data equal to one picture at the time of the P-picture encoding; accordingly, the present configuration is effective in reducing the memory zone to one third. Compared with the general past art which Patent Document 1 attempted to solve, the present configuration is effective in reducing the memory zone even to one fifth.

As other effects, it is possible to reduce the capacity of the reference frame memory 103. In the past, the capacity for three pictures were required, however, the present configuration requires the capacity equal to one picture for read and one picture for write, totaling two pictures.

The capacity of the third intermediate buffer 005 added to the encoding device A (100) just stores the data of the region where the I/P encoder 001 refers to plus the data of the region where the B encoder 002 refers to; therefore, several-MB line at maximum and three-MB line at minimum is sufficient. The capacity of the first intermediate buffer 006 just stores the data of the region where the I/P encoder 001 writes the decoded MB plus the data of the region where the B encoder 002 refers to; therefore, several-MB line at maximum and two-MB line at minimum is sufficient.

Note that it is possible to apply the present configuration to almost all the moving picture coding standards.

Embodiment 2

An I Encoder+ a P Encoder+ a B Encoder+ an Intermediate Buffer

It has been shown in Embodiment 1 that the access zone of the reference frame memory can be reduced by providing two encoders and two intermediate buffers. However, the access zone cannot be reduced to zero but the reference frame memory is as necessary as ever. For example, when the reference frame memory is assumed to be installed in an external shared memory, the capacity and non-zero access zone of the reference frame memory will increase system cost.

Accordingly, Embodiment 2 illustrates the configuration which does not need the reference frame memory.

Figure 13:
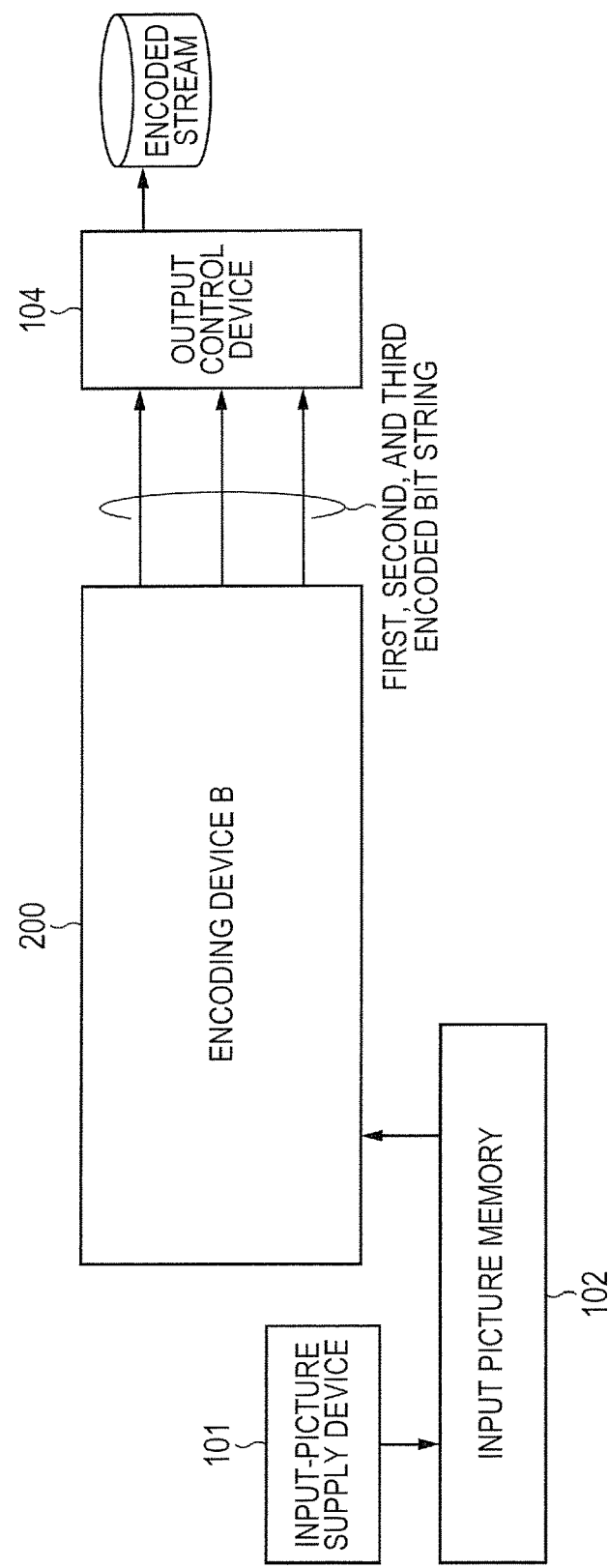
FIG. 13 is a block diagram illustrating an example of the entire configuration of a picture encoding device according to Embodiment 2.

FIG. 13 is a block diagram illustrating an example of the entire configuration of a picture encoding device according to Embodiment 2.

The entire configuration of the picture encoding device according to Embodiment 2 includes an input-picture supply device 101, an input picture memory 102, an encoding device B (200), and an output control device 104. Unlike the picture encoding device according to Embodiment 1, the encoding device B (200) is not provided with the reference frame memory 103. The encoding device B (200) encodes the original picture inputted from the input picture memory 102 in conformity with a certain picture coding system, without using the reference frame memory. The encoding device B (200) outputs three or more encoded bit strings.

Figure 14:
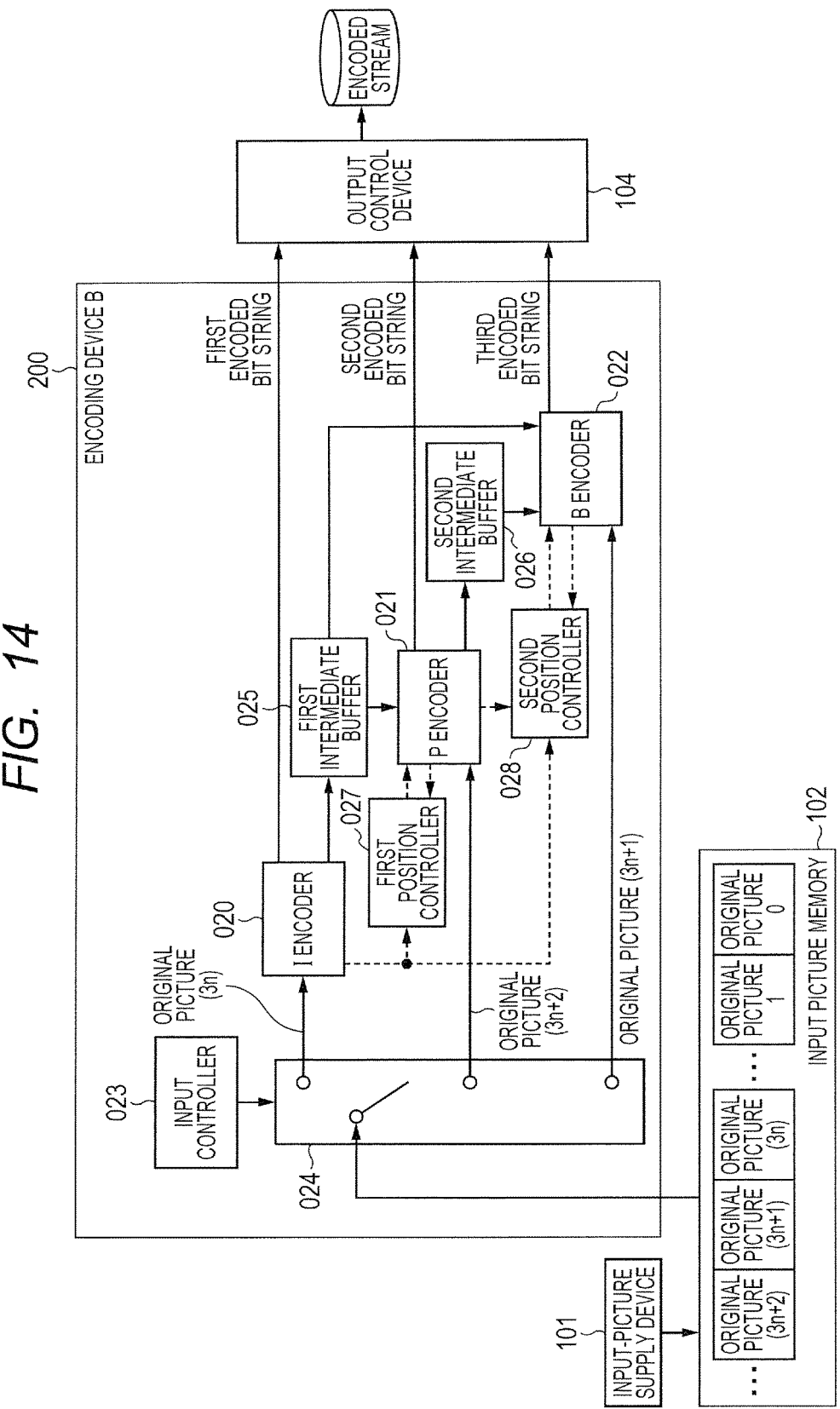
FIG. 14 is a block diagram illustrating a configuration example of the picture encoding device according to Embodiment 2.

FIG. 14 is a block diagram illustrating a configuration example of the picture encoding device according to Embodiment 2. The input-picture supply device 101, the input picture memory 102, and the output control device 104 are also illustrated in the figure. It is typically shown in the figure that the input picture memory 102 stores original pictures 0, 1, . . . , 3n, 3n+1, 3n+2, . . . .

The encoding device B (200) is comprised of an I encoder 020, a P encoder 021, a B encoder 022, an input controller 023, a switch 024, a first intermediate buffer 025, a second intermediate buffer 026, a first position controller 027, and a second position controller 028. The I encoder 020 encodes an I picture, creates a first encoded bit string, outputs it to the output control device 104, and outputs a local decoded picture to the first intermediate buffer 025 as a reference picture. The P encoder 021 performs the P-picture encoding with reference to the local decoded picture stored in the first intermediate buffer 025, creates a second encoded bit string, outputs it to the output control device 104, and outputs a local decoded picture to the second intermediate buffer 026 as a reference picture. The B encoder performs the B-picture encoding with reference to the local decoded picture stored in the first intermediate buffer 025 and the local decoded picture stored in the second intermediate buffer 026, creates a third encoded bit string, and outputs it to the output control device 104.

The I encoder 020, the P encoder 021, and the B encoder 022 do not need to bean encoder only for the respective picture type, and they may be an I/P/B encoder. The number of B encoders may not be one. By mounting N-piece B encoders, it is possible to set the number of B pictures between I pictures and P pictures to N sheets.

The operation of the picture encoding device according to Embodiment 2 is explained. The following explains the operation of the picture encoding device illustrated in FIG. 14 when the encoding is performed so that three picture types, an I picture, a B picture, and a P picture, are repeated every three pictures like IBPIBPIBP . . . . The input picture memory 102 is supplied with an original picture as the encoding target on a time-series basis from the input-picture supply device 101; such as an original picture 0, an original picture 1, . . . , an original picture (3n), an original picture (3n+1), an original picture (3n+2), . . . . When encoding like IBPIBPIBP . . . , the original picture 0 is encoded as the I picture, the original picture 1 as the B picture, the original picture 2 as the P picture, and henceforth the original picture (3*n*) is encoded as the I picture, the original picture (3*n*+1) as the B picture, and the original picture (3*n*+2) as the P picture (n is an integer equal to or greater than 0).

The encoding device B (200) encodes every three pictures in parallel.

The order of the encoding in the I encoder 020 is explained.

(1) An encoding target MB of the original picture (3*n*) is inputted into the I encoder 020 from the input picture memory 102.

(2) The I encoder 020 performs the I-picture encoding for the target MB of the original picture (3*n*) by the intra picture prediction, and outputs the first encoded bit string to the output control device 104. Subsequently, the local decoded picture is written and stored in the first intermediate buffer 025.

After the above processing (1)-(2) is performed for all the MBs in the original picture (3*n*), the encoding of one picture is completed.

The order of the encoding in the P encoder 021 is explained.

(3) An encoding target MB of the original picture (3*n*+2) is inputted into the P encoder 021 from the input picture memory 102.

(4) The P encoder 021 performs the P-picture encoding by the inter picture prediction from the reference region X composed of the target MB of the original picture (3*n*+2) and the local decoded picture by the I encoder 020 in the first intermediate buffer 025, and outputs the second encoded bit string to the output control device 104. Subsequently, the local decoded picture is written and stored in the second intermediate buffer 026.

After the above processing (3)-(4) is performed for all the MBs in the original picture (3*n*+2), the encoding of one picture is completed.

The order of the encoding in the B encoder 022 is explained.

(5) An encoding target MB of the original picture (3*n*+1) is inputted into the B encoder 022 from the input picture memory 102.

(6) The B encoder 022 performs the B-picture encoding by the inter picture prediction from the target MB of the original picture (3*n*+1), the reference region X composed of the local decoded picture by the I encoder 020 in the first intermediate buffer 025, and the reference region Y composed of the local decoded picture by the P encoder 021 in the second intermediate buffer 026, and outputs the third encoded bit string to the output control device 104.

After the above processing (5)-(6) is performed for all the MBs in the original picture (3*n*+1), the encoding of one picture is completed.

The processing of (1)-(2) by the I encoder 020, the processing of (3)-(4) by the P encoder 021, and the processing of (5)-(6) by the B encoder 022 are performed in parallel (three-picture parallel encoding).

The P encoder 021 refers to the local decoded picture by the I-picture encoding of the past original picture (3*n*) for the P-picture encoding of the original picture (3*n*+2). However, the local decoded picture is stored in the first intermediate buffer 025. Therefore, it is not necessary to access the reference frame memory. The B encoder 022 refers to the local decoded picture by the I-picture encoding of the past original picture (3*n*) and the local decoded picture by the P-picture encoding of the future original picture (3*n*+2), for the B-picture encoding of the original picture (3*n*+1). However, those reference pictures are stored in the first intermediate buffer 025 and the second intermediate buffer 026, respectively. Therefore, it is not necessary to access the reference frame memory. Accordingly, the picture encoding device according to Embodiment 2 does not need to be provided with the reference frame memory.

Figure 15:
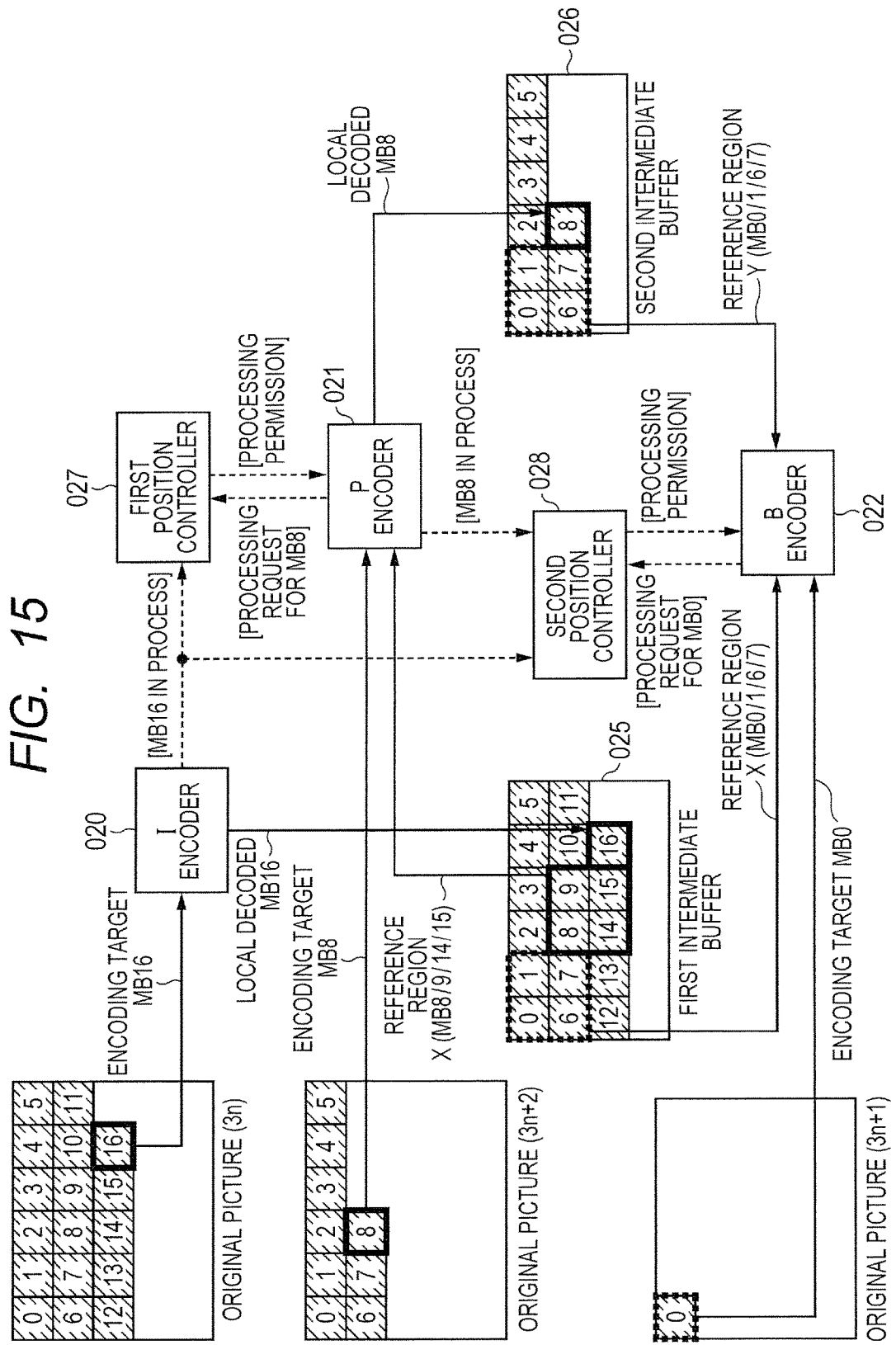
FIG. 15 is an explanatory drawing illustrating an example of control by a position controller according to Embodiment 2.

Next, the operation of the first position controller 027 and the second position controller 028 is explained. FIG. 15 is an explanatory drawing illustrating an example of control by the position controllers 027 and 028 according to Embodiment 2. In the present explanation, for simplicity, as is the case with FIG. 11 and FIG. 12, a picture horizontally composed of six MBs is used, and a reference region is a 2×2 4-MB region with a starting point of the same position as the encoding target MB.

In FIG. 15, the I encoder 020, the P encoder 021, the B encoder 022, the first position controller 027, the second position controller 028, the first intermediate buffer 025, and the second intermediate buffer 026 are illustrated. The original picture (3*n*) inputted into the I encoder 020, the original picture (3*n*+2) inputted into the P encoder 021, and the original picture (3*n*+1) inputted into the B encoder 022 are illustrated for every MB, respectively. A hatched MB expresses an already inputted MB and a thick-framed MB expresses an encoding target MB at present.

MB0-MB15 of the original picture (3*n*) are already inputted into the I encoder 020, the encoding is already finished, and the local-decoded MB0-MB15 are stored in the first intermediate buffer 025. At present, the I encoder 020 is performing the encoding for MB16 as the target, and the information expressing "MB16 is in process" is notified to the first position controller 027 and the second position controller 028.

MB0-MB7 of the original picture (3*n*+2) are already inputted into the P encoder 021, the encoding is already finished, and the local-decoded MB0-MB7 are stored in the second intermediate buffer 026. The P encoder 021 has sent "processing request for MB8" to the first position controller 027, in order to perform the encoding for MB8 at present. The first position controller 027 manages whether the data of the reference region X required by the P encoder 021 is ready, and notifies the P encoder 021 of "waiting instruction" or "processing permission." In the example illustrated in FIG. 15, The first position controller 027 makes the P encoder 021 start the encoding of MB8, by notifying the "processing permission" to the P encoder 021, after the reference region X (MB8/MB9/MB14/MB15) which the P encoder 021 refers to for the encoding of MB8 is written in the first intermediate buffer 025 from the I encoder 020. Upon receiving the "processing permission", the P encoder 021 starts the encoding using MB8 of the original picture (3*n*+2) and (MB8/MB9/MB14/MB15) of the reference region X. When the encoding is started, the information expressing "MB8 is in process" is notified to the second position controller 028.

MB0 of the original picture (3*n*+1) is inputted into the B encoder 022. In order to perform the encoding for it, the "processing request for MB0" is notified to the second position controller 028. The I encoder 020 writes the local-decoded MB16 to the first intermediate buffer 025, and notifies the second position controller 028 of the information expressing "MB16 is in process." The P encoder 021 writes the local-decoded MB8 to the second intermediate buffer 026, and notifies the second position controller 028 of "MB8 is in process." The second position controller 028 manages whether the data of the reference region X and the reference region Y which is required by the B encoder 022 is ready, and notifies the B encoder 022 of "waiting instruction" or "processing permission." In the example illustrated in FIG. 15, the I encoder 020 and the P encoder 021 both have completed processing of MB8. Accordingly, the reference region X (MB0/MB1/MB6/MB7) and the reference region Y (MB0/MB1/MB6/MB7), which are required for the encoding of MB0 by the B encoder 022, are all ready, and "processing permission" is notified. When putting in other words, the second position controller 028 notifies "processing permission" to the B encoder 022, after the reference region X (MB0/MB1/MB6/MB7) has been written in the first intermediate buffer 025 from the I encoder 020, and the reference region Y (MB0/MB1/MB6/MB7) has been written in the second intermediate buffer 026 from the P encoder 021. Upon receiving the "processing permission", the B encoder 022 starts the encoding using MB0 of the original picture ($3n+1$), (MB0/MB1/MB6/MB7) of the reference region X, and (MB0/MB1/MB6/MB7) of the reference region Y. When the processing position of the P encoder 021 alone can guarantee that the reference region in the first intermediate buffer 025 composed of the local-decoded MB of the I encoder 020 is ready, it is possible to omit the notice of the processing position to the second position controller 028 from the I encoder 020.

While Embodiment 1 adopts one-stage combination in which one intermediate buffer is provided between two encoders, Embodiment 2 adopts two-stage combination in which two intermediate buffers are provided among three encoders. Accordingly, it is possible to delete the reference frame memory 103 which has been necessary in Embodiment 1.

Embodiment 1 adopts the one-stage combination in which one intermediate buffer is provided between two encoders such as the I/P encoder 001, the B encoder 002, the position controller 007, and the first intermediate buffer 006. By storing temporarily the local decoded picture at the first stage in the intermediate buffer, and referring to it by the encoding by the second stage encoder, the frequency of access to the reference frame memory can be reduced. However, when the first stage I/P encoder 001 performs the encoding of the P picture, it is necessary to access the reference frame memory. As compared with this, Embodiment 2 adopts the two-stage combination in which two intermediate buffers are provided among three encoders, such as the I encoder 020, the first intermediate buffer 025, the first position controller 027, the P encoder 021, the second intermediate buffer 026, the second position controller 028, and the B encoder 022. The first picture is encoded by the I encoder 020, a local decoded picture created by the encoding is stored in the first intermediate buffer 025, and the second picture is encoded in parallel by the P encoder 021 referring to the local decoded picture in the first intermediate buffer 025. A local decoded picture created when the P encoder 021 encodes the second picture is stored in the second intermediate buffer 026, and the B encoder 022 encodes the third picture in parallel with reference to the local decoded picture of the first intermediate buffer 025 and the local decoded picture of the second intermediate buffer 026. The encoding of the first picture by the I encoder 020, the encoding of the second picture by the P encoder 021, and the encoding of the third picture by the B encoder 022 are performed in parallel macroscopically. Control to enable each of the encoders to start respective encoding is performed by the first position controller 027 and the second position controller 028. In the present configuration, the P encoder 021 which encodes the P picture uses the data already stored in the first intermediate buffer 025 as the reference region, and the B encoder 022 which encodes the B picture uses the data already stored in the first intermediate buffer 025 and the second intermediate buffer 026 as the reference region. Accordingly, no access to the reference frame memory 103 takes place at all. Therefore, in the present configuration, it is possible to reduce the memory zone and memory capacity of the reference frame memory to zero; accordingly it is possible to reduce the cost of the system greatly.

Embodiment 3

An I Encoder+ a P Encoder+ an Intermediate Buffer

Embodiment 2 illustrates the configuration which is composed of one I encoder, one P encoder, and one or more B encoders, but not having a reference frame memory, thereby reducing the system cost. However, in Embodiment 2, it is necessary to provide three or more encoders, and hardware cost increases compared with Embodiment 1. Generally, the encoding of pictures in which a B picture exists between I pictures or P pictures yields an improved efficiency of encoding. On the other hand, it is necessary to rearrange an input picture according to the order of encoding. Accordingly, there exists the demerit that encoding delay becomes large. This fact produces forcefully the demerit that the delay from an input to a display becomes large also in the decoding. Therefore, there are also needs of the coding which does not include a B picture.

Embodiment 3 illustrates the configuration which enables reduction of hardware cost and reduction of encoding delay by removing a B encoder from the configuration of Embodiment 2.

Figure 16:
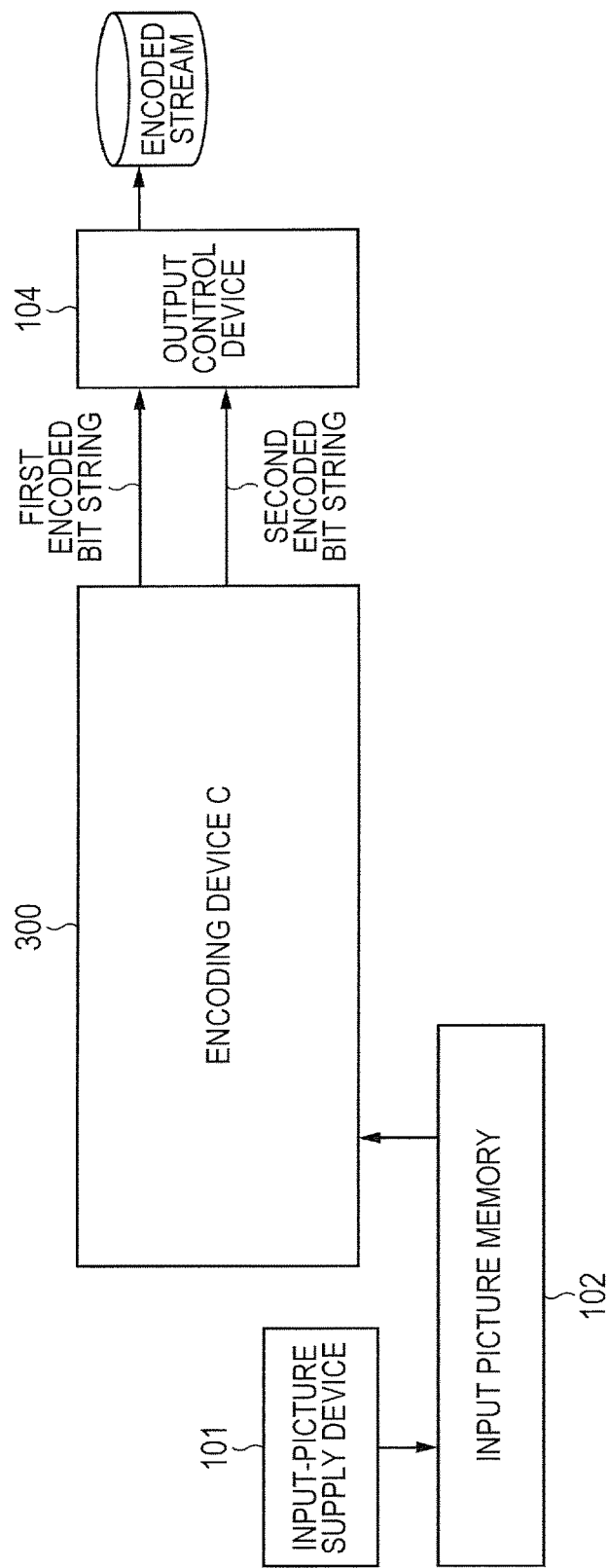
FIG. 16 is a block diagram illustrating an example of the entire configuration of a picture encoding device according to Embodiment 3.

FIG. 16 is a block diagram illustrating an example of the entire configuration of a picture encoding device according to Embodiment 3.

The entire configuration of the picture encoding device according to Embodiment 3 includes an input-picture supply device 101, an input picture memory 102, an encoding device C (300), and an output control device 104. Unlike the picture encoding device according to Embodiment 1, the encoding device C (300) is not provided with the reference frame memory 103. The encoding device C (300) encodes the original picture inputted from the input picture memory 102 in conformity with a certain picture coding system, without using the reference frame memory. Unlike the picture encoding device according to Embodiment 2, the encoding device C (300) outputs two encoded bit strings.

Figure 17:
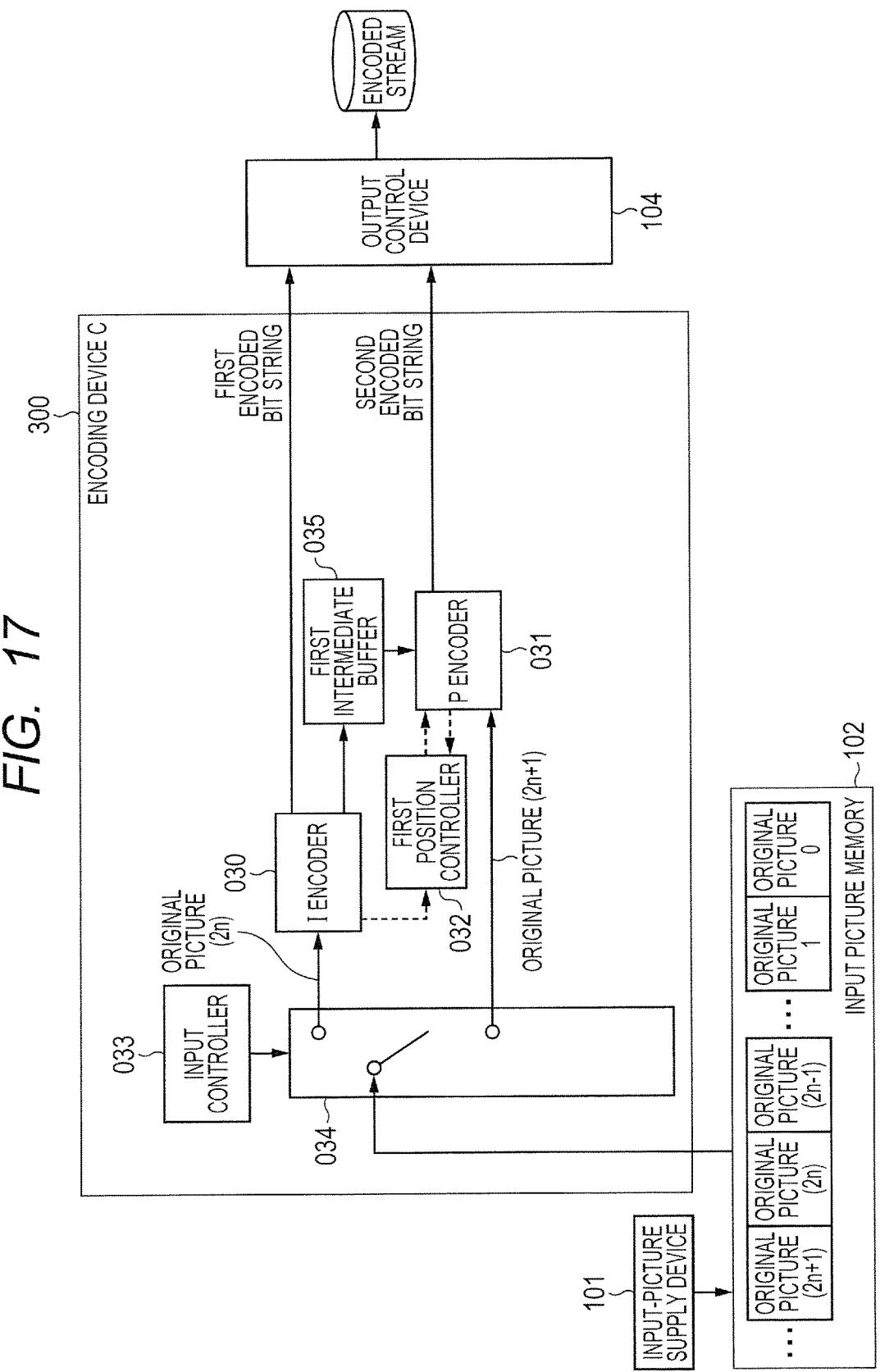
FIG. 17 is a block diagram illustrating a configuration example of the picture encoding device according to Embodiment 3.

FIG. 17 is a block diagram illustrating a configuration example of the picture encoding device according to Embodiment 3. The input-picture supply device 101, the input picture memory 102, and the output control device 104 are also illustrated in the figure. It is typically shown in the figure that the input picture memory 102 stores original pictures 0, 1, . . . , $2n-1$, $2n$, $2n+1$, . . . .

The encoding device C (300) is comprised of an I encoder 030, a P encoder 031, an input controller 033, a switch 034, a first intermediate buffer 035, and a first position controller 032. The I encoder 030 encodes an I picture, creates a first encoded bit string, outputs it to the output control device 104, and outputs a local decoded picture to the first intermediate buffer 035 as a reference picture. The P encoder 031 performs the P-picture encoding with reference to the local decoded picture stored in the first intermediate buffer 035, creates a second encoded bit string, and outputs it to the output control device 104. The I encoder 030 and the P encoder 031 do not need to be an encoder only for the respective picture type, and both may be an I/P/B encoder.

The operation of the picture encoding device according to Embodiment 3 is explained. The following explains the operation of the picture encoding device illustrated in FIG. 16 when the encoding is performed so that two picture types, an I picture and a P picture, are repeated every two pictures like IPIPIP . . . . The input picture memory 102 is supplied with an original picture as the encoding target on a time-series basis from the input-picture supply device 101; such as an original picture 0, an original picture 1, . . . , an original picture (2n−1), an original picture (2n), an original picture (2n+1). When encoding like IPIPIP . . . , the original picture 0 is encoded as an I picture, the original picture 1 as a P picture, and henceforth the original picture (2n−1) is encoded as an I picture, the original picture (2n) as a P picture, and the original picture (2n+1) as an I picture (n is an integer equal to or greater than 0).

The encoding device C (300) encodes every two pictures in parallel.

The order of the encoding in the I encoder 030 is explained.

(1) An encoding target MB of the original picture (2n−1) is inputted into the I encoder 030 from the input picture memory 102.

(2) The I encoder 030 performs the I-picture encoding for the target MB of the original picture (2n−1) by the intra picture prediction, and outputs the first encoded bit string to the output control device 104. Subsequently, the local decoded picture is written and stored in the first intermediate buffer 035.

After the above processing (1)-(2) is performed for all the MBs in the original picture (2n−1), the encoding of one picture is completed.

The order of the encoding in the P encoder 031 is explained.

(3) An encoding target MB of the original picture (2n) is inputted into the P encoder 031 from the input picture memory 102.

(4) The P encoder 031 performs the P-picture encoding by the inter picture prediction from the reference region X composed of the target MB of the original picture (2n) and the local decoded picture by the I encoder 030 in the first intermediate buffer 035, and outputs the second encoded bit string to the output control device 104.

After the above processing (3)-(4) is performed for all the MBs in the original picture (2n), the encoding of one picture is completed.

The processing of (1)-(2) by the I encoder 030 and the processing of (3)-(4) by the P encoder 031 are performed in parallel (two-picture parallel encoding).

The P encoder 031 refers to the local decoded picture by the I-picture encoding of the past original picture (2n−1) for the P-picture encoding of the original picture (2n). However, the local decoded picture is stored in the first intermediate buffer 035. Therefore, it is not necessary to access the reference frame memory. Accordingly, the picture encoding device according to Embodiment 3 does not need to be provided with the reference frame memory.

Next, the operation of the first position controller 032 is explained.

Figure 18:
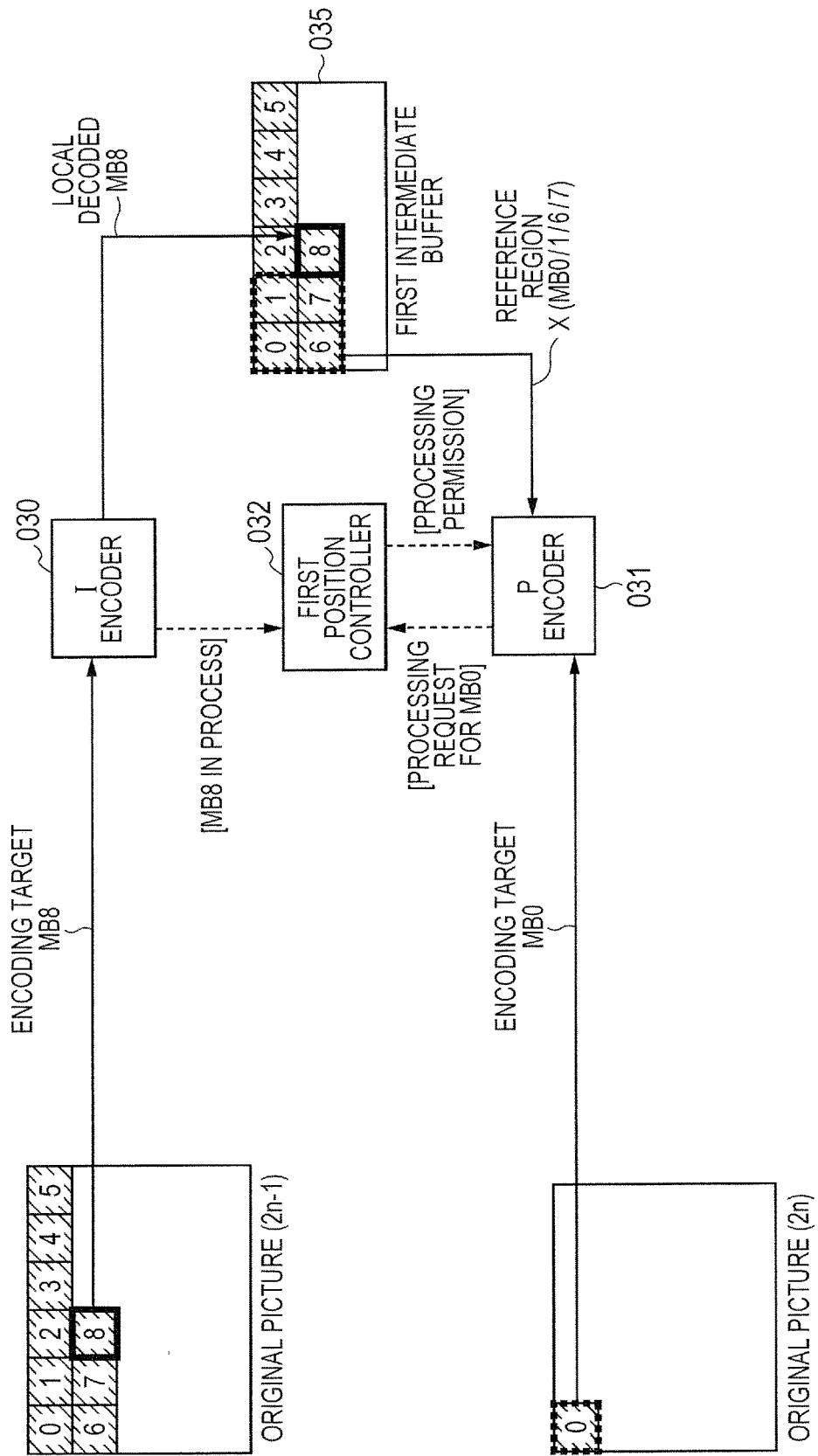
FIG. 18 is an explanatory drawing illustrating an example of control by a position controller according to Embodiment 3.

FIG. 18 is an explanatory drawing illustrating the example of control by the first position controller 032 according to Embodiment 3. In the present explanation, for simplicity, as is the cases with FIG. 11, FIG. 12, and FIG. 15, a picture horizontally composed of six MBs is used, and a reference region is a 2×2 4-MB region with a starting point of the same position as the encoding target MB.

FIG. 18 illustrates the I encoder 030, the P encoder 031, the first position controller 032, and the first intermediate buffer 035. The original picture (2n−1) inputted into the I encoder 030 and the original picture (2n) inputted into the P encoder 031 are illustrated for every MB, respectively. A hatched MB expresses an already inputted MB and a thick-framed MB expresses an encoding target MB at present.

MB0-MB7 of the original picture (2n−1) are already inputted into the I encoder 030, the encoding is already finished and the local-decoded MB0-MB7 are stored in the first intermediate buffer 035. At present, the I encoder 030 is performing the encoding for MB8 as the target, and the information expressing "MB8 is in process" is notified to the first position controller 032.

The P encoder 031 has sent "processing request for MB0" to the first position controller 027, in order to perform the encoding for MB8 of the original picture (2n) as a target. The first position controller 032 manages whether the data of the reference region X required by the P encoder 031 is ready, and notifies the P encoder 031 of "waiting instruction" or "processing permission." In the example illustrated in FIG. 18, the first position controller 032 makes the P encoder 031 start the encoding of MB0, by notifying the "processing permission" to the P encoder 031, after the reference region X (MB0/MB1/MB6/MB7) which the P encoder 031 refers to for the encoding of MB0 is written in the first intermediate buffer 035 from the I encoder 030. Upon receiving the "processing permission", the P encoder 031 starts the encoding using MB0 of the original picture (2n) and (MB0/MB1/MB6/MB7) of the reference region X.

In Embodiment 3, the B encoder 022, the second intermediate buffer 026, and the second position controller 028 according to Embodiment 2 are deleted. Consequently, the present configuration is effective in reducing the hardware cost and reducing the encoding delay. It is also effective in reducing the decoding delay in the decoding. These effects lead to the reduction of the system cost.

Embodiment 4

Field Division

In Embodiments 1-3, in order to supply two or more pieces of the original pictures simultaneously (in parallel), the input picture memory 102 is necessary. Even if the reference frame memory 103 is deleted as in Embodiment 3, the input picture memory 102 cannot be deleted. Accordingly, it is difficult to eliminate the access to an external shared memory, posing an issue of increase of the system cost. In addition, it is necessary to store the original picture once in the input picture memory 102 from the input-picture supply device 101; accordingly there arises an issue of increased delay in the processing from input to output.

Embodiment 4 illustrates the configuration which enables deletion of the input picture memory 102 by performing a picture division in an encoding device.

Figure 19:
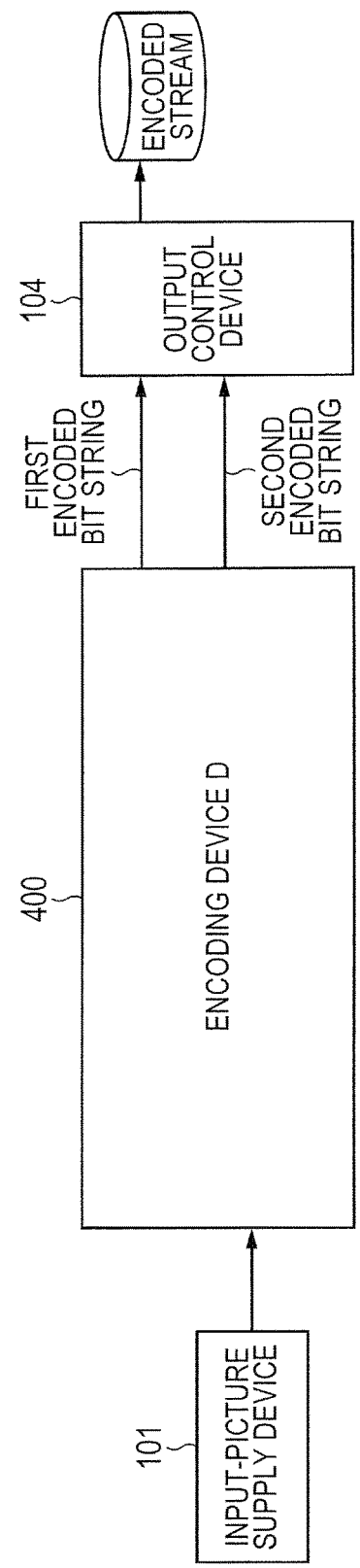
FIG. 19 is a block diagram illustrating an example of the entire configuration of a picture encoding device according to Embodiment 4, Embodiment 5, and Embodiment 6.

FIG. 19 is a block diagram illustrating an example of the entire configuration of a picture encoding device according to Embodiment 4.

The entire configuration of the picture encoding device according to Embodiment 4 includes an input-picture supply device 101, an encoding device D (400), and an output control device 104. Unlike the picture encoding devices according to Embodiments 1-3, the picture encoding device according to Embodiment 4 is not provided with the input picture memory 102, but the original picture data as an encoding target is directly inputted into the encoding device D (400) from the input-picture supply device 101.

Figure 20:
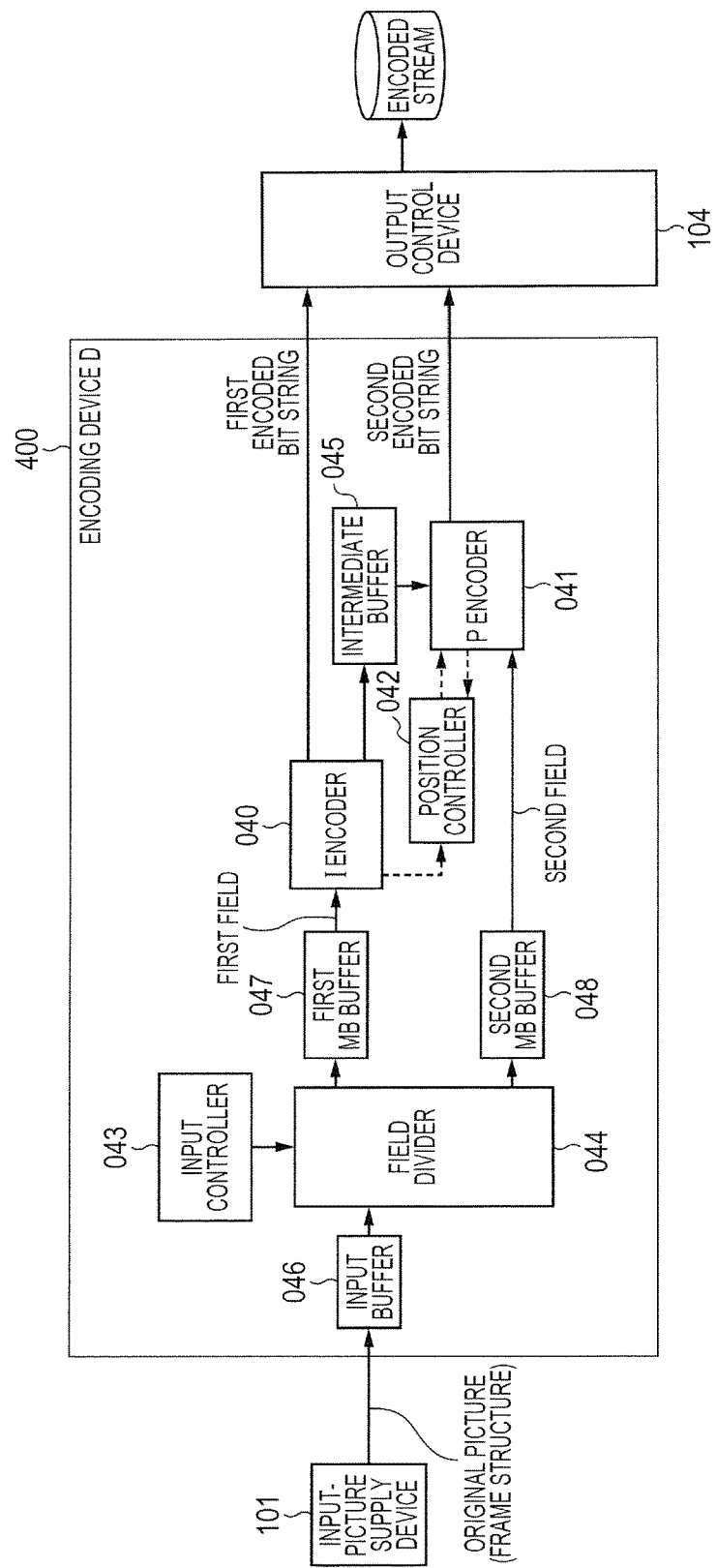
FIG. 20 is a block diagram illustrating a configuration example of the picture encoding device according to Embodiment 4.

FIG. 20 is a block diagram illustrating a configuration example of the picture encoding device according to Embodiment 4. The input-picture supply device 101 and the output control device 104 are also illustrated in the figure.

The encoding device D (400) is comprised of an I encoder 040, a P encoder 041, a position controller 042, an input controller 043, a field divider 044, an intermediate buffer 045, an input buffer 046, a first MB buffer 047, and a second MB buffer 048. The I encoder 040 performs the I picture encoding, creates a first encoded bit string, outputs it to the output control device 104, and outputs a local decoded picture to the intermediate buffer 045 as a reference picture. The P encoder 041 performs the P-picture encoding with reference to the local decoded picture stored in the intermediate buffer 045, creates a second encoded bit string, and outputs it to the output control device 104. The I encoder 040 and the P encoder 041 do not need to be an encoder only for the respective picture type, and it may be an I/P/B encoder.

The encoding device D (400) is different from the encoding device C (300) according to Embodiment 3 in a point that the original picture is inputted directly from the input-picture supply device 101, a point that the field divider 044 which divides and supplies an original picture is provided instead of the switch 034, and a point that the input buffer 046 which once stores the original picture and the first MB buffer 047 and the second MB buffer 048 which once store the output of the field divider 044 are provided. That is, in the encoding device D (400), the input buffer 046 once stores the original picture of a frame structure inputted from the input-picture supply device 101, and the field divider 044 decomposes the original picture into a field structure and supplies it to one of the I encoder 040 and the P encoder 041. The field divider 044 divides and reconstructs a picture for every MB which is the unit of encoding of each encoder, and supplies the picture data as the encoding target to the I encoder 040 via the first MB buffer 047 and to the P encoder 041 via the second MB buffer 048, respectively.

In order to explain the operation of the encoding device D (400), the frame structure and the field structure are explained first.

Figure 21:
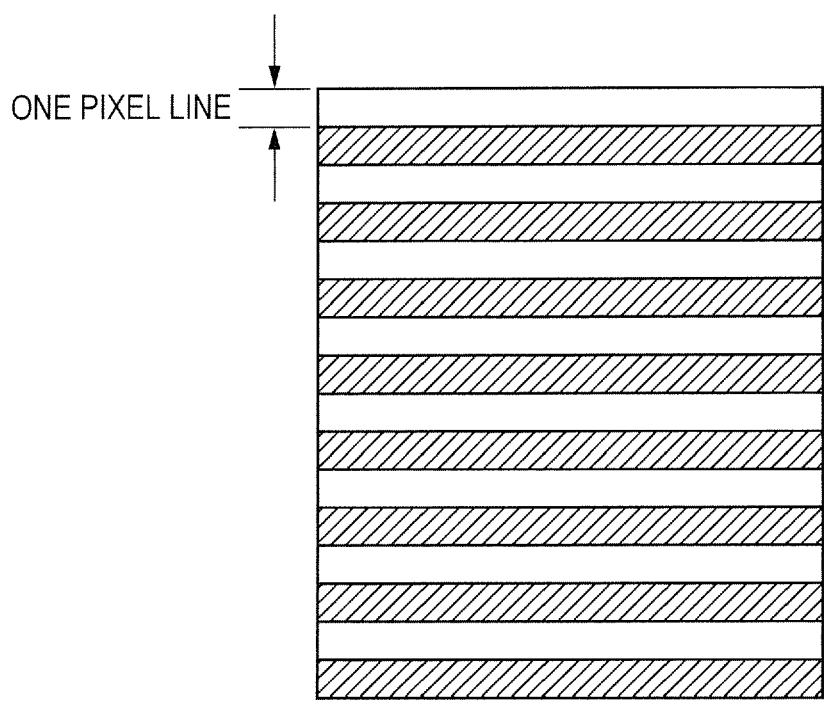
FIG. 21 is an explanatory drawing illustrating a frame structure of a picture.
Figure 22:
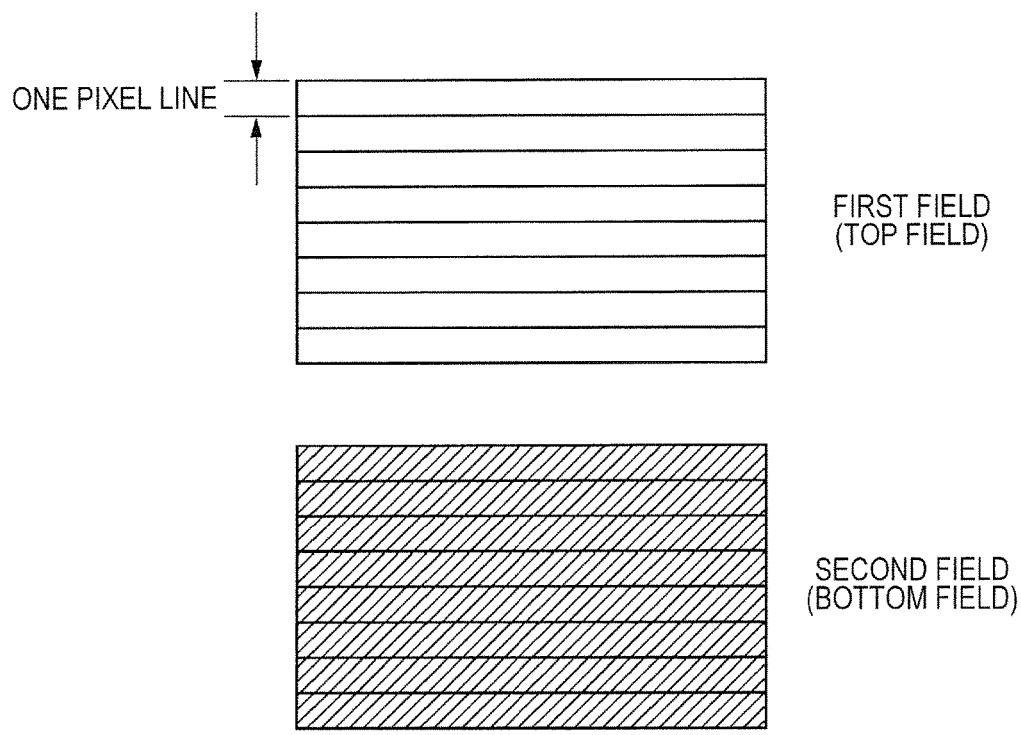
FIG. 22 is an explanatory drawing illustrating a field structure (top field first) of a picture.

FIG. 21 is an explanatory drawing illustrating the frame structure of a picture. FIGS. 22 and 23 are explanatory drawings illustrating the field structure of a picture of top field first and a picture of bottom field first, respectively.

In the frame structure illustrated in FIG. 21, all the pixel lines that compose one picture exist in the identical data structure. On the other hand, in the field structure illustrated in FIG. 22, one picture is composed of two data structures of the top field which includes only the even-numbered (0, 2, 4, . . . ) pixel lines of the frame structure, and the bottom field which includes only the odd-numbered (1, 3, 5, . . . ) pixel lines. FIG. 22 illustrates the top-field-first field structure which is composed of a top field as the first field and a bottom field as the second field. As illustrated in FIG. 23, it is also possible to define the bottom-field-first field structure which is composed of a bottom field as the first field and a top field as the second field.

Many moving picture coding standards, such as H.264 define the coding method with respect to the field structure.

The operation of the picture encoding device according to Embodiment 4 is explained. The following explains the operation of the picture encoding device illustrated in FIG. 19 when the encoding is performed so that two picture types, an I picture and a P picture, are repeated every two pictures like IPIPIP . . . .

Figure 24:
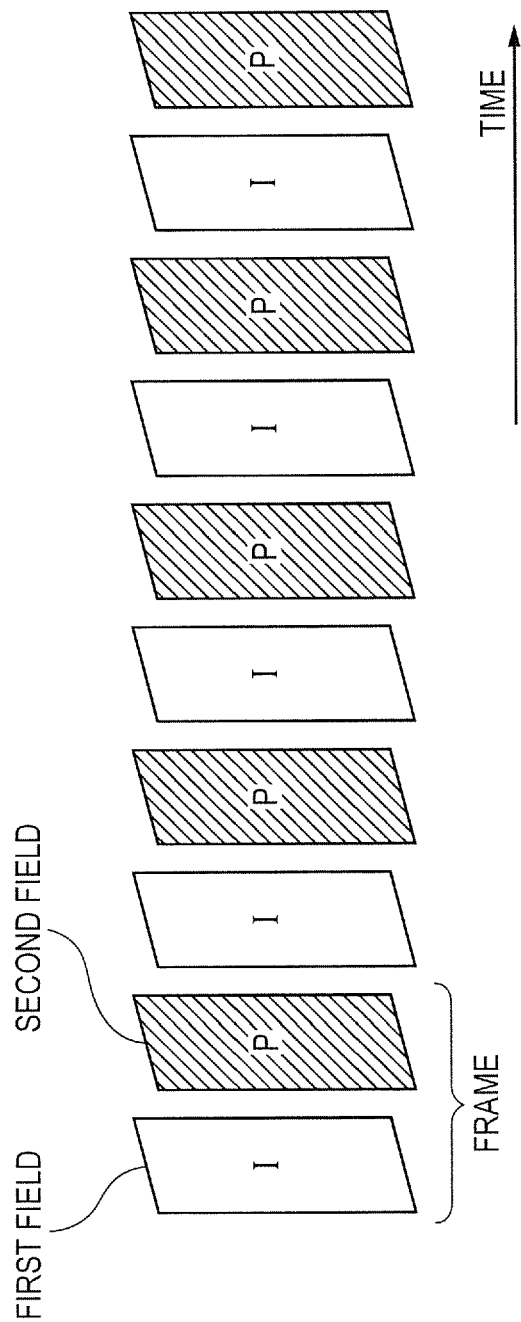
FIG. 24 is an explanatory drawing illustrating field division of a picture.

FIG. 24 is an explanatory drawing illustrating field division of a picture. The original picture of the frame structure inputted from the input-picture supply device 101 is divided into a field structure by the field divider 044, and the first field of an I picture and the second field of a P picture are encoded alternately as illustrated in FIG. 24.

The field division operation of the encoding device D (400) is explained.

In the field divider 044, the field division is performed as follows, for example. It is assumed that the input is performed line by line. The field division system depends on input form and is not necessarily restricted to the following.

(1) The pixel line inputted from the input-picture supply device 101 is stored in the input buffer 046.

(2) After 32 lines are stored in the input buffer 046, according to the parity of the line number of the pixel line, the pixel of the target MB position of an even-numbered line is stored in the first MB buffer 047, and the pixel of the target MB position of an odd-numbered line is stored in the second MB buffer 048.

(3) When 16 lines have accumulated in the first MB buffer 047, it is possible to output the pixels as the MB of the top field. Similarly, when 16 lines have accumulated in the second MB buffer 048, it is possible to output the pixels as the MB of the bottom field.

(4) When the last MB of 32 lines is outputted to the field divider 047, the 32 lines can be deleted from the input buffer 046.

Any of the top and the bottom can also be set as the first field, by changing the storage destination of the even-numbered line and the odd-numbered line.

It is considerable that without providing the input buffer 046, the field divided data are stored directly in the first MB buffer 047 and the second MB buffer 048. In the present case, the first MB buffer 047 and the second MB buffer 048 are provided with a capacity equivalent to the picture width by 16 lines at least, respectively.

The encoding operation of the encoding device D (400) is explained.

When the original picture of one frame is inputted, the encoding device D (400) divides the original picture into two fields and encodes the two fields in parallel.

In the I encoder 040, the encoding is performed as follows.

(1) The encoding target MB of the first field is inputted to the I encoder 040 from the first MB buffer 047.

(2) The I encoder 040 performs the I-picture encoding for the target MB of the first field by the intra picture prediction, and outputs a first encoded bit string to the output control device 104. Subsequently, the I encoder 040 creates a local decoded picture and stores it in the intermediate buffer 045.

After the above processing (1)-(2) is performed for all the MBs in the first field, the encoding of the first field is completed. In the P encoder 041, the encoding is performed as follows.

(3) The encoding target MB of the second field is inputted to the P encoder 041 from the second MB buffer 048.

(4) The P encoder 041 performs the P-picture encoding by the inter picture prediction from the reference region X composed of the target MB of the second field and the local decoded picture by the I encoder 040 in the intermediate buffer 045, and outputs a second encoded bit string to the output control device 104.

After the above processing (3)-(4) is performed for all the MBs in the second field, the encoding of the second field is completed.

The processing (1)-(2) by the I encoder 040 and the processing (3)-(4) by the P encoder 041 are performed for every two fields in parallel.

Next, the operation of the position controller 042 is explained.

Figure 25:
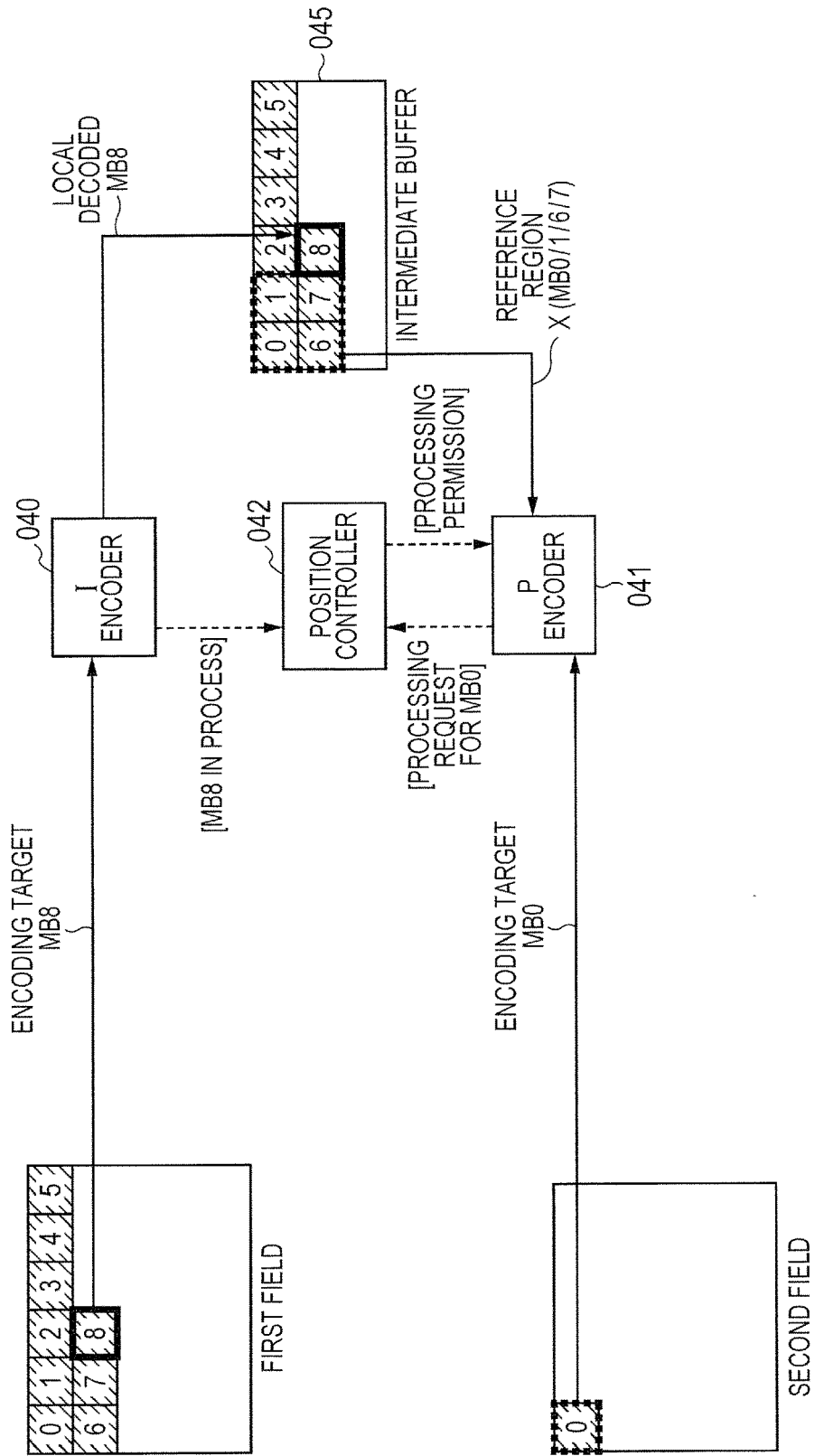
FIG. 25 is an explanatory drawing illustrating an example of control by a position controller according to Embodiment 4.

FIG. 25 is an explanatory drawing illustrating an example of control by the position controller 042 according to Embodiment 4. In the present explanation, for simplicity, as is the cases with FIG. 11, FIG. 12, and FIG. 15, a picture horizontally composed of six MBs is used, and a reference region is a 2×2 4-MB region with a starting point of the same position as the encoding target MB.

FIG. 25 illustrates the I encoder 040, the P encoder 041, the position controller 042, and the intermediate buffer 045. The first field to be inputted into the I encoder 040 and the second field to be inputted into the P encoder 041 are shown together with MBs, respectively. A hatched MB expresses an already inputted MB and a thick-framed MB expresses an encoding target MB at present.

MB0-MB7 of the first field are already inputted into the I encoder 040, the encoding is already finished, and the local-decoded MB0-MB7 are stored in the intermediate buffer 045. At present, the I encoder 040 is performing the encoding for MB8 as the target, and the information expressing "MB8 is in process" is notified to the position controller 042.

The P encoder 041 has sent "processing request for MB0" to the position controller 042, in order to perform the encoding for MB8 of the second field. The position controller 042 manages whether the data of the reference region X required by the P encoder 041 is ready, and notifies the P encoder 041 of "waiting instruction" or "processing permission." In the example illustrated in FIG. 25, the position controller 042 makes the P encoder 041 start the encoding of MB0, by notifying the "processing permission" to the P encoder 041, after the reference region X (MB0/MB1/MB6/MB7) which the P encoder 041 refers to for the encoding of MB0 is written in the intermediate buffer 045 from the I encoder 040. Upon receiving the "processing permission", the P encoder 041 starts the encoding using MB0 of the second field and (MB0/MB1/MB6/MB7) of the reference region X.

In Embodiment 4, the field divider 044 which divides the inputted original picture of one frame into two fields is provided, accordingly, it is possible to delete the input picture memory 102 and to eliminate the access to the external shared memory. Therefore, the present configuration is effective in reducing the cost of the system greatly. It is not necessary to once store the original picture in the input picture memory 102 from the input-picture supply device 101. Accordingly, the present configuration is also effective in greatly reducing the delay in the processing from input to output, as another effect. The configuration is not restricted to the one which is not provided with the input picture memory 102, however it may be provided with the input picture memory 102 as is the case with FIG. 16.

By controlling the processing position between the I encoder 040 and the P encoder 041, the capacity of the intermediate buffer 045 added to the inside of the encoding device D (400) does not require the one picture's worth of buffer amount and can be realized only with the amount of several MB lines at most. The P encoder can performs the motion prediction and motion compensation from the first field as the target of the I encoding. On the other hand, the first field and the second field are created by the division of the identical frame; therefore, it is also possible to perform the encoding assuming that "motion" is not present. That is, it is possible to consider the implementation in which no motion prediction is performed and the motion vector is always set to 0 in the P encoding. In this case, the capacity of the intermediate buffer 045 can be theoretically realized with two MBs.

Embodiment 5

Field Division in Smaller Units

Embodiment 4 illustrates the configuration in which the picture of one frame is divided into two fields and the second field refers to the first field, thereby enabling the deletion of the input picture memory 102. Embodiment 5 illustrates an example in which the field division is performed in smaller units (for example, two vertical MBs), the encoding by the interpolation processing is performed with one divided block referring to the other divided block, and multiplexing in units of divided blocks is performed to compose the encoded stream of one picture.

The entire configuration of the picture encoding device according to Embodiment 5 is the same as the configuration example illustrated in FIG. 19, and includes an input-picture supply device 101, an encoding device Ea (500), and an output control device 104. In Embodiment 5, it is not necessary to provide the input picture memory 102 as is the case with Embodiment 4, however, the configuration is not restricted to the one which is not provided with the input picture memory 102, but may be the one which is provided with the input picture memory 102 as is the case with FIG. 16.

Figure 26:
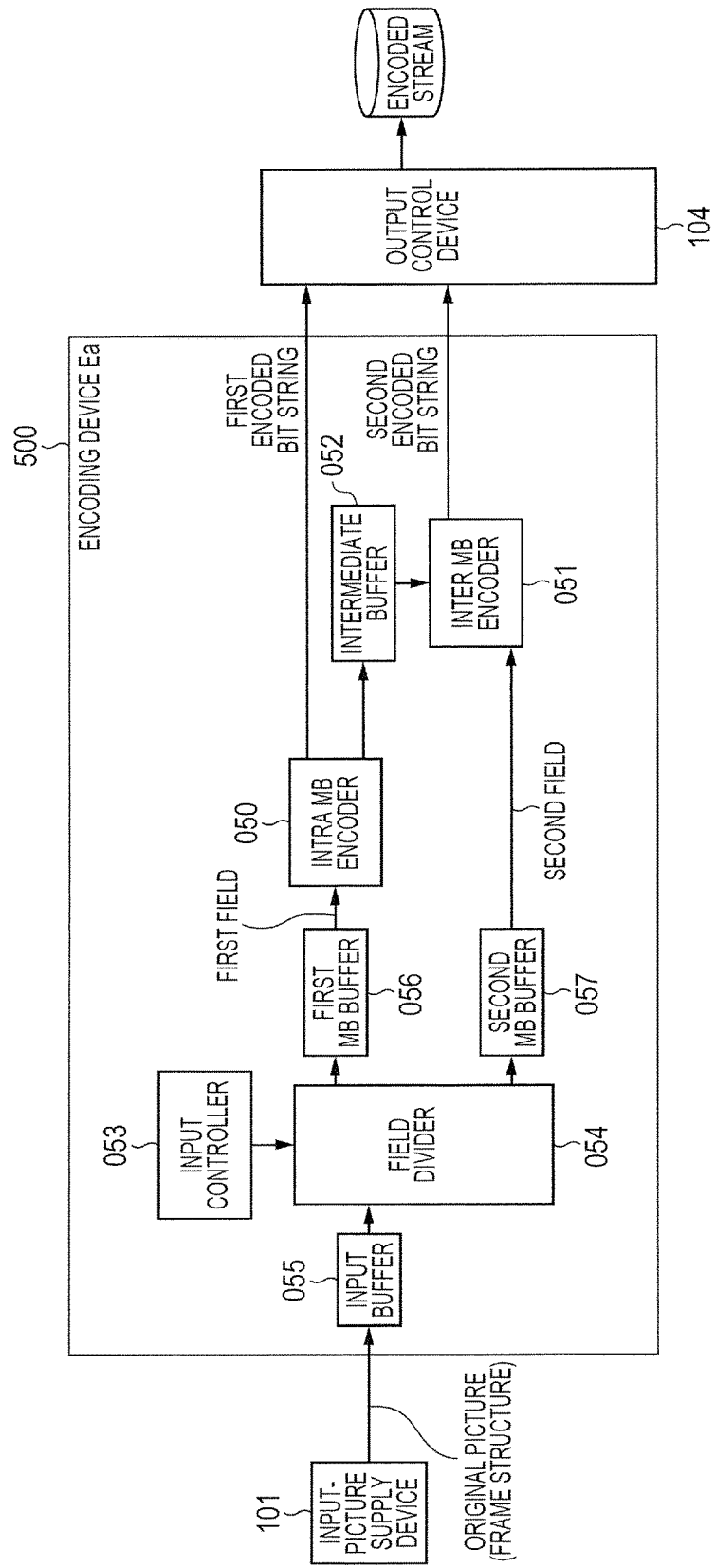
FIG. 26 is a block diagram illustrating a configuration example of a picture encoding device according to Embodiment 5.

FIG. 26 is the block diagram illustrating a configuration example of a picture encoding device according to Embodiment 5. The input-picture supply device 101 and the output control device 104 are also illustrated in the figure.

The encoding device Ea (500) is comprised of an intra MB encoder 050, an inter MB encoder 051, an input controller 053, a field divider 054, an intermediate buffer 052, an input buffer 055, a first MB buffer 056, and a second MB buffer 057. The input buffer 055 once stores the original picture of a frame structure inputted from the input-picture supply device 101. By the control of the input controller 053, the field divider 054 decomposes the original picture of the frame structure stored in the input buffer 055 into the field structure (a first field and a second field), and supplies them to either of the encoders (the intra MB encoder 050 and the inter MB encoder 051), via the first MB buffer 056 and the second MB buffer 057. The intra MB encoder 050 performs the intra picture encoding of the first field, creates a first encoded bit string, outputs it to the output control device 104, and outputs a local decoded picture as a reference picture to the intermediate buffer 052. The inter MB encoder 051 performs the inter picture encoding with reference to the local decoded picture stored in the intermediate buffer 052, creates a second encoded bit string, and outputs it to the output control device 104.

Here, a position controller is not necessary for the encoding device Ea (500). As described later, it is possible to delete the position controller by setting the unit of the field division to two MBs in the vertical positional relationship.

The operation of the encoding device Ea (500) is explained.

Figure 27:
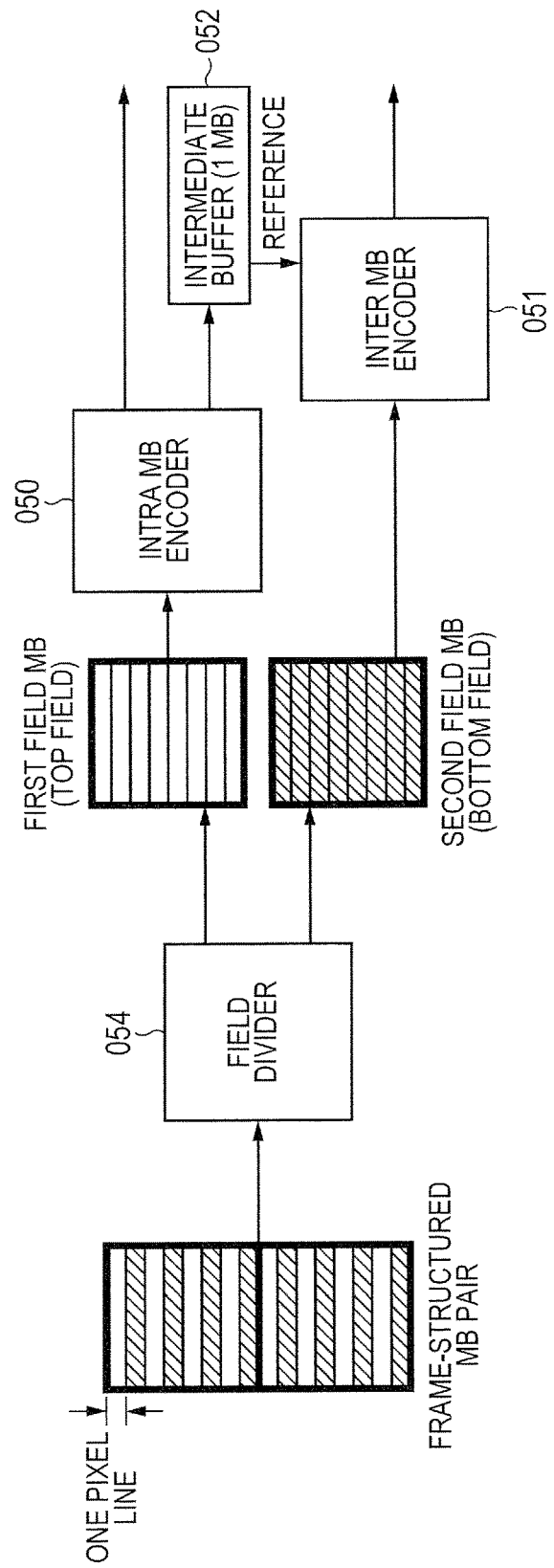
FIG. 27 is an explanatory drawing illustrating operation in encoding of a field-divided picture.

FIG. 27 is an explanatory drawing illustrating operation in encoding of a field-divided picture. The field divider 054, the intra MB encoder 050, the inter MB encoder 051, and the intermediate buffer 052 are illustrated in the figure. The MB pair of a frame structure to be inputted into the field divider 054 and the first and the second field MB which are field-divided are also illustrated. The MB pair of a frame structure to be inputted into the field divider 054 are two MBs which adjoin mutually in the vertical direction in a frame. The MB is a processing unit of the encoding by the intra MB encoder 050 and the inter MB encoder 051. The MB is comprised of plural pixel lines. The field divider 054 divides the MB pair (two vertical MBs) of a frame structure into the first field MB and the second field MB, and inputs them to the intra MB encoder 050 and the inter MB encoder 051, respectively. As an example, the first field MB is a field (top field) reconstructed only from the even-numbered (0, 2, 4, . . . ) lines of the MB pair of a frame structure, and the second field MB is a field (bottom field) reconstructed only from the odd-numbered (1, 3, 5, . . . ) lines of the MB pair of a frame structure. Their size is one MB, respectively. The intra MB encoder 050 encodes the first field MB and at the same time stores a local-decoded MB in the intermediate buffer 052. The inter MB encoder 051 encodes the second field MB by the inter picture encoding technique with the intermediate buffer 052 as the reference MB. The output control device 104 multiplexes the first encoded bit string and the second encoded bit string in units of MB, to compose and output an encoded stream.

The field division performed by the field divider 054 may be the same as the field division performed by the field divider 044 according to Embodiment 4.

The processing unit may be the unit in which the two vertical MBs are divided into two fields as described above, or may be the unit smaller than it, for example, the unit of 16×8 pixels to which one MB is divided. In the latter case, the delay for two MB lines is unnecessary within the field divider 054, and it is possible to realize lower delay and smaller buffer capacity.

In the encoding device Ea (500), the field division is performed in smaller units (for example, two vertical MBs), the encoding by the interpolation processing is performed with one divided block referring to the other divided block, and multiplexing in units of divided blocks is performed to compose the encoded stream of one picture.

Figure 28:
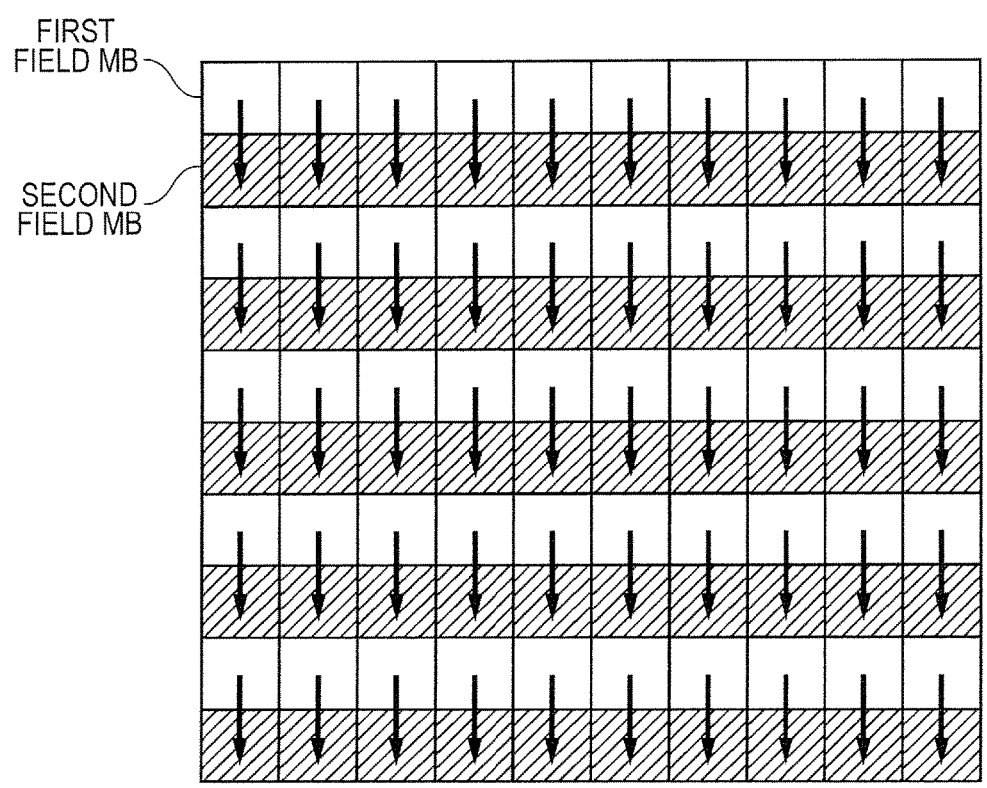
FIG. 28 is an explanatory drawing illustrating an example of the direction of field reference in encoding.

FIG. 28 is an explanatory drawing illustrating an example of the direction of field reference in encoding. The first field MB (top field), as one of the blocks divided from two vertical MBs, undergoes the intra field encoding, and the second field MB (bottom field), as the other of the blocks, undergoes the inter field encoding referring to the first field MB. The relation between the top field and the bottom field is arbitrary, and the first field MB may be the bottom field and the second field MB may be the top field. By using the present configuration example illustrated in FIG. 26, the coding method as illustrated in FIG. 28 can be realized. That is, when a block structure like MBAFF (Macroblock Adaptive Field Frame) specified by H.264 is assumed, it is possible to perform the encoding by the interpolation processing which the second field refers to the first field.

The present configuration example is effective in realizing the intra picture encoding with better encoding efficiency than the existing intra picture encoding.

Compared with Embodiment 4, the intermediate buffer 052 may have smaller capacity and the position controller is not necessary; accordingly the present configuration is effective in reducing the cost.

When the field division is performed in smaller units, for example when one MB is divided in units of 16×8 pixels, the delay for two MB lines becomes unnecessary within the field divider 054; therefore, the present configuration is effective in realizing more reduced delay and smaller buffer capacity.

A modified example of Embodiment 5 is explained. The entire configuration of the picture encoding device according to the modified example of Embodiment 5 is the same as the configuration example illustrated in FIG. 19, and includes an input-picture supply device 101, an encoding device Eb (501), and an output control device 104. In the modified example, the symbol of the encoding device is changed from Ea (500) to Eb (501).

Figure 29:
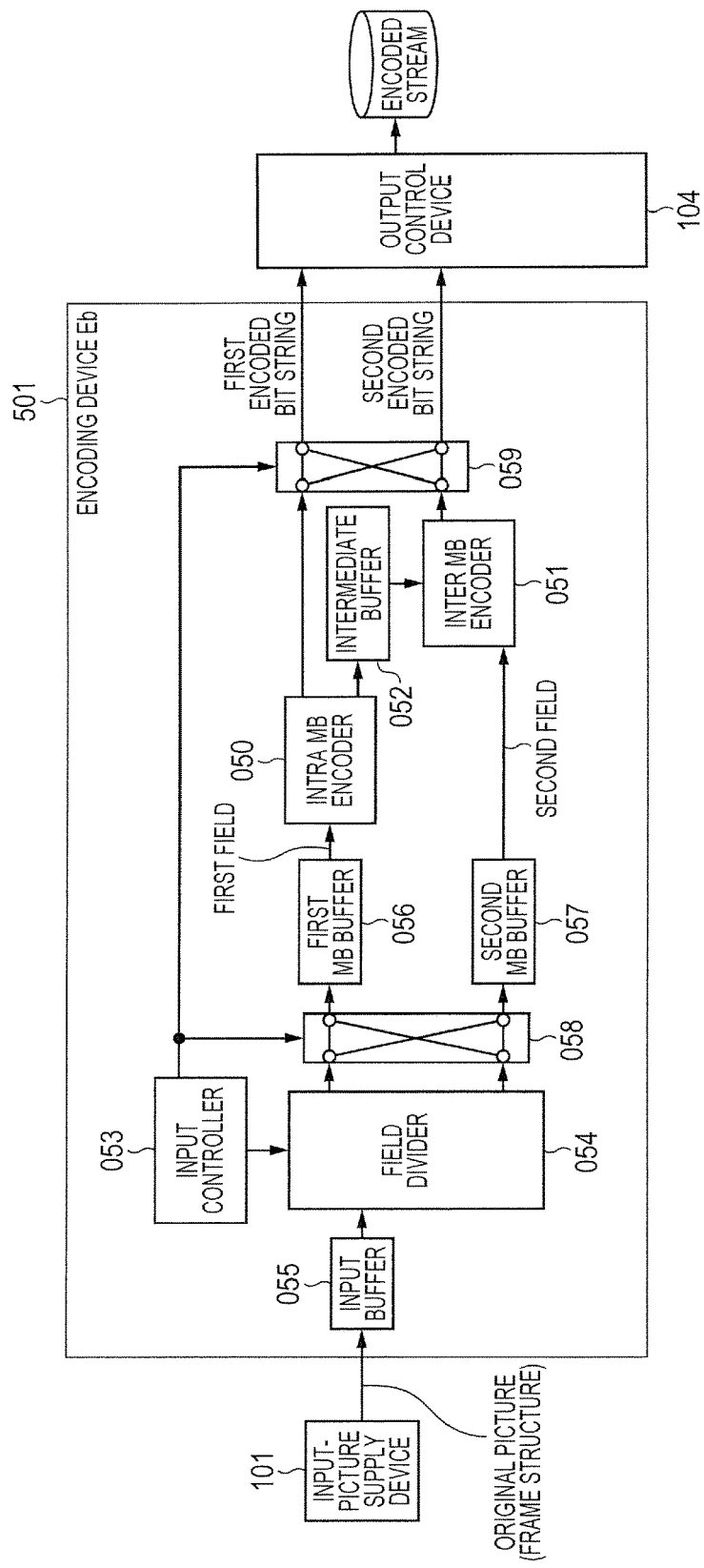
FIG. 29 is a block diagram illustrating another configuration example of the picture encoding device according to Embodiment 5.

FIG. 29 is a block diagram illustrating another configuration example of the picture encoding device according to Embodiment 5.

The encoding device Eb (501) is comprised of a switch 058 which switches the storing destination of the output of the field divider 054, and a switch 059 which switches the output destination of two encoders (050 and 051), in addition to the configuration of the encoding device Ea (500) illustrated in FIG. 26. The input controller 053 controls these switches. The other configuration is the same as that of the encoding device Ea (500) illustrated in FIG. 26, therefore, the explanation thereof is omitted.

The operation of the encoding device Eb (501) is explained.

Figure 30:
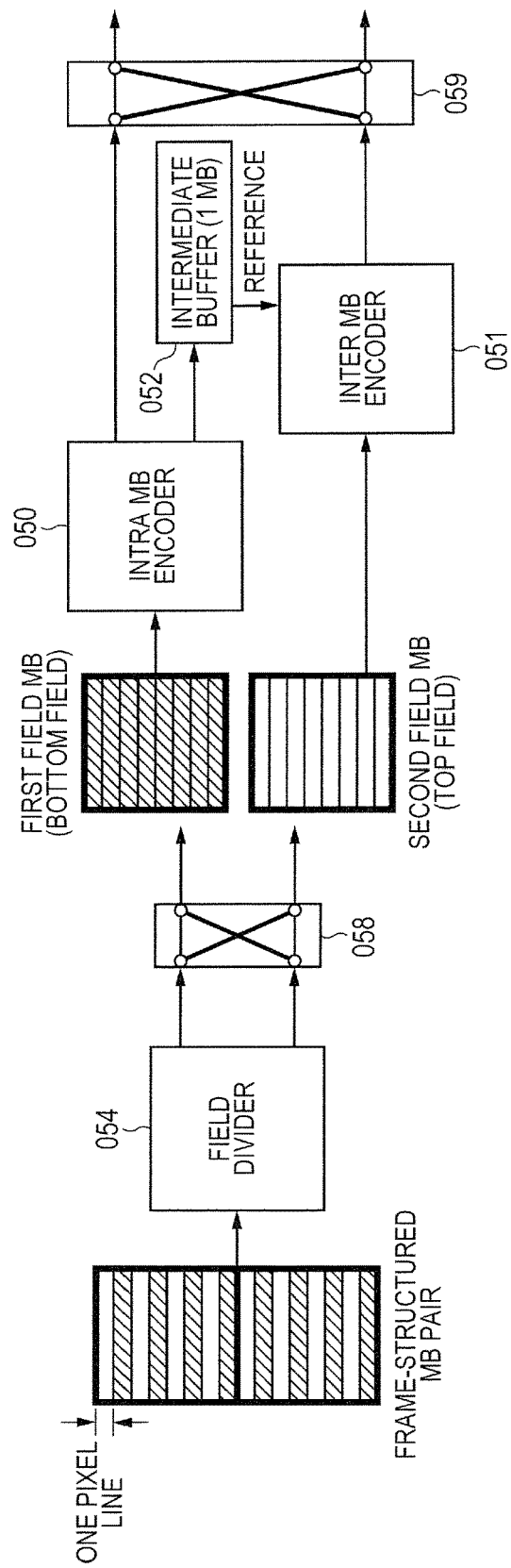
FIG. 30 is an explanatory drawing illustrating operation in encoding of a field-divided picture.

FIG. 30 is an explanatory drawing illustrating operation of the encoding device Eb (501) in the encoding of the picture after the field division. In the figure, the switch 058 and the switch 059 are added when compared with FIG. 27. The switch 058 can switch selectively between a position A and a position B. In the position A, the top field divided by the field divider 054 is fed as the first field MB and the bottom field is fed as the second field MB. Conversely, in the position B, the bottom field is fed as the first field MB and the top field is fed as the second field MB. The switch 059 can switch selectively between a position C and a position D. In the position C, the output of the intra MB encoder 050 is fed as the first encoded bit string and the output of the inter MB encoder 051 is fed as the second encoded bit string. Conversely, in the position D, the output of the intra MB encoder 050 is fed as the second encoded bit string and the output of the inter MB encoder 051 is fed as the first encoded bit string. FIG. 30 illustrates the state where the diagonal path (expressed by thick lines) of the switch 058 is chosen. In the present state, the bottom-field of the output of the field divider 054 is fed as the first field MB, and the top-field is fed as the second field MB. The bottom-field undergoes the intra field encoding and the top-field undergoes the inter field encoding, respectively. After that, the order is returned by the diagonal path (expressed by thick lines) of the switch 059.

Figure 31:
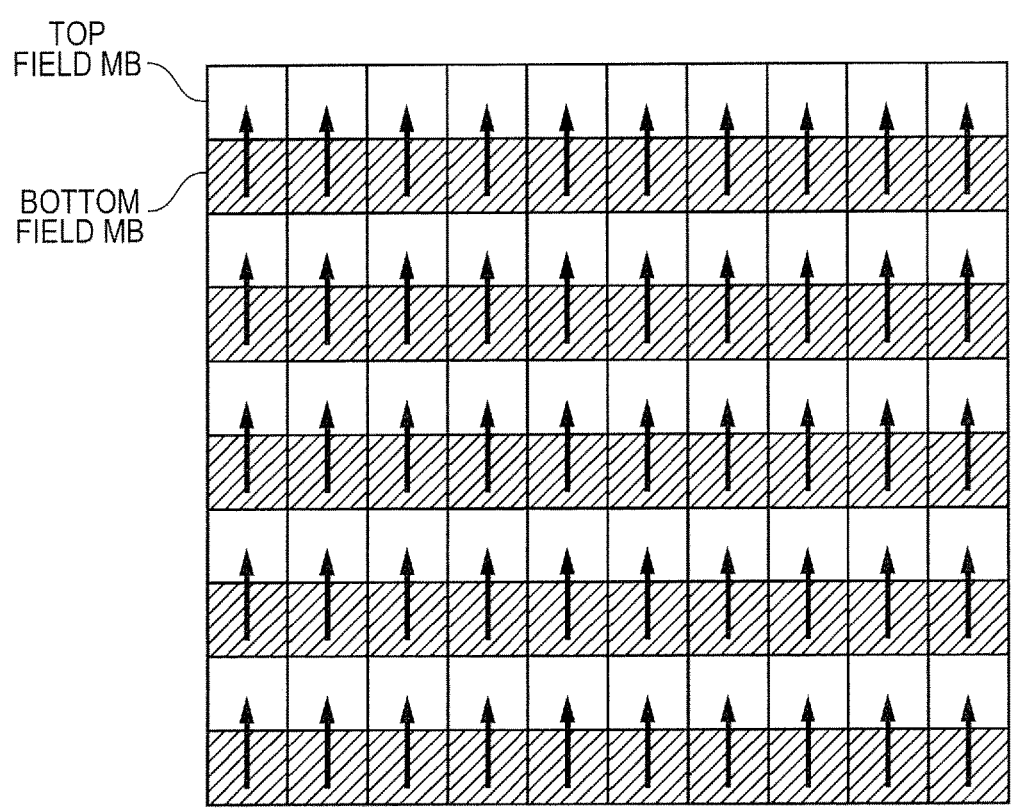
FIG. 31 is an explanatory drawing illustrating an example of the direction of field reference in encoding.

FIG. 31 is an explanatory drawing illustrating an example of the direction of field reference in encoding. Through the above procedure, it is possible to perform the reference from the bottom field MB to the top field MB as illustrated in FIG. 31.

Figure 32:
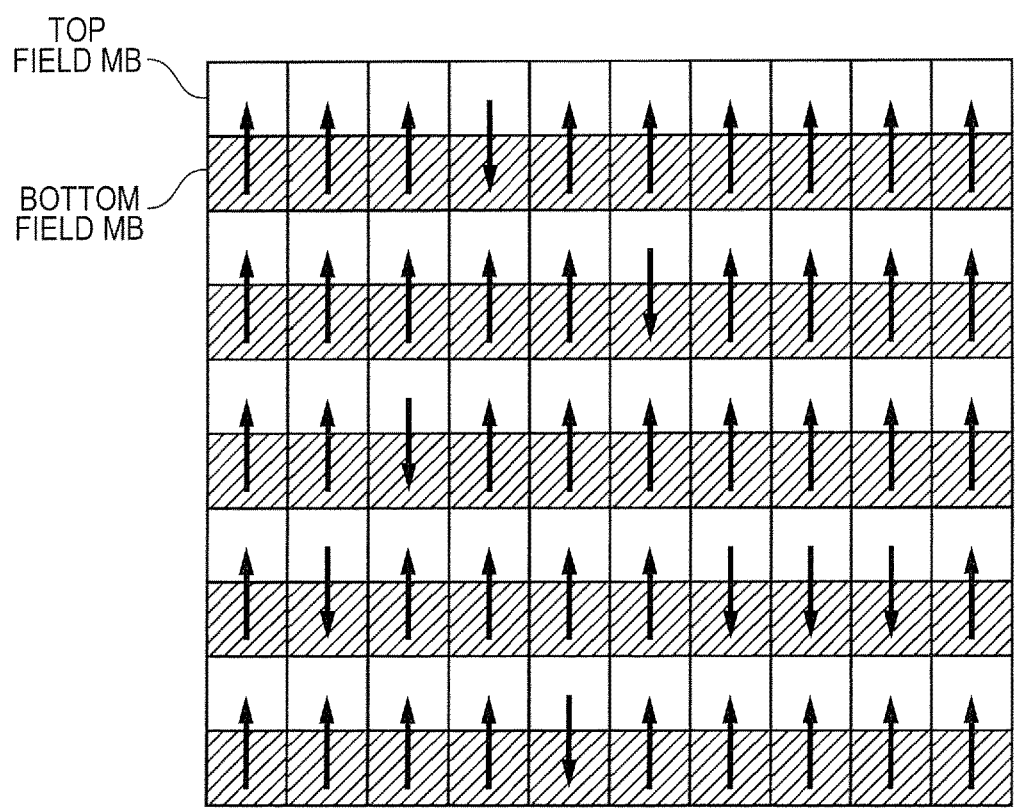
FIG. 32 is an explanatory drawing illustrating another example of the direction of field reference in encoding.

FIG. 32 is an explanatory drawing illustrating another example of the direction of field reference in encoding. By performing the switching of the switch 058 and the switch 059 adaptively, it is possible to change the reference direction adaptively, as illustrated in FIG. 32.

The output control device 104 multiplexes the first encoded bit string and the second encoded bit string in units of MB, to create and output an encoded stream. It is preferable to include the function of the switch 059 in the output control device 104.

The field division performed by the field divider 054 may be the same as the field division performed by the field divider 044 according to Embodiment 4.

The processing unit may be the unit in which the two vertical MBs are divided into two fields as described above, or may be the unit smaller than it, for example, the unit of 16×8 pixels to which one MB is divided. In the latter case, the delay for two MB lines is unnecessary within the field divider 054, and it is possible to realize lower delay and smaller buffer capacity.

As is the case with the encoding device Ea (500), the present configuration example is effective in realizing the intra picture encoding with better encoding efficiency than the existing intra picture encoding. Compared with Embodiment 4, the intermediate buffer 052 may have smaller capacity and the position controller is not necessary; accordingly the present configuration is effective in reducing the cost. When the field division is performed in smaller units, for example when one MB is divided in units of 16×8 pixels, the delay for two MB lines becomes unnecessary within the field divider 054; the present configuration is effective in realizing more reduced delay and smaller buffer capacity.

Furthermore, it is possible to change arbitrarily the reference direction between field blocks. That is, it is possible to apply the present configuration example to MBAFF specified by H.264, for example.

Embodiment 6

Division in the Vertical Direction

Embodiments 4 and 5 illustrate the configuration in which the picture of one frame is divided into two fields, each composed of the odd-numbered pixel lines or the even-numbered pixel lines, and the encoding of one field refers to the other field, thereby enabling the deletion of the input picture memory 102. However, the division may not necessarily be in the units of fields or every pixel line. Embodiment 6 illustrates the example in which a frame is divided in the vertical direction (column direction) orthogonal to the pixel line.

The entire configuration of the picture encoding device according to Embodiment 6 is the same as the configuration example illustrated in FIG. 19, and includes an input-picture supply device 101, and an encoding device F (600), and an output control device 104. In Embodiment 6, in order to distinguish from the encoding device of other embodiments, the symbol of the present encoding device is changed to F (600).

Figure 33:
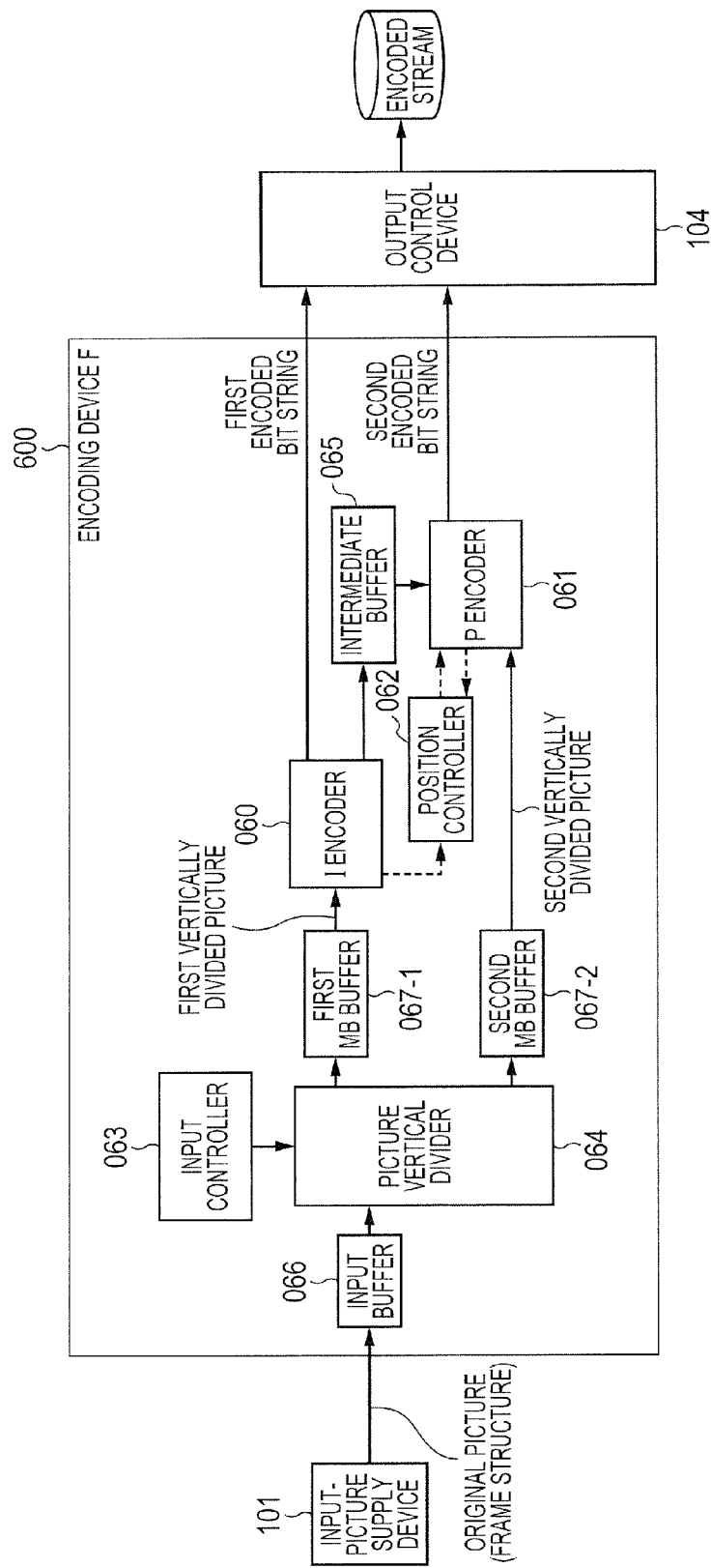
FIG. 33 is a block diagram illustrating a configuration example of a picture encoding device according to Embodiment 6.

FIG. 33 is a block diagram illustrating the configuration example of the encoding device F (600) according to Embodiment 6. The input-picture supply device 101 and the output control device 104 are also illustrated in the figure.

The encoding device F (600) is comprised of an I encoder 060, a P encoder 061, a position controller 062, an input controller 063, a picture vertical divider 064, an intermediate buffer 065, an input buffer 066, a first MB buffer 067-1, and a second MB buffer 067-2. The I encoder 060 performs the I picture encoding, creates a first encoded bit string, outputs it to the output control device 104, and outputs a local decoded picture to the intermediate buffer 065 as a reference picture. The P encoder 061 performs the P-picture encoding with reference to the local decoded picture stored in the intermediate buffer 065, creates a second encoded bit string, and outputs it to the output control device 104. The I encoder 060 and the P encoder 061 do not need to be an encoder only for the respective picture type, and both may be an I/P/B encoder.

The encoding device F (600) is different from the encoding device D (400) according to Embodiment 4 in the point that the encoding device F (600) includes, instead of the field divider 044, a picture vertical divider 064 which divides an original picture in the vertical direction and supplies it.

The division in the vertical direction (column direction) of a picture is explained.

Figure 34:
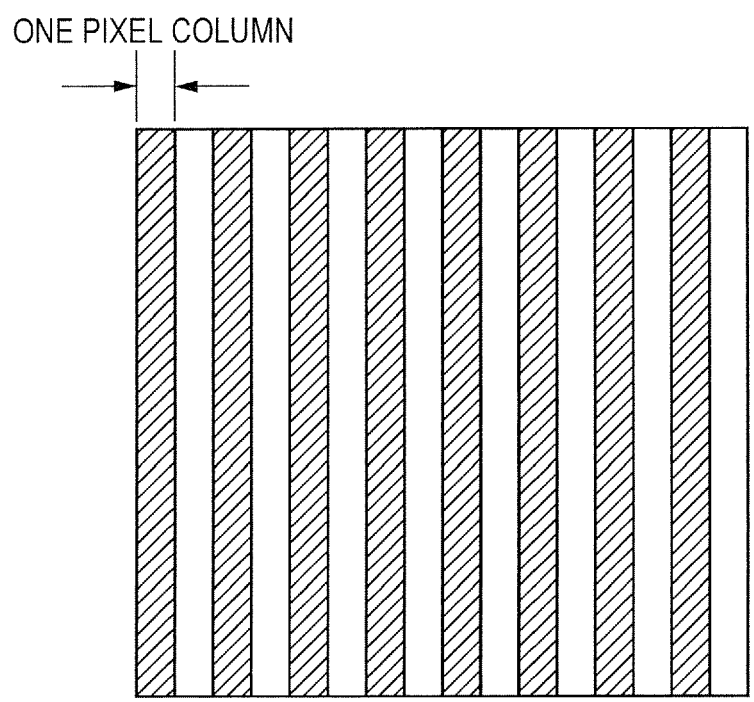
FIG. 34 is an explanatory drawing (frame structure) illustrating vertical division of a picture.

FIG. 34 and FIG. 35 are explanatory drawings of the vertical division of a picture; FIG. 34 illustrates the frame structure and FIG. 35 illustrates a vertically divided right and left column picture. In contrast to the picture of the frame structure illustrated in FIG. 34, the vertical division structure illustrated in FIG. 35 can be divided into the left column picture (the first picture) which collects the even-numbered (0, 2, 4, . . . ) columns for every vertical column, and the right column picture (the second picture) which collects the odd-numbered (1, 3, 5, . . . ) columns.

The operation of the picture encoding device F according to Embodiment 6 is explained. The following explains the operation of the picture encoding device F illustrated in FIG. 33 when the encoding is performed so that two picture types, an I picture and a P picture, are repeated every two vertically divided pictures like IPIPIP . . . .

Figure 36:
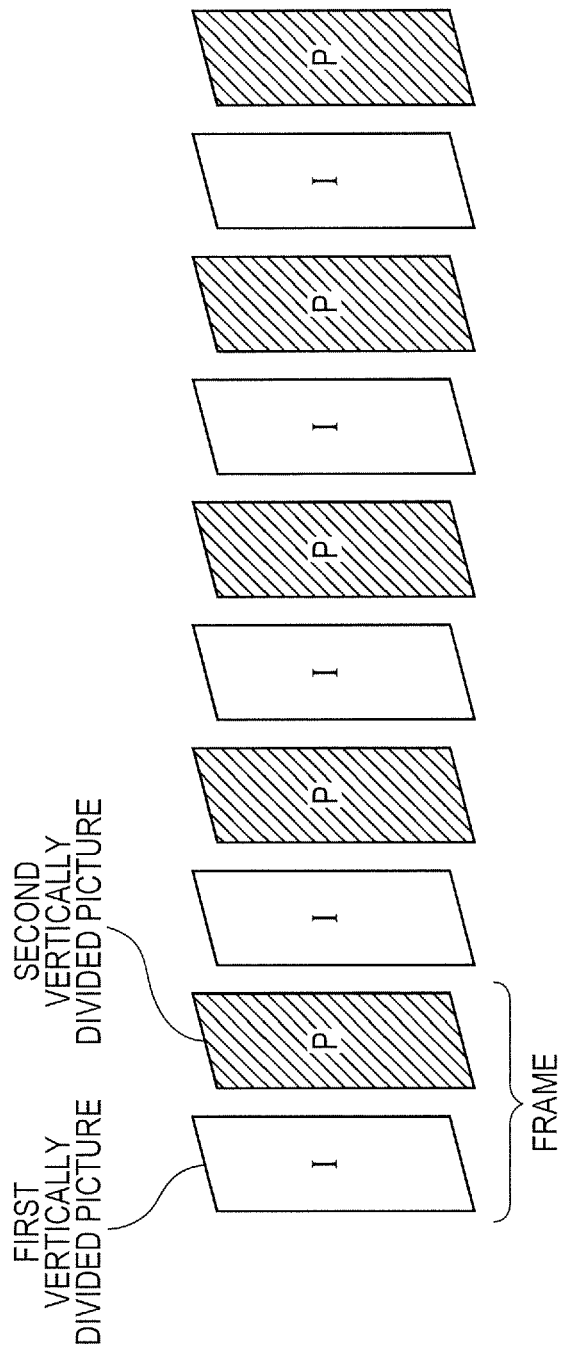
FIG. 36 is an explanatory drawing illustrating vertical division of a picture.

FIG. 36 is an explanatory drawing illustrating vertical division of a picture. The original picture of a frame structure inputted from the input-picture supply device 101 is divided into the vertical division structure by the picture vertical divider 064, and the divided original pictures are encoded alternately as the first field of an I picture and the second field of a P picture, as illustrated in FIG. 36

The field division operation of the encoding device F (600) is explained.

In the picture vertical divider 064, the vertical division of a picture is performed as follows, for example. It is assumed that the input is performed line by line. It is assumed that one MB is comprised of 16 lines. The field division system depends on input form and is not necessarily restricted to the following.

(1) The pixel line inputted from the input-picture supply device 101 is stored in the input buffer 066.

(2) After 16 lines of one MB are stored in the input buffer 066, according to the parity of the column number of the pixel, the pixel of the target MB position of an even-numbered column is stored in the first MB buffer 067-1, and the pixel of the target MB position of an odd-numbered column is stored in the second MB buffer 067-2.

(3) When 16 lines have accumulated in the first MB buffer 067-1, it is possible to output the pixels as the MB of the left column. Similarly, when 16 lines have accumulated in the second MB buffer 067-2, it is possible to output the pixels as the MB of the right column.

(4) When the last MB of 16 lines is outputted to the picture vertical divider 064, the 16 lines can be deleted from the input buffer 066.

It is possible to set any of the right column and the left column as the first vertical divided picture by changing the storage destination of the even-numbered column and the storage destination of the odd-numbered column.

It is considerable that without providing the input buffer 066, the vertically divided data are stored directly in the first MB buffer 067-1 and the second MB buffer 067-2. In this case, the first MB buffer 067-1 and the second MB buffer 067-2 have a capacity equivalent to (a picture width/2)×(16 lines) at least, respectively.

The encoding operation of the encoding device F (600) is explained.

When the original picture of one frame is inputted, the encoding device F (600) divides it into two vertically divided pictures, and performs encoding for the vertically divided pictures in parallel.

In the I encoder 060, the encoding is performed as follows.

(1) An encoding target MB of the first picture is inputted into the I encoder 060 from the first MB buffer 067-1.

(2) The I encoder 060 performs the I-picture encoding for the target MB of the first picture by the intra picture prediction, and outputs a first encoded bit string to the output control device 104. Subsequently, the I encoder 060 creates a local decoded picture and stores it in the intermediate buffer 065.

After the above processing (1)-(2) is performed for all the MBs in the first vertically divided picture, the encoding of the first vertically divided picture is completed. In the P encoder 061, the encoding is performed as follows.

(3) The encoding target MB of the second vertically divided picture is inputted to the P encoder 061 from the second MB buffer 067-2.

(4) The P encoder 061 performs the P-picture encoding by the inter picture prediction from the reference region X composed of the target MB of the second field and the local decoded picture by the I encoder 060 in the intermediate buffer 065, and outputs a second encoded bit string to the output control device 104.

After the above processing (3)-(4) is performed for all the MBs in the second vertically divided picture, the encoding of the second vertically divided picture is completed.

The processing (1)-(2) by the I encoder 060 and the processing (3)-(4) by the P encoder 061 are performed for every two vertically divided pictures in parallel.

Next, the operation of the position controller 062 is explained.

Figure 37:
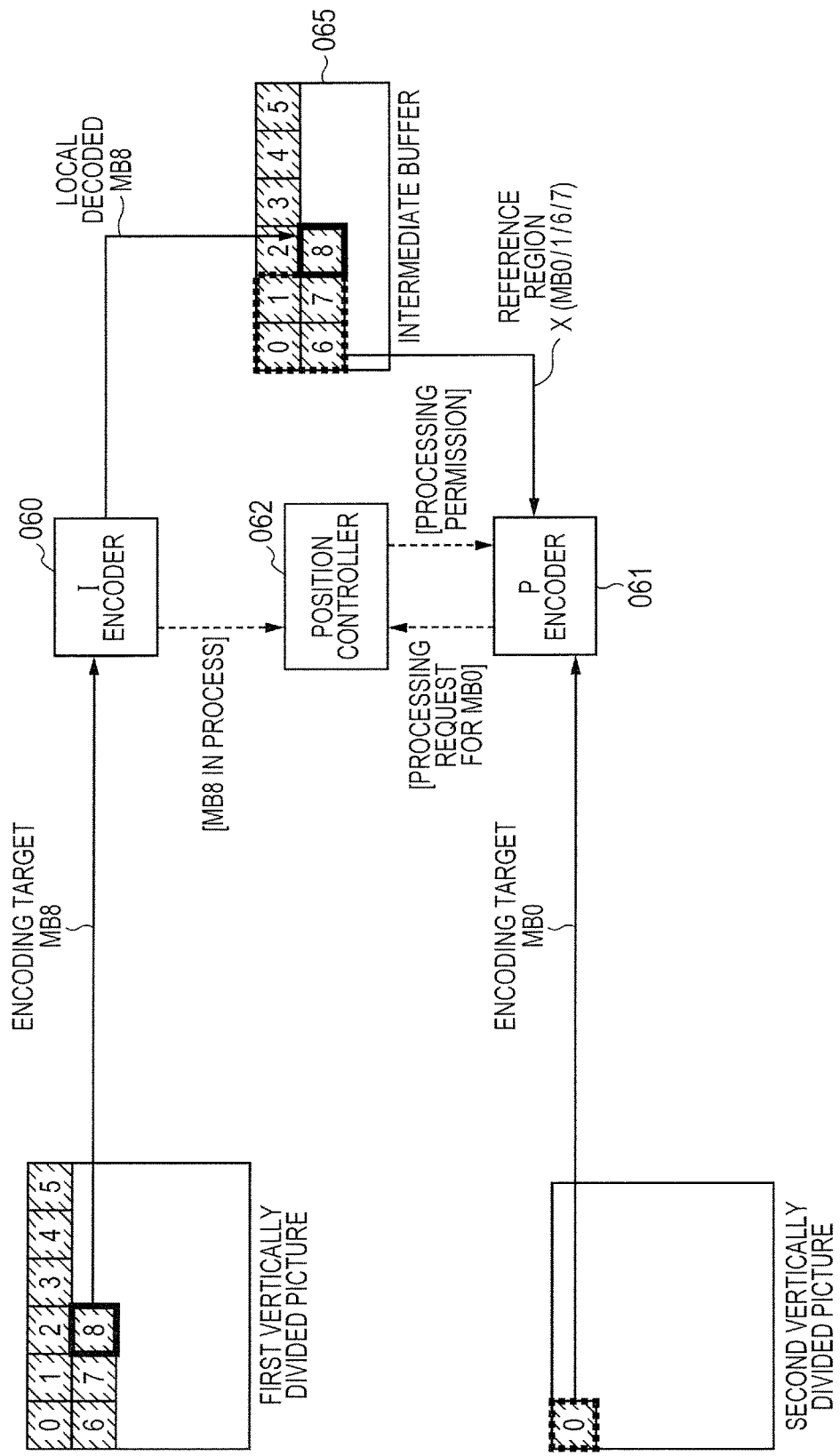
FIG. 37 is an explanatory drawing illustrating an example of control by a position controller according to Embodiment 6.

FIG. 37 is an explanatory drawing illustrating an example of control by the position controller 062 according to Embodiment 6. In the present explanation, for simplicity, as is the cases with FIG. 11, FIG. 12, and FIG. 15, a picture (vertically divided picture) horizontally composed of six MBs is used, and a reference region is a 2×2 4-MB region with a starting point of the same position as the encoding target MB.

FIG. 37 illustrates the I encoder 060, the P encoder 061, the position controller 062, and the intermediate buffer 065. The first vertically divided picture to be inputted into the I encoder 060 and the second vertically divided picture to be inputted into the P encoder 061 are shown together with MBs, respectively. A hatched MB expresses an already inputted MB and a thick-framed MB expresses an encoding target MB at present.

MB0-MB7 of the first vertically divided picture are already inputted into the I encoder 060, the encoding is already finished, and the local-decoded MB0-MB7 are stored in the intermediate buffer 065. At present, the I encoder 060 is performing the encoding for MB8 as the target, and the information expressing "MB8 is in process" is notified to the position controller 062.

The P encoder 061 has sent "processing request for MB0" to the position controller 042, in order to perform the encoding for MB8 of the second vertically divided picture. The position controller 062 manages whether the data of the reference region X required by the P encoder 061 is ready, and notifies the P encoder 061 of "waiting instruction" or "processing permission." In the example illustrated in FIG. 37, the position controller 062 makes the P encoder 061 start the encoding of MB0, by notifying the "processing permission" to the P encoder 061, after the reference region X (MB0/MB1/MB6/MB7) which the P encoder 061 refers to for the encoding of MB0 is written in the first intermediate buffer 065 from the I encoder 060. Upon receiving the "processing permission", the P encoder 061 starts the encoding using MB0 of the second vertically divided picture, and (MB0/MB1/MB6/MB7) of the reference region X.

In Embodiment 6, the picture vertical divider 064 which divides one frame of the inputted original picture into two vertically divided pictures is provided. Accordingly, it is possible to delete the input picture memory 102 and to eliminate the access to the external shared memory, as is the case with Embodiment 4. Therefore, the present configuration is effective in greatly reducing the cost of the system. It is not necessary to once store the original picture in the input picture memory 102 from the input-picture supply device 101. Accordingly, the present configuration is also effective in greatly reducing the delay in the processing from input to output. Note that the present embodiment is not restricted to the configuration which is not provided with the input picture memory 102, however, the input picture memory 102 may be provided, as is the case with FIG. 16.

In Embodiment 4, the division of a picture is completed after the input picture of two vertical MBs is inputted. On the contrary, in Embodiment 6, the picture information necessary for the division of a picture becomes completed only with the inputting of the input picture of one MB in the vertical direction. Therefore, the input buffer 046 according to Embodiment 4 requires the capacity equivalent to the number of lines of two MBs; however, in Embodiment 6, it is sufficient for the input buffer 066 of the encoding device F (600) to have the capacity equivalent to the number of lines of one MB. Therefore, the present configuration is effective in reducing not only the cost but the encoding delay. Since the picture width which each encoder processes is set to one half, the present configuration is also effective in reducing the line memories for storing the peripheral block information necessary in the encoding.

By controlling the processing position between the I encoder 060 and the P encoder 061, the capacity of the intermediate buffer 065 added to the inside of the encoding device F (600) does not require the one picture's worth of buffer amount and can be realized only with the amount of several MB lines at most. The P encoder 061 can performs the motion prediction and motion compensation from the first field as the target of the I encoding. On the other hand, the first vertically divided picture and the second vertically divided picture are created by the division of the identical frame. Therefore, it is also possible to perform the encoding assuming that "motion" is not present. That is, it is possible to consider the implementation in which no motion prediction is performed and the motion vector is always set to 0 in the P encoding. In this case, the capacity of the intermediate buffer 065 can be theoretically realized with two MBs.

<Vertical Picture Division in Smaller Units>

In the above-described configuration example, the picture of one frame is divided into two vertically divided pictures and the second vertically divided picture refers to the first vertically divided picture, thereby enabling the deletion of the input picture memory 102. In Embodiment 6, it is possible to adopt another configuration like Embodiment 5 corresponding to Embodiment 4. The following illustrates another example of configuration in which the vertical picture division is performed in smaller units (for example, two horizontal MBs), the encoding by the interpolation processing is performed with one divided block referring to the other divided block, and multiplexing in units of divided blocks is performed to compose the encoded stream of one picture.

The entire configuration of the picture encoding device according to the present configuration is the same as the configuration example illustrated in FIG. 19, and includes an input-picture supply device 101, an encoding device Fa (601), and an output control device 104. In the present configuration example, it is not necessary to provide the input picture memory 102 as is the case with the configuration example illustrated in FIG. 33. However, the present configuration is not restricted to the configuration in which the input picture memory 102 is not provided, however, it may adopt a configuration in which the input picture memory 102 is provided as illustrated in FIG. 16.

Figure 38:
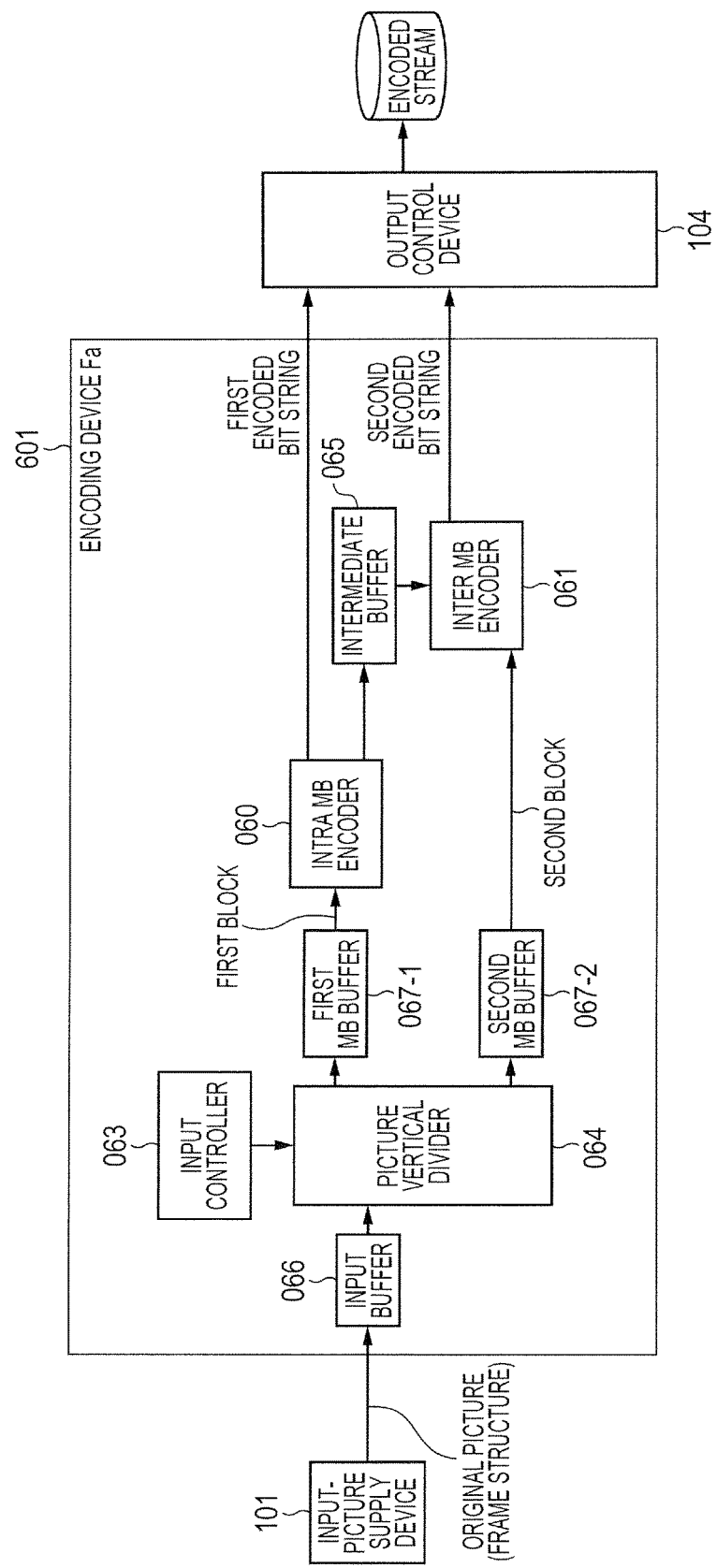
FIG. 38 is a block diagram illustrating another configuration example of the picture encoding device according to Embodiment 6.

FIG. 38 is a block diagram illustrating the encoding device Fa (601) as another configuration example of Embodiment 6. The input-picture supply device 101 and the output control device 104 are also illustrated in the figure.

The encoding device Fa (601) is comprised of an intra MB encoder 060, an inter MB encoder 061, an input controller 063, a picture vertical divider 064, an intermediate buffer 065, an input buffer 066, a first MB buffer 067-1, and a second MB buffer 067-2. The input buffer 066 once stores the original picture of a frame structure inputted from the input-picture supply device 101. By the control of the input controller 063, the picture vertical divider 064 divides, in the column direction (vertical direction), the original picture of the frame structure stored at the input buffer 066 into a first block and a second block, and supplies them to either of the encoders (the intra MB encoder 060 and the inter MB encoder 061), via the first MB buffer 067-1 and the second MB buffer 067-2. The intra MB encoder 060 performs the intra picture encoding of the first block, creates a first encoded bit string, outputs it to the output control device 104, and outputs a local decoded picture as a reference picture to the intermediate buffer 065. The inter MB encoder 061 performs the inter picture encoding with reference to the local decoded picture stored in the intermediate buffer 065, creates a second encoded bit string, and outputs it to the output control device 104.

The division in the vertical direction (column direction) of a picture is the same as the above-described explanation, the frame structure is as illustrated in FIG. 34, and the right column picture and the left column picture after the vertical division are those illustrated in FIG. 35.

Figure 39:
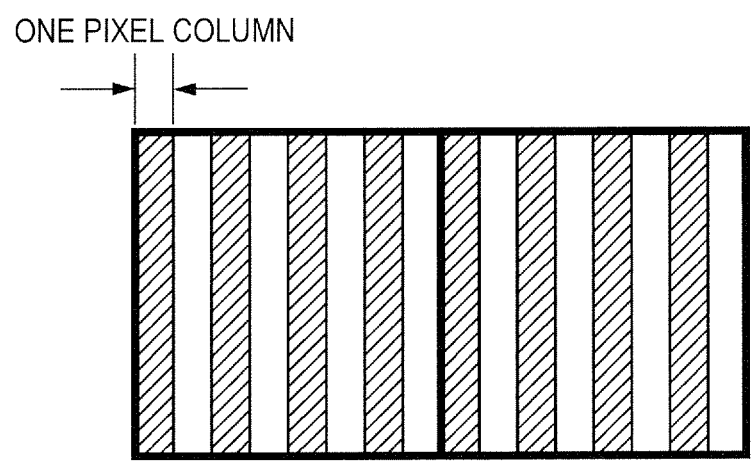
FIG. 39 is an explanatory drawing illustrating vertical division of a picture (macroblock pair)
Figure 40:
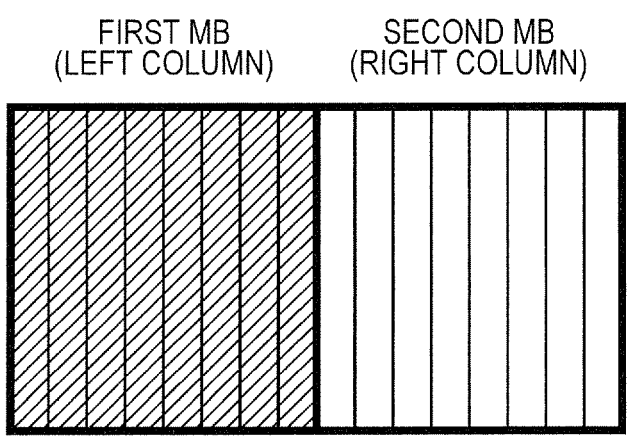
FIG. 40 is an explanatory drawing illustrating vertical division of a picture (the vertically divided macroblock pair)

FIG. 39 and FIG. 40 are explanatory drawings illustrating the case where the similar vertical division of a picture is performed in units of MB. FIG. 39 illustrates the MB pair of a frame structure, and FIG. 40 illustrates the MB pair of the vertical division structure. The MB pair of the frame structure is two MBs, each as the unit of encoding, adjoining in the horizontal direction as illustrated in FIG. 39. The vertical division structure MB pair illustrated in FIG. 40 can be divided into the left column (the first MB) which collects the even-numbered columns for every vertical column, and the right column (the second MB) which collects the odd-numbered columns. Here, as illustrated in FIG. 39 and FIG. 40, by setting the unit of the vertical division of a picture as two MBs which are aligned horizontally, it is possible to delete the position controller in the encoding device. The encoding device Fa (601) illustrated in FIG. 38 adopts the present division method to delete the position controller.

The operation of the encoding device Fa (601) is explained.

Figure 41:
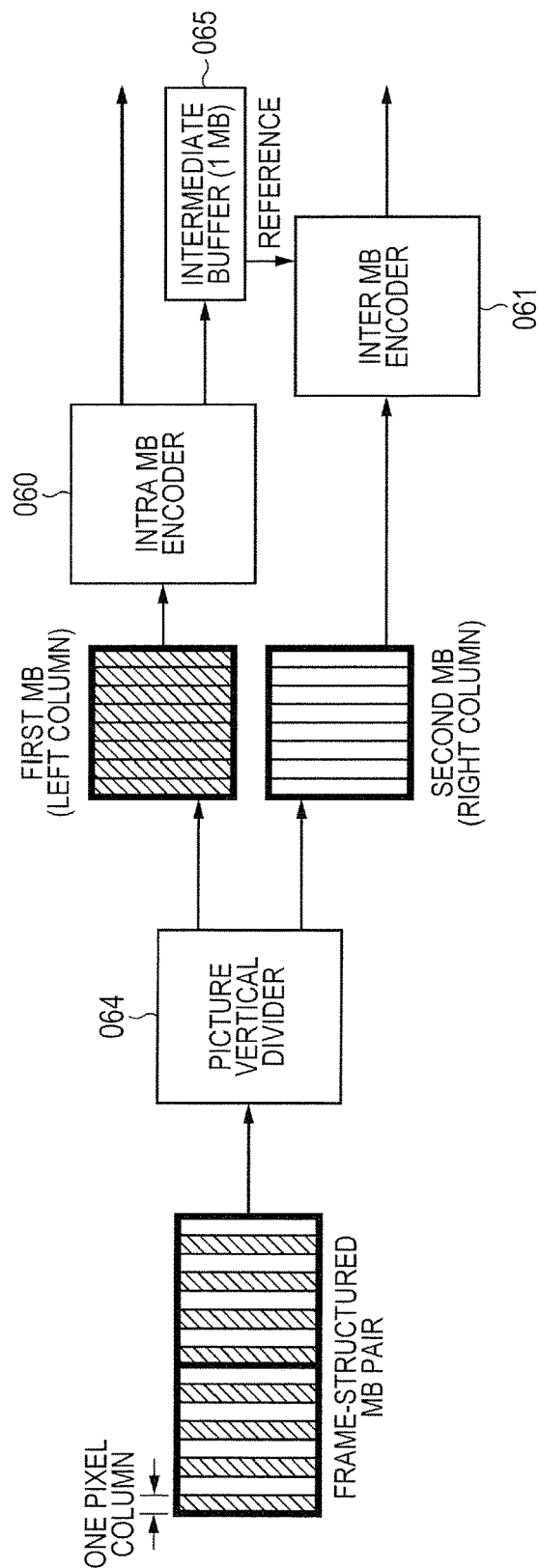
FIG. 41 is an explanatory drawing illustrating operation in encoding of a vertically divided picture.

FIG. 41 is an explanatory drawing illustrating operation in encoding of a vertically divided picture. The figure illustrates the picture vertical divider 064, the intra MB encoder 060, the inter MB encoder 061, and the intermediate buffer 065. The figure also illustrates the MB pair of a frame structure inputted into the picture vertical divider 064, and the first MB and the second MB after the vertical division. The MB pairs of a frame structure inputted into the picture vertical divider 064 are two MBs which adjoin mutually in the horizontal (lateral) direction in a frame. The MB is a processing unit of the encoding by the intra MB encoder 060 and the inter MB encoder 061. The MB is composed of plural pixel columns. The picture vertical divider 064 divides the MB pair (two horizontal MBs) of a frame structure into the first MB and the second MB, and inputs them into the intra MB encoder 060 and the inter MB encoder 061, respectively. The first MB is the left column block reconstructed only from the even-numbered columns of the MB pair of a frame structure, for example, and the second MB is the right column block reconstructed only from the odd-numbered columns of the MB pair of a frame structure, for example. Their size is one MB, respectively. The intra MB encoder 060 encodes the first MB and at the same time stores a local-decoded MB in the intermediate buffer 065. The inter MB encoder 061 encodes the second MB by the inter picture encoding technique with the intermediate buffer 065 as the reference MB. The output control device 104 multiplexes the first encoded bit string and the second encoded bit string in units of MB, to compose and output an encoded stream.

The vertical division operation of a picture by the encoding device Fa (601) is explained.

In the picture vertical divider 064, the vertical division of a picture is performed as follows, for example. It is assumed that the input is performed line by line. It is assumed that one MB is comprised of 16 lines. The field division system depends on input form and is not necessarily restricted to the following.

(1) The pixel line inputted from the input-picture supply device 101 is stored in the input buffer 066.

(2) After 16 lines of one MB are stored in the input buffer 066, according to the parity of the column number of the pixel, the pixel of the target MB position of an even-numbered column is stored in the first MB buffer 067-1, and the pixel of the target MB position of an odd-numbered column is stored in the second MB buffer 067-2.

(3) When 16 lines have accumulated in the first MB buffer 067-1, it is possible to output the pixels as the MB of the left column. Similarly, when 16 lines have accumulated in the second MB buffer 067-2, it is possible to output the pixels as the MB of the right column.

(4) When the last MB of 16 lines is outputted to the picture vertical divider 064, the 16 lines can be deleted from the input buffer 066.

The processing unit may be the unit in which the two horizontal MBs are divided into the first MB and the second MB for every right and left column, or may be the unit smaller than it, for example, the unit of 8×16 pixels to which one MB is divided.

In the encoding device Fa (601) according to the present configuration example, a picture is divided vertically, and the encoding of one of the divided blocks is performed by the interpolation processing with reference to a reference picture created by the encoding of the other of the divided blocks.

The present configuration example is effective in realizing the intra picture encoding with better encoding efficiency than the existing intra picture encoding. In addition, compared with the encoding device F (600) illustrated in FIG. 33, the intermediate buffer 062 may have smaller capacity and the position controller is not necessary; accordingly the present configuration is effective in reducing the cost. Since the picture width is set to one half, the present configuration is also effective in reducing the line memories for storing the peripheral block information necessary in the encoding.

In Embodiment 5, the division of a picture is completed after the input picture of two vertical MBs is inputted. On the contrary, in the present configuration example, the picture information necessary for the division of a picture becomes completed only with the inputting of the input picture of one MB in the vertical direction. Therefore, the input buffer 055 according to Embodiment 5 requires the capacity equivalent to the number of lines of two MBs; however, in the present configuration example, for the input buffer 066 of the encoding device Fa (601), the number of lines of one MB is sufficient. Therefore, the present configuration is effective in reducing not only the cost but the encoding delay.

Further another modified example is explained. The entire configuration of the picture encoding device according to the present modified example is the same as the configuration example illustrated in FIG. 19, and includes an input-picture supply device 101, and an encoding device Fb (602), and an output control device 104. In the present modified example, the symbol of the encoding device is changed from Fa (601) to Fb (602).

Figure 42:
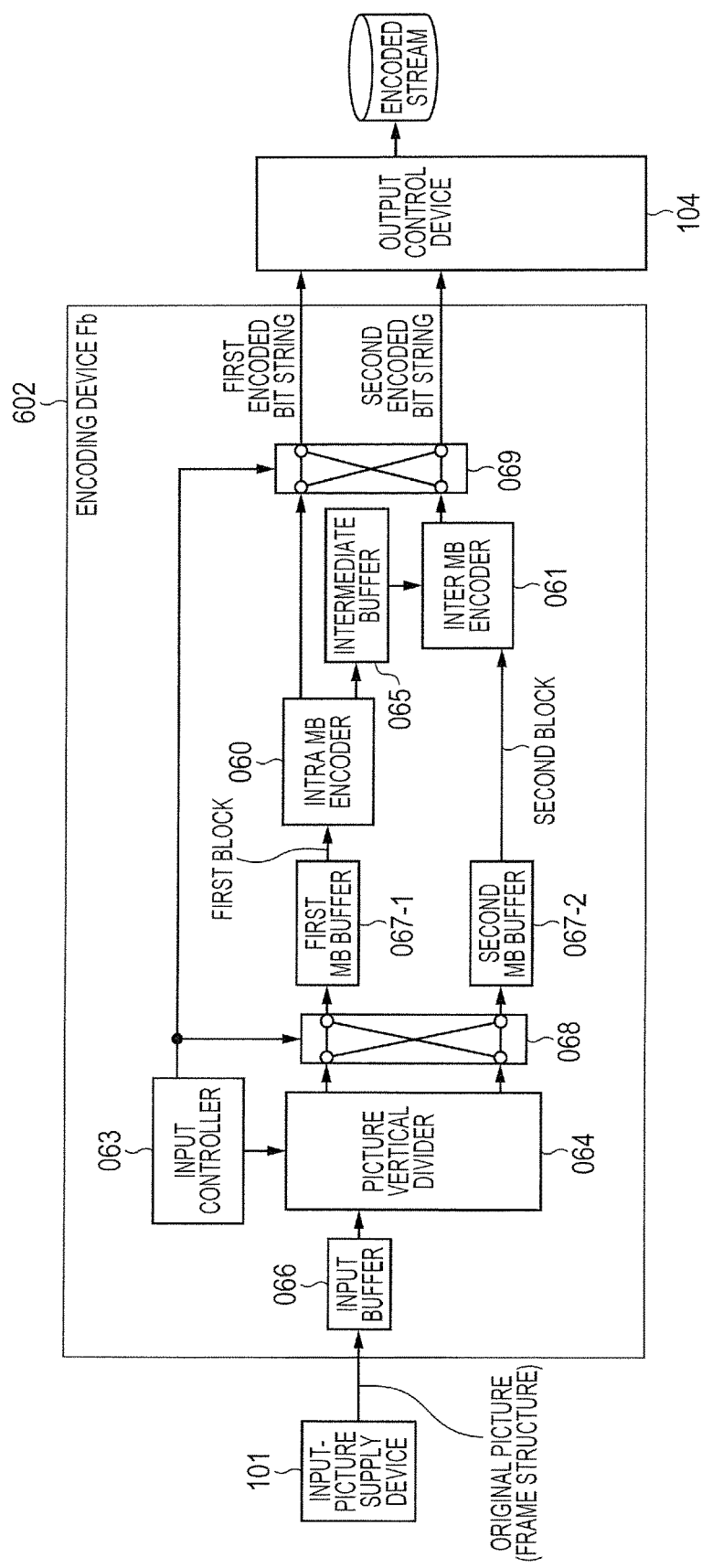
FIG. 42 is a block diagram illustrating further another configuration example of the picture encoding device according to Embodiment 5.

FIG. 42 is a block diagram illustrating further another configuration example of the picture encoding device according to Embodiment 6.

The encoding device Fb (602) is comprised of a switch 068 which switches the storing destination of the output of the picture vertical divider 064, and a switch 069 which switches the output destination of two encoders (060 and 061), in addition to the configuration of the encoding device Fa (601) illustrated in FIG. 38. The input controller 063 controls these switches. The other configuration is the same as that of the encoding device Fa (601) illustrated in FIG. 38; therefore, the explanation thereof is omitted.

The operation of the encoding device Fb (602) is explained. In the encoding device Fa (601), one of the left column MB and the right column MB is inputted into one of the intra MB encoder 060 and the inter MB encoder 061, and the reference direction in which the encoding of one side refers to a local decoded picture of the other side is fixed. On the contrary, in the encoding device Fb (602), it is possible to reverse the reference direction or to change it adaptively for every two MBs. In the encoding device Fb (602), the change of the reference direction is enabled with the added switches 068 and 069. The switch 068 can switch selectively between a position A and a position B. In the position A, the left column MB divided by the picture vertical divider 064 is fed as the first MB and the right column MB is fed as the second MB. Conversely, in the position B, the right column MB is fed as the first MB and the left column MB is fed as the second MB. The switch 069 can switch selectively between a position C and a position D. In the position C, the output of the intra MB encoder 060 is fed as the first encoded bit string and the output of the inter MB encoder 061 is fed as the second encoded bit string. Conversely, in the position D, the output of the intra MB encoder 060 is fed as the second encoded bit string and the output of the inter MB encoder 061 is fed as the first encoded bit string.

Figure 43:
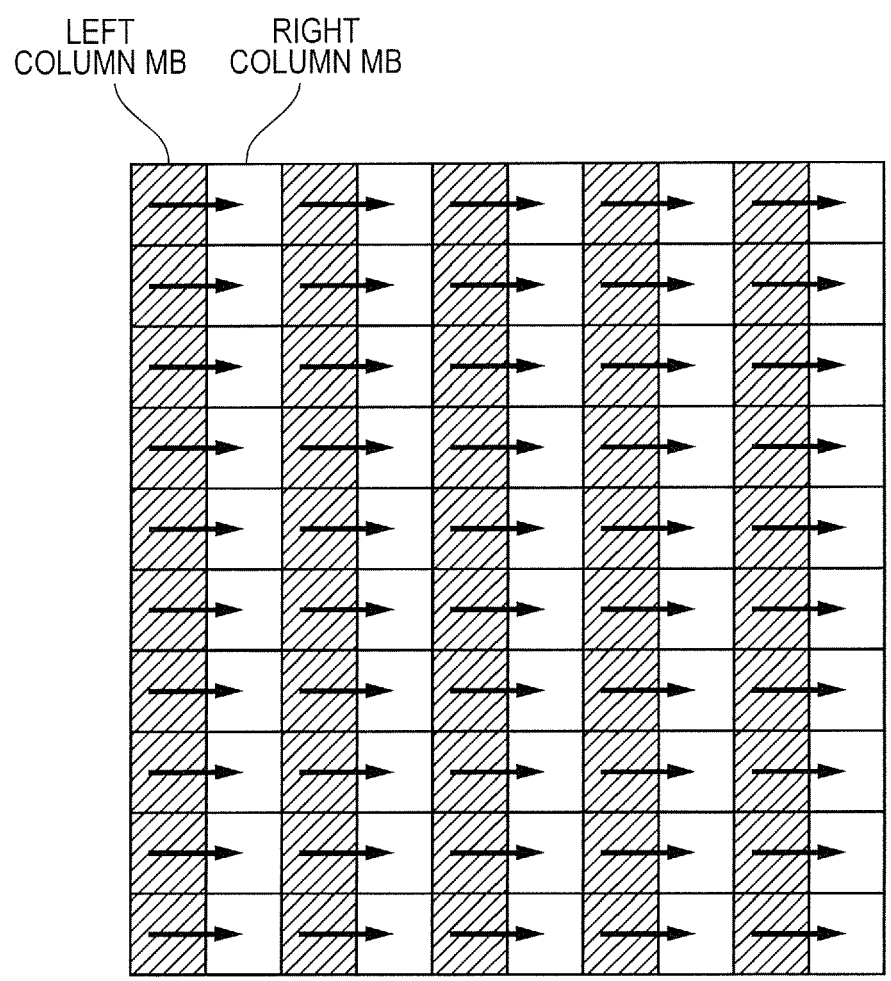
FIG. 43 is an explanatory drawing illustrating an example of the reference direction in encoding of a vertically divided picture.
Figure 44:
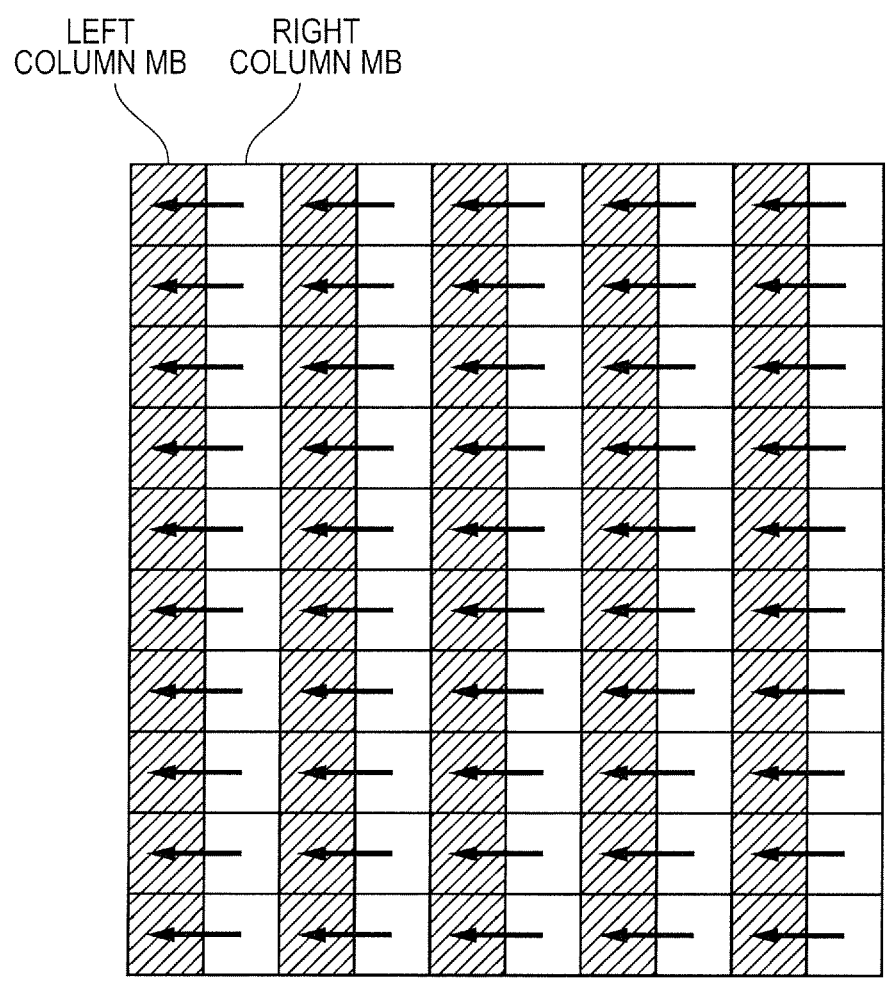
FIG. 44 is an explanatory drawing illustrating another example of the reference direction in encoding of a vertically divided picture.
Figure 45:
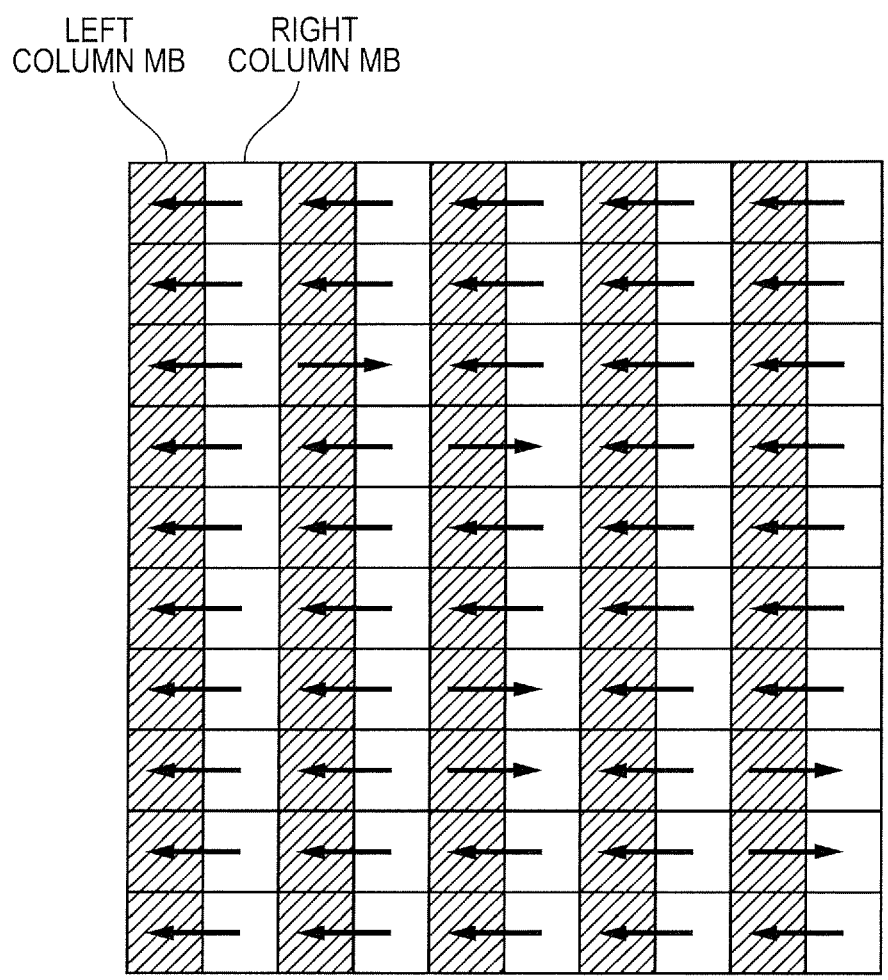
FIG. 45 is an explanatory drawing illustrating an example of the reference direction suitably changed in encoding of a vertically divided picture.

FIG. 43-FIG. 45 are explanatory drawings illustrating examples of the reference direction in encoding of a vertically divided picture. FIG. 43 illustrates a typical example in which the left column MB is fed as the first MB and is encoded by the intra MB encoder 060, and the right column MB is fed as the second MB and is encoded by the inter MB encoder 061 with reference to the local decoded picture of the left column MB. FIG. 44 illustrates an example in which the local decoded picture of the right column MB is conversely referred to in the encoding of the left column MB. FIG. 45 illustrates an example in which the reference direction is switched adaptively every two MBs.

As is the case with the encoding device Fa (601), the encoding device Fb (602) divides a picture vertically and performs the encoding of one of the divided blocks by the interpolation processing, with reference to a reference picture created by the encoding of the other of the divided blocks. The present configuration example is effective as well in realizing the intra picture encoding with better encoding efficiency than the existing intra picture encoding. Compared with the encoding device F (600) illustrated in FIG. 33, the intermediate buffer 065 may have smaller capacity and the position controller is not necessary; accordingly the present configuration is effective in reducing the cost. Since the picture width is set to one half, the present configuration is also effective in reducing the line memories for storing the peripheral block information necessary in the encoding. This point is also the same as that of the encoding device Fa (601).

Furthermore, by adopting the configuration of the encoding device Fb (602), it is possible to realize the coding method which switches the reference direction adaptively every two MBs as described above. That is, when assuming a block structure in which the MBAFF specified by H.264 is transposed horizontal to vertical, the encoding by the interpolation processing is performed with the reference from the right column MB to the left column MB (FIG. 43). It is also possible to perform the encoding with reference from the left column MB to the right column MB (FIG. 44), and it is furthermore possible that both directions of reference coexist in a picture (FIG. 45).

Embodiment 7

Multi-View Coding

Figure 46:
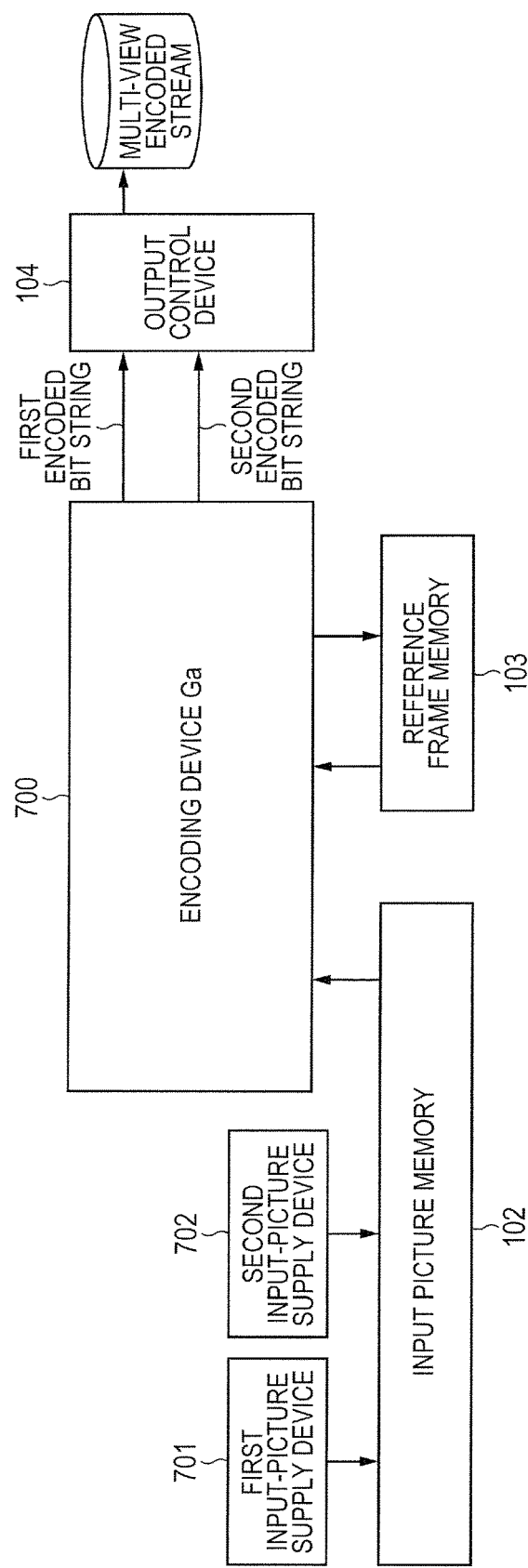
FIG. 46 is a block diagram illustrating an example of the entire configuration of a picture encoding device according to Embodiment 7.

FIG. 46 is a block diagram illustrating an example of the entire configuration of a picture encoding device according to Embodiment 7. FIG. 46 is an example in which the configuration of Embodiment 1 is applied to the multi-view coding method.

The entire configuration of the picture encoding device according to Embodiment 7 includes a first input-picture supply device 701 which supplies an original picture of a first view, a second input-picture supply device 702 which supplies an original picture of a second eye, an input picture memory 102, an encoding device Ga (700), a reference frame memory 103, and an output control device 104. The first input-picture supply device 701 and the second input-picture supply device 702 supply the multi-view original picture as an encoding target, and are exemplified by an imaging device, such as a multi-view camera used for an on-vehicle around view monitor. The input picture memory 102 stores the original picture supplied from the first input-picture supply device 701 and the second input-picture supply device 702. The reference frame memory 103 stores a reference picture, such as a local decoded picture. Although the input picture memory 102 and the reference frame memory 103 are shown as a separate memory in the figure, they may be implemented as one memory. For example, by the address mapping scheme, they may be implemented in an external SDRAM which is shared by the whole system. The encoding device Ga (700) encodes the original picture as an encoding target in conformity with a specified multi-view coding method. In accordance with the unit of the encoding and the order of the encoding, an original picture is read from the input picture memory 102 and encoded. Reference pictures, such as a local decoded picture created in the process, are stored in the reference frame memory 103. A reference picture necessary in the process of the encoding is read from the reference frame memory 103 for reference. The encoding device Ga (700) outputs multiple encoded bit strings as a result of the encoding, and the output control device 104 creates a multi-view encoded stream from these encoded bit strings. FIG. 46 illustrates the first encoded bit string and the second encoded bit string; however, it is preferable to adopt the configuration in which more encoded bit strings are created and outputted.

Figure 47:
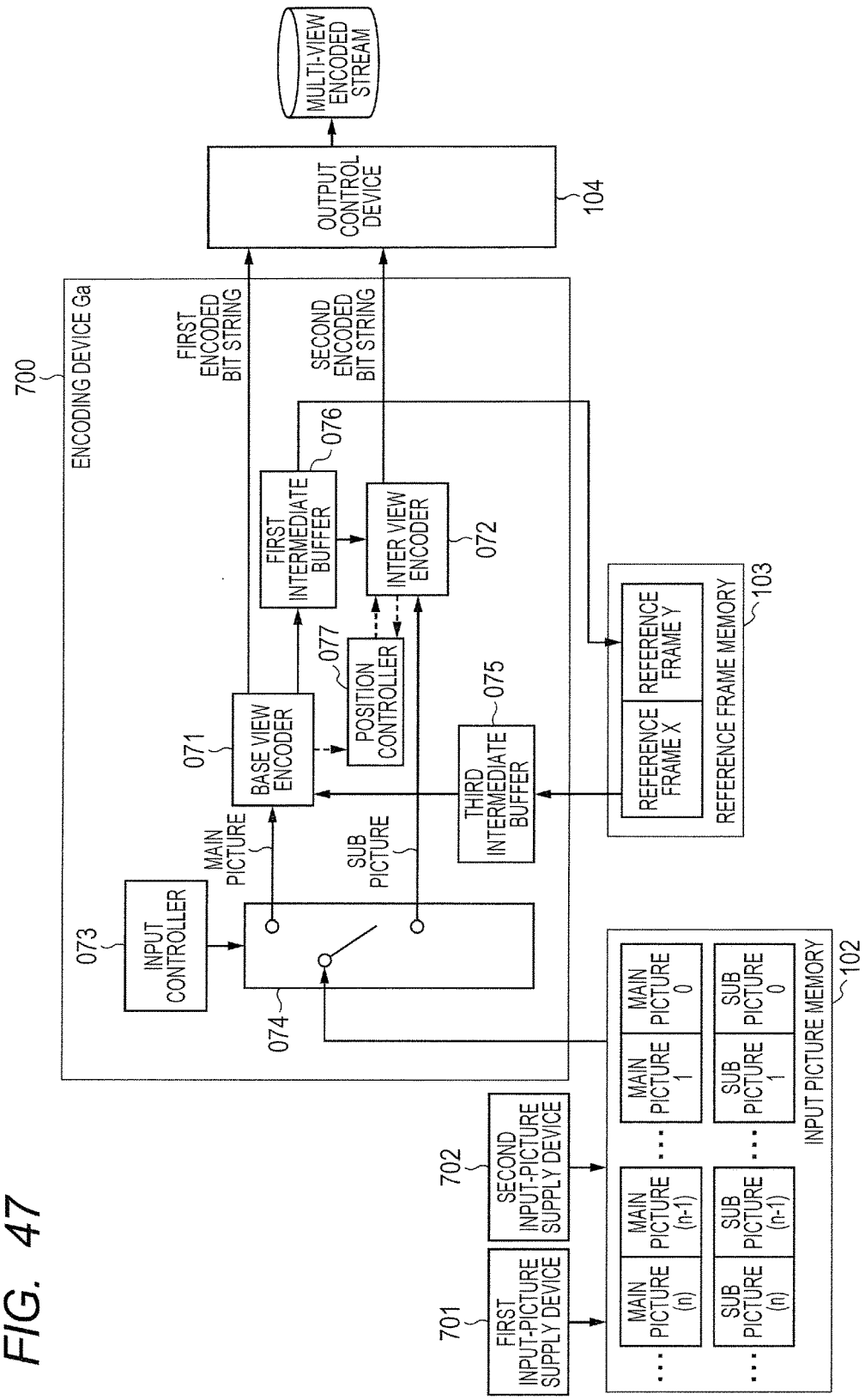
FIG. 47 is a block diagram illustrating a configuration example of the picture encoding device illustrated in FIG. 46.

FIG. 47 is a block diagram illustrating a configuration example of the encoding device Ga (700) illustrated in FIG. 46. For convenience of explanation, the first input-picture supply device 701, the second input-picture supply device 702, the input picture memory 102, the reference frame memory 103, and the output control device 104 are also illustrated in the figure. The figure illustrates a typical state where as the original pictures, main pictures 0, 1, . . . , n–1, n, . . . , and sub pictures 0, 1, . . . , n–1, n, . . . (n is an arbitrary natural number) are stored in the input picture memory 102, and the reference frames X and Y are stored in the reference frame memory 103.

The encoding device Ga (700) is comprised of a base view encoder 071, an inter-view encoder 072, an input controller 073, a switch 074, a third intermediate buffer 075, a first intermediate buffer 076, and a position controller 077. The base view encoder 071 encodes the main picture, and the inter-view encoder 072 encodes the sub picture. The input controller 073 controls the switch 074, reads the original picture from the input picture memory 102, and supplies it to the base view encoder 071 and the inter-view encoder 072. The base view encoder 071 writes a reference picture created in encoding into the reference frame memory 103 and at the same time stores it in the first intermediate buffer 076 temporarily. The third intermediate buffer 005 stores temporarily a reference picture (reference frame) suitably read from the reference frame memory 103. The inter-view encoder 072 refers to the first intermediate buffer 076, when encoding the sub picture, but does not refer to the third intermediate buffer 075, unlike with Embodiment 1.

The explanation of the present embodiment illustrates an example of two views composed of one sub picture. However, it is possible to adopt a configuration of multi views composed of two or more sub pictures. That case can be realized by adding the group of the inter-view encoder 072 and the position controller 077.

The operation of the encoding device Ga (700) is explained.

The base view encoder 071 performs the base view encoding of the ordinary multi-view coding which uses the reference frame memory 103. In that case, a local decoded MB is stored in the first intermediate buffer 076. The inter-view encoder 072 encodes the sub picture with reference to the local decoded MB of the first intermediate buffer 076.

The encoding device Ga (700) encodes in parallel every two pictures, that is, a set of a main picture and a sub picture.

In the base view encoder 071, the encoding is performed as follows.

(1) An encoding target MB of the main picture (n) is inputted into the base view encoder 071 from the input picture memory 102.

(2) A reference region X to be used for the base view encoding is inputted into the third intermediate buffer 075 from a reference frame X in the reference frame memory 103.

(3) The base view encoder 071 performs the base view encoding from the main picture (n) MB and the reference region X in the third intermediate buffer 075, and outputs a first encoded bit string to the output control device 104. Subsequently, the base view encoder 071 creates a local decoded MB and writes it in the first intermediate buffer 076.

(4) The local decoded MB stored in the first intermediate buffer 076 is written in the reference frame memory 103, in preparation to be used as a reference frame in the subsequent base view encoding.

After the above processing (1)-(4) is performed for all the MBs in the main picture (n), the base view encoding of one picture is completed. The base view encoding here can include the I/P encoding of each picture. When encoding the I picture, the base view encoder 071 does not refer to the reference region X in the third intermediate buffer 075 in the step (3).

In the inter-view encoder 072, the encoding is performed as follows.

(5) An encoding target MB of the sub picture (n) is inputted into the inter-view encoder 072 from the input picture memory 102.

(6) The inter-view encoder 072 performs the inter-view encoding by the inter-view prediction from the sub picture (n) MB and the reference region Y composed of the local decoded MB of the main picture in the first intermediate buffer 076, and outputs a second encoded bit string to the output control device 104.

After the above processing (5)-(6) is performed for all the MBs in the sub picture (n), the sub-picture encoding of one picture is completed. The inter-view encoding here performs only the encoding using the inter-view prediction which refers to the main picture or the intra picture prediction.

The processing of (1)-(4) by the base view encoder 071 and the processing of (5)-(6) by the inter-view encoder 072 are performed in parallel for one set of the main picture (n) and the sub picture (n).

Since the data of the third intermediate buffer 075 is not used by the inter-view encoder 072 and can be deleted in accordance with the processing of the base view encoder 071. The third intermediate buffer 075 may be omitted depending on the configuration of the base view encoder 071. The reference frame memory 103 may be omitted similarly. For example, when the base view encoder 071 performs only the encoding of the I picture, the third intermediate buffer and the reference frame memory are not necessary.

The position controller 077 performs synchronous control of the processing position of the base view encoder 071 and the inter-view encoder 072. The base view encoder 071 outputs "processing position", the inter-view encoder 072 outputs "processing request", and the position controller 077 notifies "waiting instruction" or "processing permission" to the inter-view encoder 072. The control system is the same as the method which is explained with reference to FIG. 11 and FIG. 12 in Embodiment 1.

In the present configuration, the inter-view encoder 072 encodes the sub picture with reference to the local decoded MB of the base view encoder 071, with the help of the first intermediate buffer 076 and the position controller 077. Accordingly, it is possible to make no access to the reference frame memory 103 at the time of the encoding of the sub picture. Therefore, the present configuration is effective in reducing the memory capacity and memory zone of the reference frame memory 103. It is also possible to perform the inter-view encoding in parallel with the base view encoding. Accordingly, the present configuration is effective in reducing the encoding delay.

A Modified Example of Embodiment 7; Application to the Multi-View Coding Method of Embodiment 4

Figure 48:
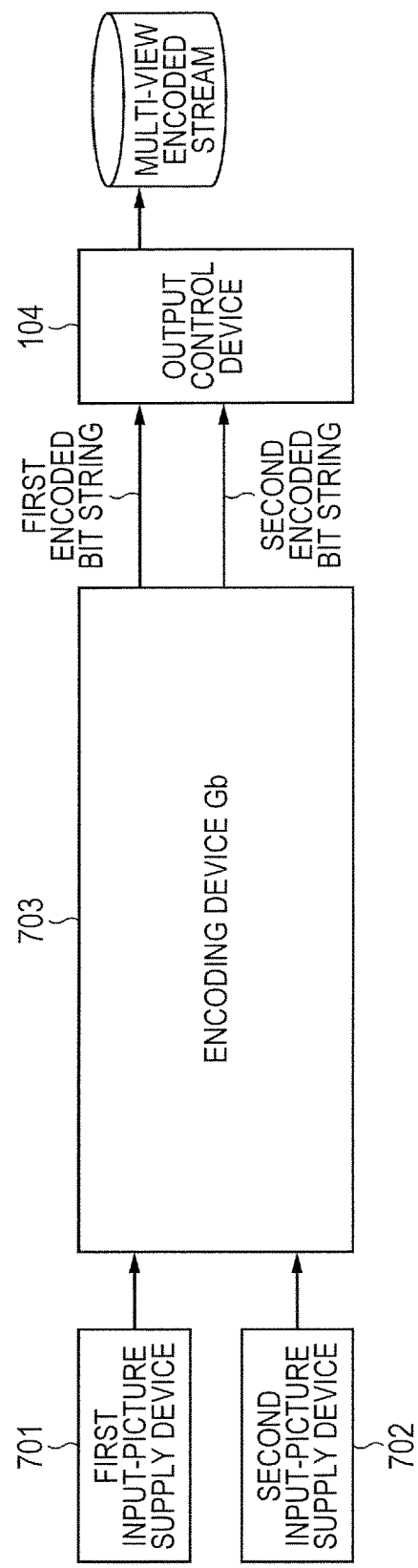
FIG. 48 is a block diagram illustrating another example of the entire configuration of the picture encoding device according to Embodiment 7.

FIG. 48 is a block diagram illustrating another example of the entire configuration of the picture encoding device according to Embodiment 7. FIG. 48 is an example of applying the configuration of Embodiment 4 to the multi-view coding method.

The entire configuration of the picture encoding device illustrated in FIG. 48 includes a first input-picture supply device 701, a second input-picture supply device 702, an encoding device Gb (703), and an output control device 104. Differing from the picture encoding device illustrated in FIG. 46, the present picture encoding device illustrated in FIG. 48 is not provided with the input picture memory 102 and the reference frame memory 103, and the original picture data as the encoding target is directly inputted into the encoding device Gb (703) from the first input-picture supply device 701 and the second input-picture supply device 702.

Figure 49:
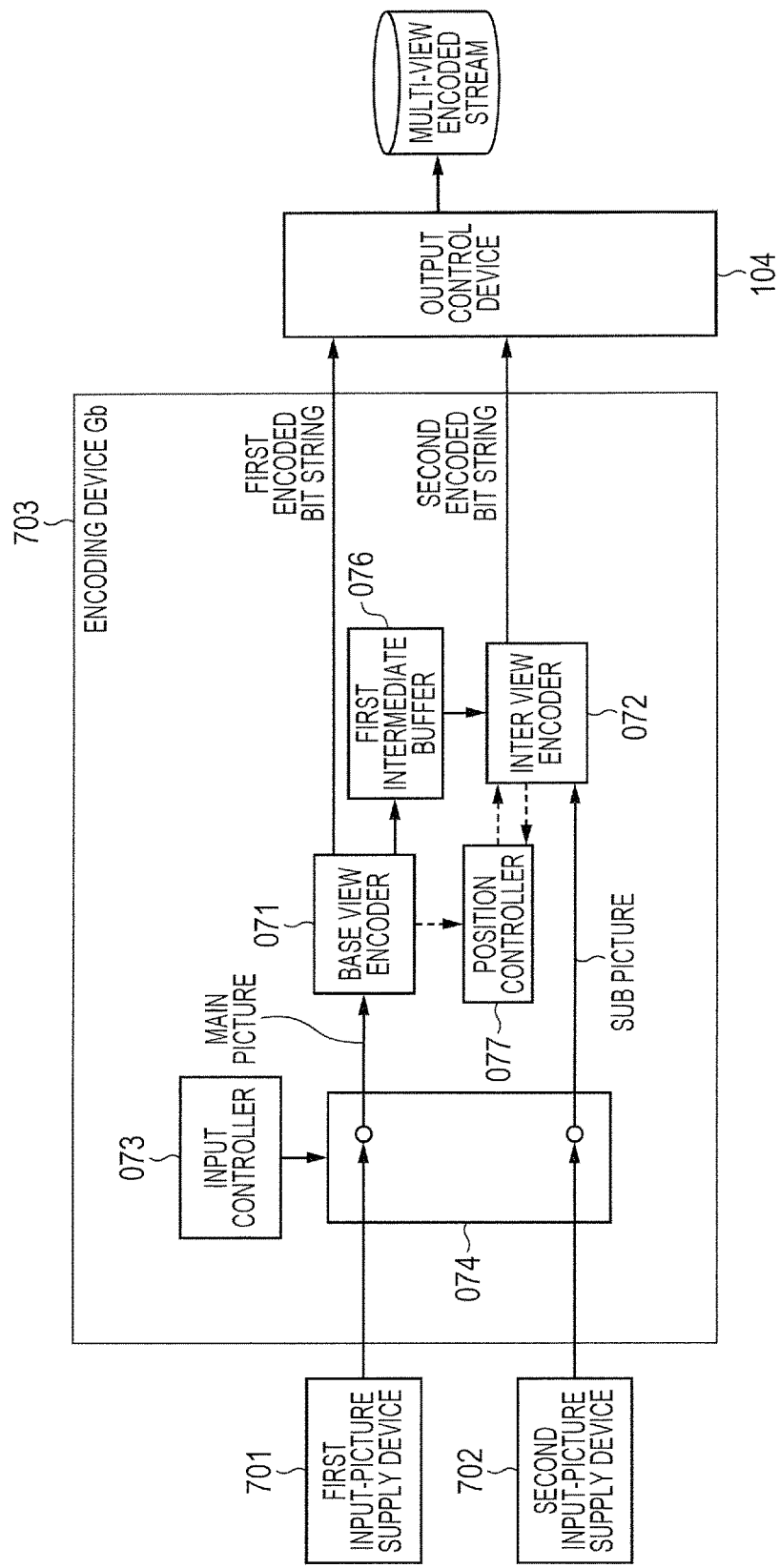
FIG. 49 is a block diagram illustrating a configuration example of the picture encoding device illustrated in FIG. 48.

FIG. 49 is a block diagram illustrating a configuration example of the encoding device Gb (703) illustrated in FIG. 48. Compared with the configuration of the encoding device Ga (700) illustrated in FIG. 47, the third intermediate buffer 075 is omitted. The switch 074 acts so that the first input-picture supply device 701 inputs the main picture into the base view encoder 071 directly and the second input-picture supply device 702 inputs the sub picture into the inter-view encoder 072 directly. The input controller 073 and the switch 074 may be simplified, or may be omitted. There is no output from the first intermediate buffer to the reference frame memory.

The configuration example illustrated in FIG. 49 is for two views with one sub picture. However, it is possible to adopt a configuration of multi views composed of two or more sub pictures. That case can be realized by adding the group of the inter-view encoder 072 and the position controller 077.

The operation of the encoding device Gb (703) is explained.

The base view encoder 071 performs the base view encoding of the multi-view coding, without using the reference frame memory 103. That is, the encoding is only the I-picture encoding which performs only the intra picture prediction. In that case, a local decoded MB is stored in the first intermediate buffer 076. The inter-view encoder 072 encodes the sub picture with reference to the local decoded MB of the first intermediate buffer 076.

The encoding device Gb (703) encodes in parallel every two pictures, that is, a set of a main picture and a sub picture.

In the base view encoder 071, the encoding is performed as follows.

(1) An encoding target MB of the main picture (n) is inputted into the base view encoder 071 from the first input-picture supply device 701.

(2) The base view encoder 071 performs the base view encoding for the main picture (n) and outputs a first encoded bit string to the output control device 104. Subsequently, the base view encoder 071 creates a local decoded MB and stores it in the first intermediate buffer 076.

After the above processing (1)-(2) is performed for all the MBs in the main picture (n), the base view encoding of one picture is completed. The base view encoding here is the encoding of the I picture.

In the inter-view encoder 072, the encoding is performed as follows.

(3) An encoding target MB of the sub picture (n) is inputted into the inter-view encoder 072 from the second input-picture supply device 702.

(4) The inter-view encoder 072 performs the inter-view encoding by the inter-view prediction from the sub picture (n) MB and the reference region Y composed of the local decoded MB of the main picture in the first intermediate buffer 076, and outputs a second encoded bit string to the output control device 104.

After the above processing (3)-(4) is performed for all the MBs in the sub picture (n), the sub-picture encoding of one picture is completed. The inter-view encoding here performs only the encoding using the inter-view prediction which refers to the main picture or the intra picture prediction.

The processing of (1)-(2) by the base view encoder 071 and the processing of (3)-(4) by the inter-view encoder 072 are performed in parallel for one set of the main picture (n) and the sub picture (n).

The position controller 077 performs synchronous control of the processing position of the base view encoder 071 and the inter-view encoder 072. The control method is the same as that of the position controller 077 in the above-described encoding device Ga (700).

As described above, in the modified example of Embodiment 7 illustrated by the encoding device Gb (703), the sub picture is encoded by the inter-view encoder 072 with reference to the local decoded MB of the base view encoder 071, with the help of the first intermediate buffer 076 and the position controller 077. The input picture memory 102 and the reference frame memory 103 are not used owing to the direct entry of the original picture from the first input-picture supply device 701 and the second input-picture supply device 702, and by restricting the base view encoder 071 to the intra picture encoding.

According to the present configuration, it is possible to omit the input picture memory 102 and the reference frame memory 103 at the time of the multi-view coding. Accordingly, the present configuration is effective in reducing the system cost.

In addition, it is possible to perform the base view encoding and the inter-view encoding in parallel. Accordingly, the present configuration is effective in reducing the encoding delay.

A Further Modified Example of Embodiment 7; the Base-View Encoding Including a B Picture The base view encoder 071 of the encoding device Ga (700) performs the encoding of the I picture and the P picture and the base view encoder 071 of the encoding device Gb (703) encodes only the I picture. However, it is possible to adopt a configuration in which the base view encoder 071 performs the encoding of the B picture in addition to the I picture and the P picture. In the present case, two pictures for the main picture and two pictures for the sub picture, four pictures in total are inputted, the portion of the base view encoder 071 is replaced with the group of the I/P encoder and the B encoder, as is the case with Embodiment 1, and the portion of the inter-view encoder 072 is replaced with the group of an encoder which refers to the output of the I/P encoder and an encoder which refers to the output of the B encoder, thereby realizing the configuration. The following explains a configuration example of the encoding device Gc (704) configured based on such technical thought.

Figure 50:
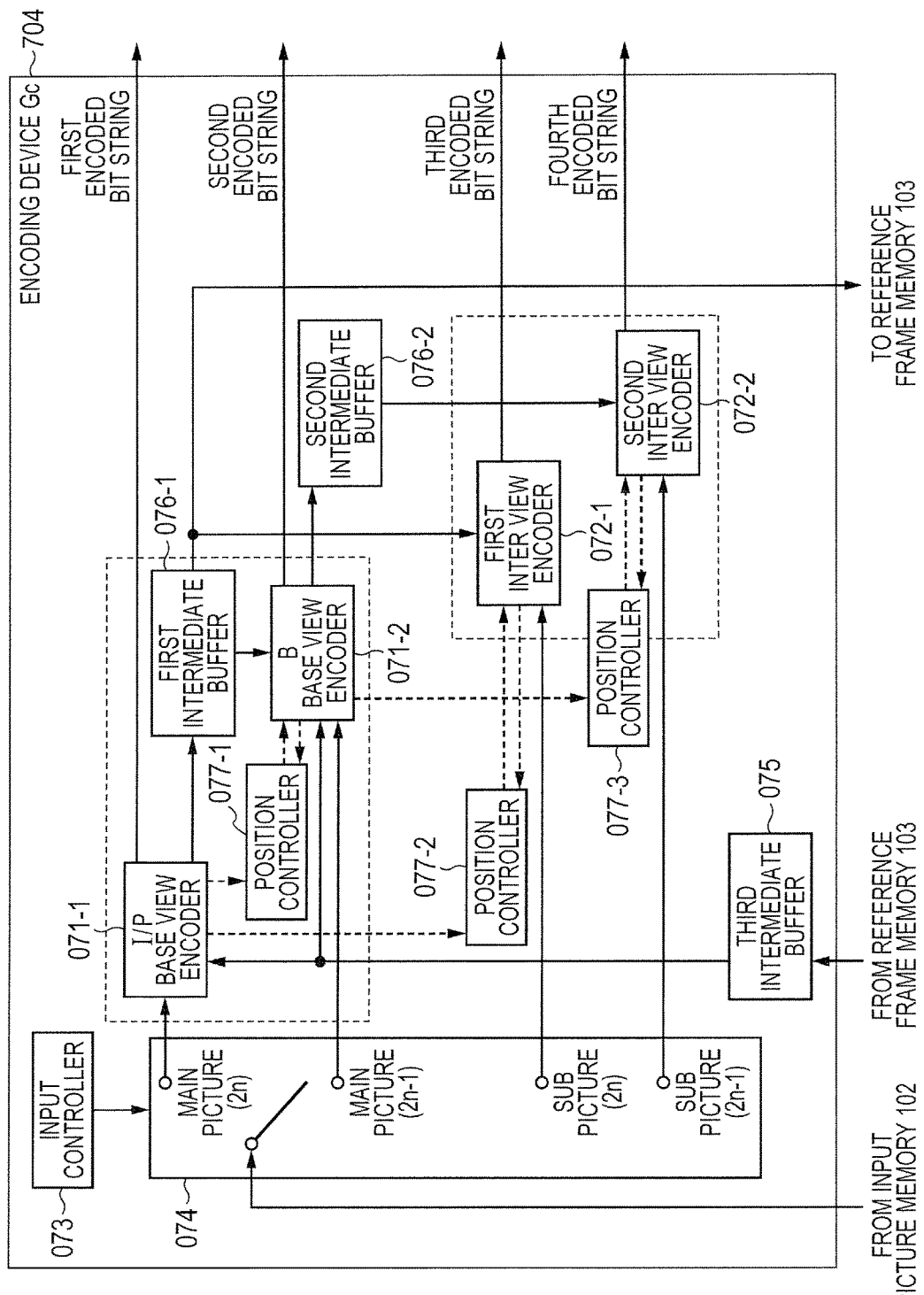
FIG. 50 is a block diagram illustrating another example of the configuration of the picture encoding device according to Embodiment 7.

FIG. 50 is a block diagram illustrating a configuration of the encoding device Gc (704).

The encoding device Gc (704) is comprised of an input controller 073, a switch 074, an I/P base view encoder 071-1, a B base view encoder 071-2, a first inter-view encoder 072-1, a second inter-view encoder 072-2, a first intermediate buffer 076-1, a second intermediate buffer 076-2, a third intermediate buffer 075, and a position controller 077-1, a position controller 077-2, and a position controller 077-3.

The input controller 073 controls the switch 074 to supply the main pictures ($2n$) and ($2n-1$) to the I/P base view encoder 071-1 and the B base view encoder 071-2, respectively, and to supply the sub pictures ($2n$) and ($2n-1$) to the first inter-view encoder 072-1 and the second inter-view encoder 072-2, respectively.

The I/P base view encoder 071-1, the B base view encoder 071-2, the first intermediate buffer 076-1, the third intermediate buffer 075, and the position controller 077-1 correspond respectively to the I/P encoder 001, the B encoder 002, the first intermediate buffer 006, the third intermediate buffer 005, and the position controller 007, of the encoding device A (100) according to Embodiment 1. The operation is the same as that of the operation of the encoding device A (100) explained in Embodiment 1. To the main picture, the encoding is performed so that one B picture may enter between I pictures or P pictures like IBPBPB, for example. The I/P base view encoder 071-1 and the B base view encoder 071-2 output a first encoded bit string and a second encoded bit string, respectively.

The local decoded picture of the main picture ($2n$) is stored at the first intermediate buffer 076-1 temporarily, referred to in the B-picture encoding of the main picture ($2n-1$), and also supplied to the first inter-view encoder 072-1. The local decoded picture of the main picture ($2n-1$) encoded by the B base view encoder 071-2 is stored in the second intermediate buffer 076-2 temporarily, and supplied to the second inter-view encoder 072-2. The first inter-view encoder 072-1 performs the encoding of the sub picture ($2n$), referring to the local decoded picture of the main picture ($2n$), and outputs a third encoded bit string. At this time, the processing request and the processing permission about the MB as the processing target are controlled by the position controller 077-2. The second inter-view encoder 072-2 performs the encoding of the sub picture ($2n-1$), referring to the local decoded picture of the main picture ($2n-1$), and outputs a fourth encoded bit string. At this time, the processing request and the processing permission about the MB as the processing target are controlled by the position controller 077-3.

Also in the multi-view coding, by the above configuration, it is possible to perform the encoding which includes the B picture in the base view; accordingly, it is possible to improve the encoding efficiency and the image quality.

The above explains the configuration example in which the base view encoding is combined with the encoding device illustrated in Embodiment 1. However, it is possible to combine with various encoding devices illustrated in Embodiments 2, 3, 4, 5, and 6. For example, if various encoding devices illustrated in Embodiments 3, 4, 5, and 6 are combined, it is possible to compose the multi-view encoding device which does not need the access to the reference frame memory, as is the cases with FIG. 45 and FIG. 49.

Embodiment 8

A Picture Decoding Device

To the various picture encoding devices illustrated in each of the above-described embodiments, it is possible to configure and provide a picture decoding device corresponding to each, based on the same technical thought.

Embodiment 8a

A Picture Decoding Device Corresponding to Embodiment 1

A configuration example of a picture decoding device corresponding to Embodiment 1 is explained. In a system mounting a decoding device, when the number of the B picture between the I/P pictures and the fact that the reference region of the B picture is restricted to a fixed range are known beforehand, the decoding device of the present embodiment can be utilized. For example, a case such as a so-called self-recording and replaying system can be considered.

Figure 51:
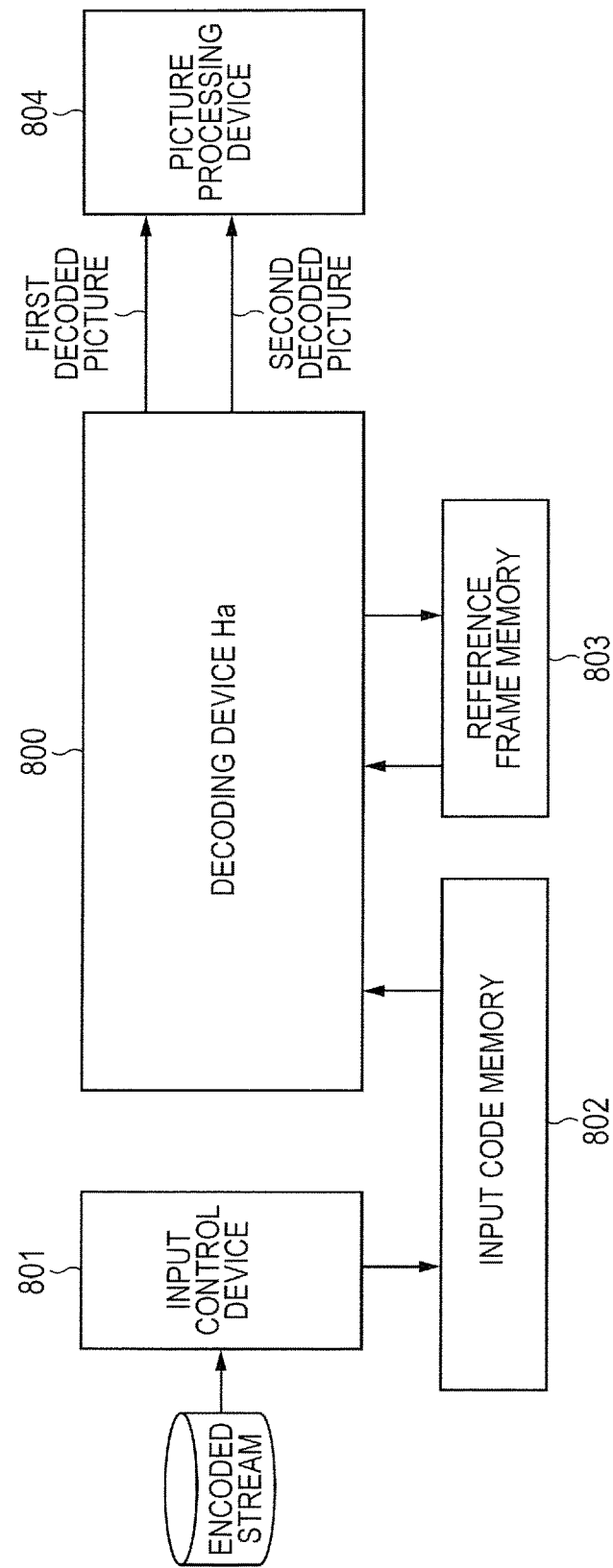

FIG. 51 is a block diagram illustrating an entire configuration example of a picture decoding device according to Embodiment 8a.

The entire configuration of the picture decoding device according to Embodiment 8a includes an input control device 801, an input code memory 802, a reference frame memory 803, a decoding device Ha (800), and a picture processing device 804. The input control device 801 writes an encoded stream inputted, for example from a transmission line such as a network, into the input code memory 802. The input code memory 802 stores the inputted encoded stream, and the reference frame memory 803 stores a reference frame. The decoding device Ha (800) reads an encoded stream from the input code memory 802, performs decoding with reference to the reference frame stored in the reference frame memory 803, and creates and outputs plural decoded pictures. The picture processing device 804 performs reconstruction processing for two or more decoded pictures which the decoding device Ha (800) outputs. The input code memory 802 and the reference frame memory 803 are assigned to an external SDRAM shared by the system, for example.

Figure 52:
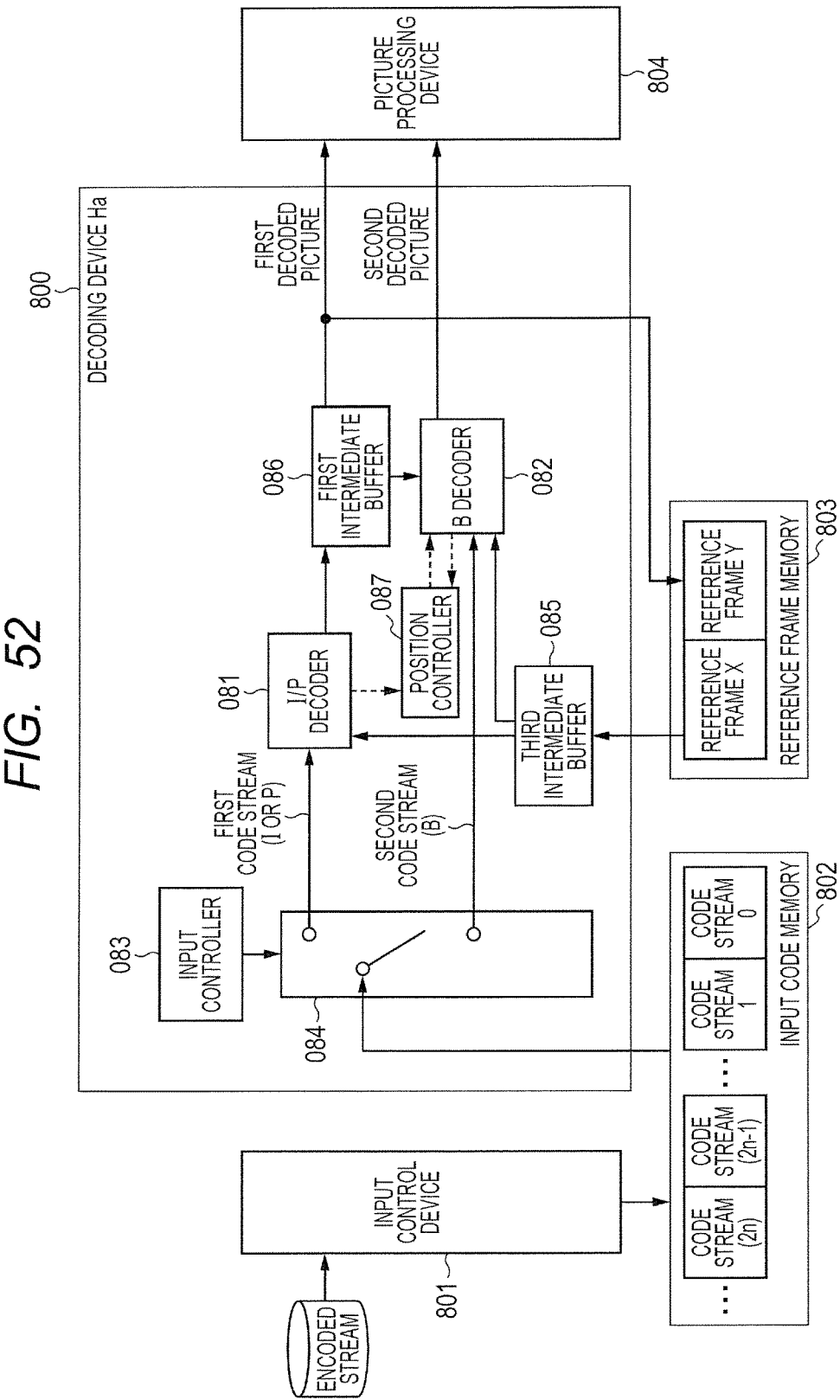

FIG. 52 is a block diagram illustrating a configuration example of the decoding device Ha (800) according to Embodiment 8a. The input control device 801, the input code memory 802, the reference frame memory 803, and the picture processing device 804 are also illustrated in the figure. The input code memory 802 and the reference frame memory 803 show schematically that the code streams 0, 1, . . . , $2n-1$, $2n$, . . . , and reference frames X and Y are stored respectively.

The decoding device Ha (800) is comprised of an I/P decoder 081, a B decoder 082, an input controller 083, a switch 084, a third intermediate buffer 085, a first intermediate buffer 086, and a position controller 087. The I/P decoder 081 decodes an I picture or a P picture, and the B decoder 082 decodes a B picture. The input controller 083 controls the switch 084 and reads a code stream from the input code memory 802 and supplies it to the I/P decoder 081 and the B decoder 082. The I/P decoder 081 decodes an I picture or a P picture, and outputs a first decoded picture to the picture processing device 804, writes a reference frame created in process of decoding in the reference frame memory 803 and at the same time stores it in the first intermediate buffer 086 temporarily. The third intermediate buffer 085 stores temporarily the reference frame suitably read from the reference frame memory 803. When the I/P decoder 081 decodes a P-picture, a reference frame stored in the third intermediate buffer 085 is referred to. The B decoder 082 refers to the reference frame stored in the first intermediate buffer 086 temporarily, and the reference frame stored in the third intermediate buffer 085, decodes the B picture, and outputs a second decoded picture to the picture processing device 804. The position controller 087 controls the processing position of the I/P decoder 081 and the B decoder 082, that is, the position of the picture as the processing target in decoding.

The I/P decoder 081 does not need to be a decoder which performs only the I-picture decoding and the P-picture decoding, but it may be replaced with an I/P/B decoder which performs decoding including the B-picture decoding. Similarly, the B decoder 082 does not need to be a decoder which performs only the B-picture decoding, but it may be replaced with an I/P/B decoder.

The number of B decoders may not be one. By mounting N-piece B decoders, it is possible to set the number of the B pictures between two P pictures (or I pictures) to N sheets. In that case, the reference region X and the reference region Y used as an input can share the first intermediate buffer 085 and the second intermediate buffer 086.

The operation of the decoding device Ha (800) is explained. In the present embodiment, it is assumed to decode the encoded stream in which one B picture enters between I pictures or P pictures, such as IBPBPB . . . .

It is assumed that the encoded stream is stored in the transmitted order in the input code memory 802. The encoded stream is a binary bit stream. There is no break of a picture; however, for convenience, it is illustrated such as a code stream 0, a code stream 1, . . . , a code stream (2n−1), a code stream (2n) for a picture.

By the input controller 083 and the switch 084, the code stream of the I picture or the P picture is inputted into the I/P decoder 081, and the code stream of the B picture is inputted into the B decoder 082, and the decoding is performed in parallel. Determination of I/P/B can be made by searching the header of a bit string which composes a code stream.

The decoding device Ha (800) decodes two pictures in parallel.

The I/P decoder 081 performs decoding as follows.

(1) A code stream of I/P is inputted into the I/P decoder 081.

(2) A reference region X necessary in order to decode a code stream is inputted into the third intermediate buffer 085 from the reference frame X in the reference frame memory 803. The necessary reference region is decided along with the decoding.

(3) The I/P decoder 081 performs the I-picture decoding or the P-picture decoding from the first code stream and the reference region X, and outputs a first decoded picture to the picture processing device 804. Subsequently, the decoded picture is stored in the first intermediate buffer 086.

(4) The decoded picture stored in the first intermediate buffer 086 is written in the reference frame Y of the reference frame memory 803, in preparation for being used as a reference frame in the subsequent decoding.

After the above processing (1)-(4) is performed for all the MBs of the first code stream, the decoding of one picture is completed. When performing the I-picture decoding, the I-picture decoding is performed by the intra picture prediction in (3). At this time, the reference region X in the first intermediate buffer 085 is not used.

In the B decoder 082, the decoding is performed as follows.

(5) A code stream of B is inputted into the B decoder 082.

(6) The B decoder 082 performs the B-picture decoding by the inter picture prediction, from the first code stream, the reference region X in the third intermediate buffer 085, and the reference region Y composed of the decoded picture in the first intermediate buffer 086, and outputs a second decoded picture to the picture processing device 804.

After the above processing (5)-(6) is performed for all the MBs of the second code stream, the decoding of one picture is completed.

The processing of (1)-(4) by the I/P decoder 081 and the processing of (5)-(6) by the B decoder 082 are performed in parallel (two-picture parallel decoding).

The position controller 087 synchronizes the processing position of the I/P decoder 081 and the B decoder 082. The I/P decoder 081 outputs "processing position", the B decoder 082 outputs "processing request", and the position controller 087 notifies "waiting instruction" or "processing permission" to the B decoder 082. The present control is the same as the method which is explained with reference to FIG. 11 and FIG. 12 in Embodiment 1. At this time, it is the requisite that the greatest range of the reference region is fixed.

As described above, the decoding device Ha (800) decodes the B picture with reference to the decoded MB of the I/P decoder 081 by the B decoder 082, with the help of the first intermediate buffer 086 and the position controller 087. According to this configuration, when the number of the B picture between the I/P pictures and the fact that the reference region of the B picture is restricted to a fixed range are known beforehand, no access to the reference frame memory 803 is necessary in the B picture decoding. Therefore, the present configuration is effective in reducing the memory capacity and memory zone of the reference frame memory 803.

Embodiment 8b

A Picture Decoding Device Corresponding to Embodiment 3

The present embodiment is application of Embodiment 2, Embodiment 3, and Embodiment 4. Here, a configuration example of the picture decoding device corresponding to Embodiment 3 is explained.

In a system mounting a decoding device, when it is known beforehand that the I picture and the P picture are alternately encoded such as IPIPIP . . . , and that the reference region of the P picture is restricted to a fixed range, the decoding device according to the present embodiment can be utilized. For example, a case such as a self-recording and replaying system which uses the encoding device C (300) according to Embodiment 3 can be considered.

Figure 53:
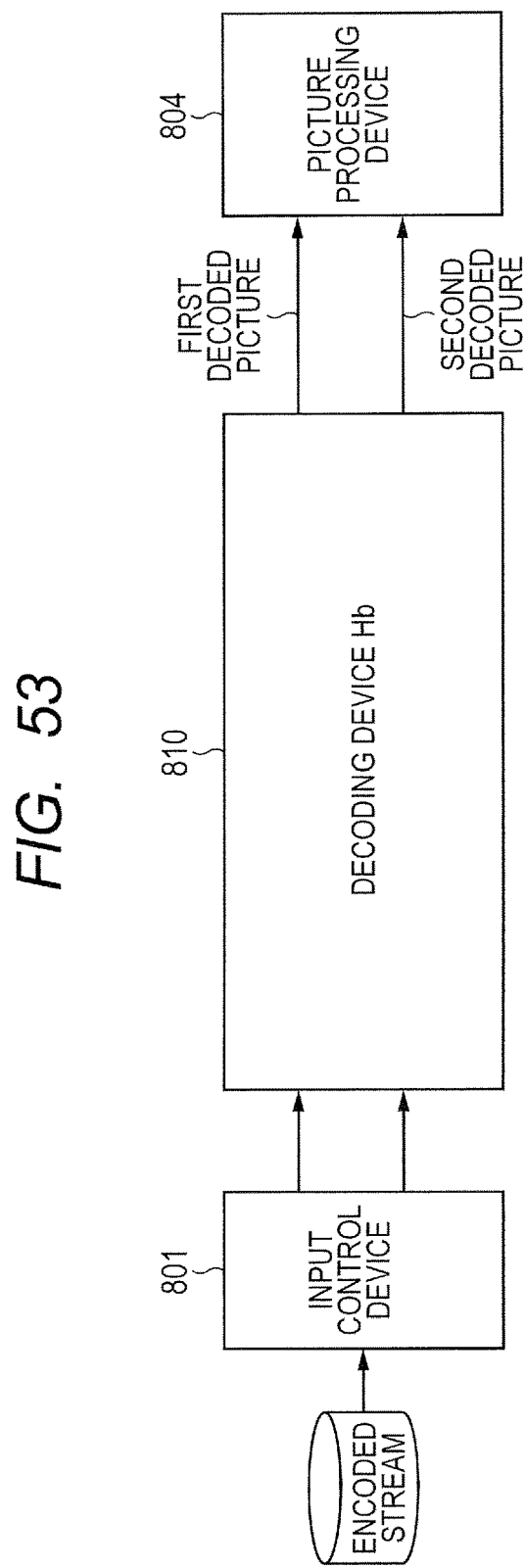
FIG. 53 is a block diagram illustrating an example of the entire configuration of a picture decoding device according to Embodiment 8b.

FIG. 53 is a block diagram illustrating an example of the entire configuration of a picture decoding device according to Embodiment 8b.

The entire configuration of the picture decoding device according to Embodiment 8b includes an input control device 801, a decoding device Hb (810), and a picture processing device 804. The input control device 801 and the picture processing device 804 are the same as described above with reference to FIG. 51; therefore, the explanation thereof is omitted. Embodiment 8b is different from Embodiment 8a in the point that the input code memory 802 and the reference frame memory 803 are not provided. A code stream is supplied directly to the decoding device Hb (810) from the input control device 801, and the decoding device Hb (810) performs decoding, without using the reference frame memory 803.

Figure 54:
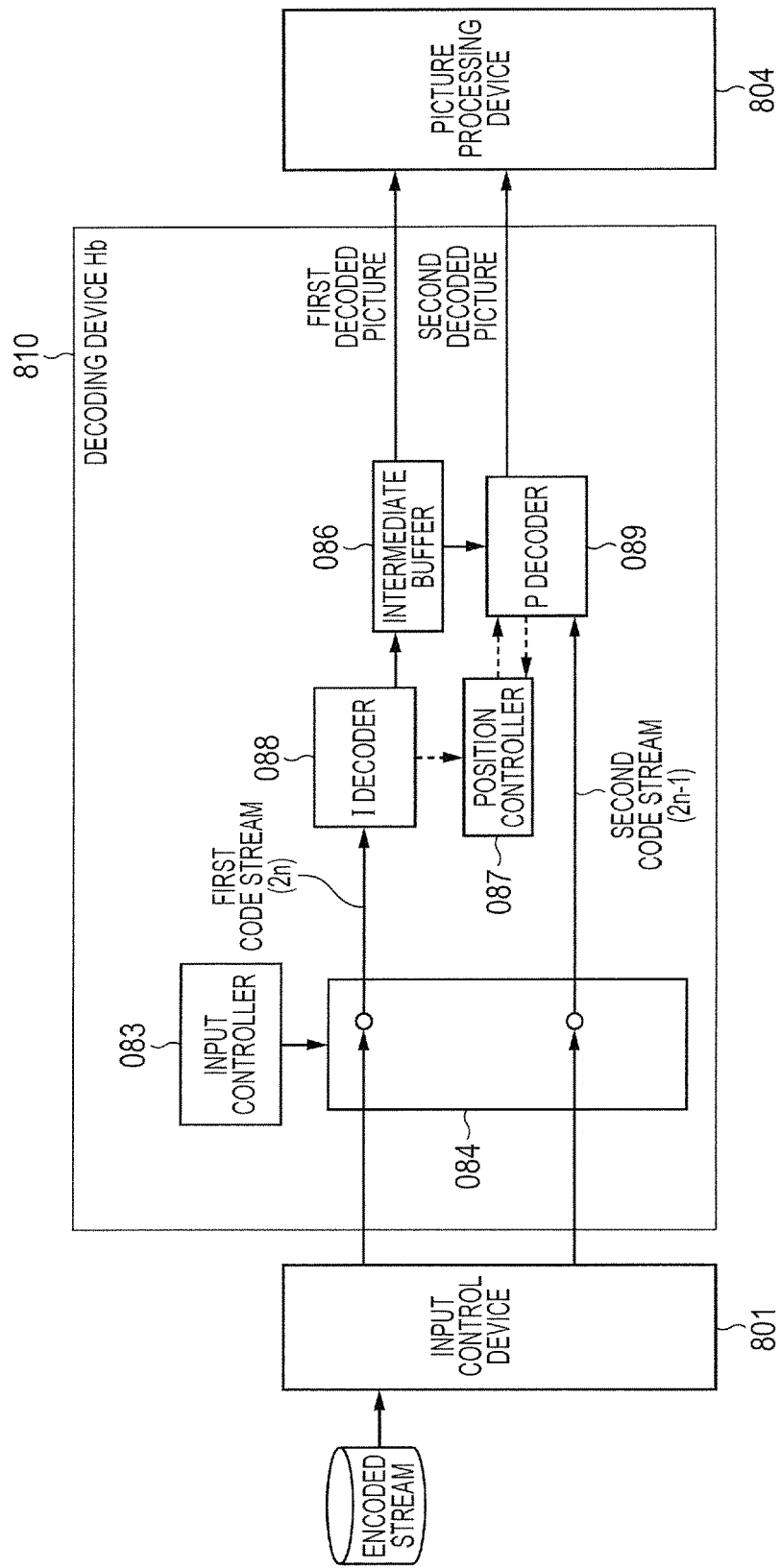
FIG. 54 is a block diagram illustrating a configuration example of a picture decoding device according to Embodiment 8b.

FIG. 54 is a block diagram illustrating a configuration example of the decoding device Hb (810) according to Embodiment 8b. The input control device 801 and the picture processing device 804 are also illustrated in the figure.

The decoding device Hb (810) is comprised of an I decoder 088, a P decoder 089, an input controller 083, a switch 084, an intermediate buffer 086, and the position controller 087. The I decoder 088 decodes an I picture, and the P decoder 089 decodes a P picture. The input controller 083 controls the switch 084 to supply directly the first code stream and the second code stream to the I decoder 088 and the P decoder 089 from the input control device 801, respectively. The I decoder 088 decodes the I picture, outputs a first decoded picture to the picture processing device 804, and stores temporarily a reference frame created in process of the decoding in the intermediate buffer 086. There is no output from the intermediate buffer 086 to the reference frame memory. The P decoder 089 decodes a P picture with reference to the reference frame stored in the intermediate buffer 086 temporarily, and outputs a second decoded picture to the picture processing device 804. The position controller 087 controls the processing position of the I decoder 088 and the P decoder 089, that is, the position of the picture of the processing target in decoding.

The explanation of the present embodiment illustrates the example in which the input control device 801 inputs the first code stream and the second code stream separately; however, it is possible to adopt a configuration in which the input controller 083 and the switch 084 separate them.

The I decoder 088 does not need to be a decoder which performs only the I-picture decoding, but it may be replaced with an I/P/B decoder or an I/P decoder. Similarly, the P decoder 089 does not need to be a decoder which performs only the P-picture decoding, but it may be replaced with an I/P/B decoder or an I/P decoder.

For example, when the encoding order is fixed such as IBPIBPIBP . . . and when it is known beforehand that the reference region of the P picture and the B picture is restricted to a fixed range (for example, a self-recording and replaying system using the encoding device B (200) according to Embodiment 2), it is possible to realize the corresponding picture decoding device, by adding a B decoder, a second intermediate buffer relevant thereto, and a second position controller.

It is similarly possible to realize the picture decoding device corresponding to the code stream of a field structure such as IPIP . . . (for example, a self-recording and replaying system using the encoding device D (400) according to Embodiment 4).

The operation of the decoding device Hb (810) is explained. In the present embodiment, it is assumed to decode an encoded stream in which an I picture and a P picture are present alternately such as IPIP . . . .

The decoding device Hb (810) decodes two pictures in parallel.

In the I decoder 088, the decoding is performed as follows.

(1) The I-picture code stream (the first code stream) is inputted into the I decoder 088.

(2) The I decoder 088 performs the I-picture decoding from the first code stream, and outputs a first decoded picture to the picture processing device 804. Subsequently, the I decoder 088 stores the decoded picture in the intermediate buffer 086.

After the above processing (1)-(2) is performed for all the MBs of the first code stream, the decoding of one picture is completed.

In the P decoder 089, the decoding is performed as follows.

(3) The P-picture code stream (the second code stream) is inputted into the P decoder 089.

(4) The P decoder 089 performs the P-picture decoding by the inter picture prediction from the second code stream and the reference region composed of the decoded picture in the intermediate buffer 086, and outputs a second decoded picture to the picture processing device 804.

After the above processing (3)-(4) is performed for all the MBs of the second code stream, the decoding of one picture is completed.

The processing of (1)-(2) by the I decoder 088 and the processing of (3)-(4) by the P decoder 089 are performed in parallel (two-picture parallel decoding).

The position controller 087 synchronizes the processing position of the I decoder 088 and the P decoder 089. The control method is the same as in Embodiment 8a. At this time, it is the requisite that the greatest range of the reference region is fixed.

As described above, the decoding device Hb (810) decodes the P picture by the P decoder 089 with reference to the decoded MB of the I decoder 088, with the help of the intermediate buffer 086 and the position controller 087. When the I picture and the P picture are encoded alternately such as IPIPIP . . . , and when it is known beforehand that the reference region of the P picture is restricted to a fixed range, no access to the reference frame memory 803 is necessary. Accordingly, the present configuration is effective in reducing the system cost.

Embodiment 8 explains the picture decoding device corresponding to the encoding device illustrated in Embodiments 1-4. However, it is possible to realize the picture decoding device corresponding to the encoding device illustrated in other embodiments, based on the same technical thought.

Embodiment 9

A Picture Communication System

A picture communication system can be configured by mounting the picture encoding device and the picture decoding device according to the embodiments described above in a transmitter, a receiver, or both.

Figure 55:
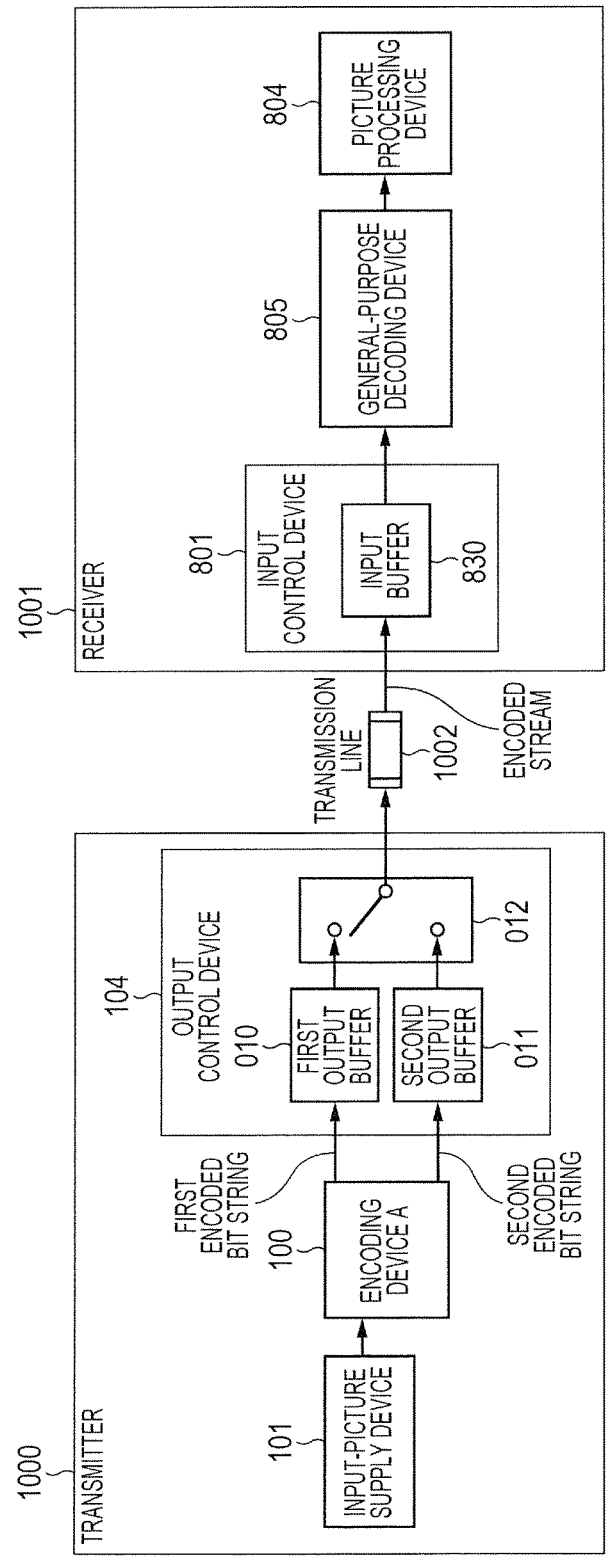
FIG. 55 is a block diagram illustrating an example of the entire configuration of a picture communication system according to Embodiment 9.

FIG. 55 is a block diagram illustrating an example of the entire configuration of a picture communication system according to Embodiment 9.

A transmitter 1000 and a receiver 1001 are coupled via a transmission line 1002. The transmitter 1000 is comprised of the input-picture supply device 101, the encoding device A (100), and the output control device 104 which are illustrated in Embodiment 1. The output control device 104 is comprised of the first output buffer 010 which once stores the first encoded bit string, the second output buffer 011 which once stores the second encoded bit string, and the switch 012 which selects the bit string to transmit. The receiver 1001 is comprised of the input control device 801 including the input buffer 830, a general-purpose decoding device 805, and the picture processing device 804.

As the encoding device in the transmitter 1000, the encoding device A (100) illustrated in Embodiment 1 is described. However, a similar system configuration is possible by adopting the encoding device B (200) according to Embodiment 2, the encoding device C (300) according to Embodiment 3, or the encoding device D (400) according to Embodiment 4. The input frame memory 102 and the reference frame memory 103 are omitted in the figure.

The transmitter 1000 buffers the first encoded bit string and the second encoded bit string respectively outputted by the encoding device A (100), and outputs them alternately in units of pictures, thereby enabling the transmission of an encoded stream which is in conformity with the coding standard. When the encoding device is the encoding device D (400) according to Embodiment 4, the output becomes an interlaced encoded stream.

In the receiver 1001, the encoded stream is once buffered by the input buffer 830 and is decoded by the general-purpose decoding device 805. The picture processing device 804 is exemplified by an image display apparatus, but any kind of an image processing device can be employed.

The transmitter 1000 according to Embodiment 9 transmits the output of the encoding device A (100), the encoding device B (200), the encoding device C (300), or the encoding device D (400), alternately in units of pictures. The present embodiment is effective in reducing the memory access on the transmitting side. Moreover, the receiving side does not require any special device, and can be comprised of existing general-purpose decoding devices which are in conformity with the coding standard.

Embodiment 10

A Picture Communication System

Figure 56:
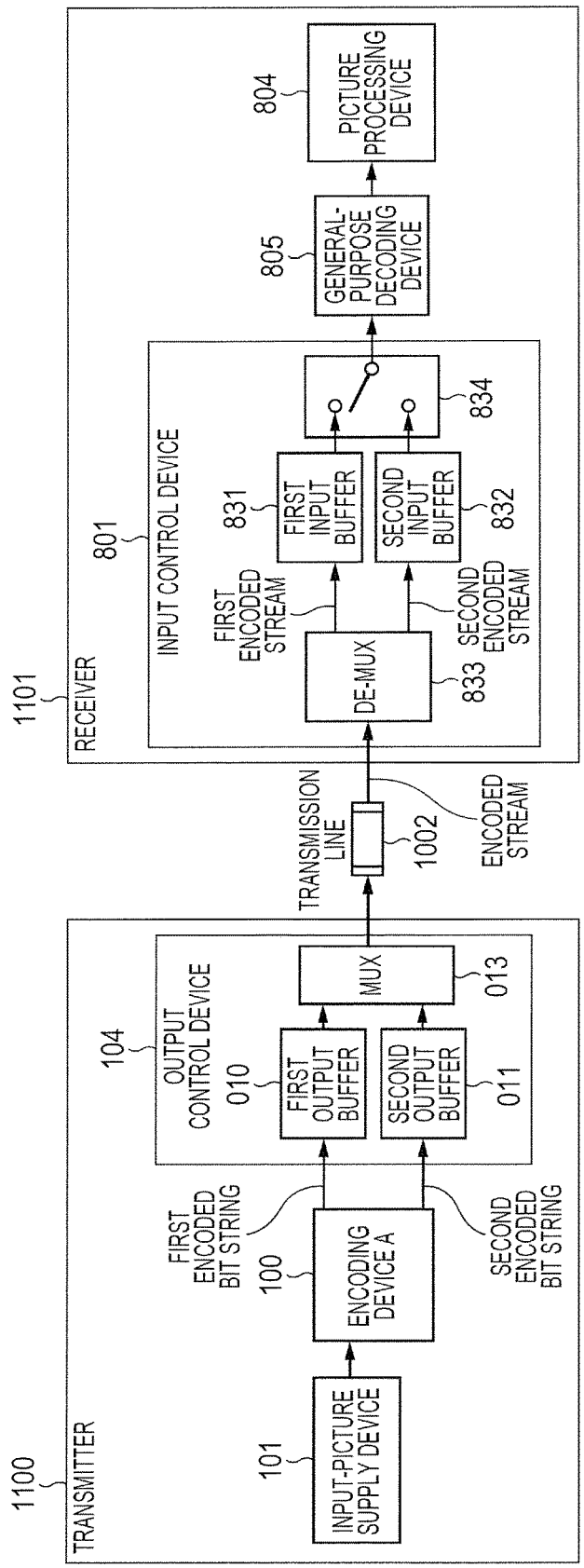
FIG. 56 is a block diagram illustrating an example of the entire configuration of a picture communication system according to Embodiment 10.

FIG. 56 is a block diagram illustrating an example of the entire configuration of a picture communication system according to Embodiment 10.

As is the case with the picture communication system illustrated in FIG. 55, a transmitter 1100 and a receiver 1101 are coupled via a transmission line 1002. The transmitter 1100 is comprised of the input-picture supply device 101, the encoding device A (100), and the output control device 104, The receiver 1101 is comprised of the input control device 801, the general-purpose decoding device 805, and the picture processing device 804. In the transmitter 1100, the output control device 104 is comprised of a multiplexer 013 in lieu of the switch 012, and in the receiver 1101, the input control device 801 is comprised of a demultiplexer 833, a first input buffer 831, a second input buffer 832, and a switch 834. What is described above is different from the picture communication system illustrated in FIG. 55.

As the encoding device in the transmitter 1100 according to Embodiment 10, the encoding device A (100) illustrated in Embodiment 1 is adopted, as is the case with Embodiment 9. However, a similar system configuration is possible by adopting the encoding device B (200) according to Embodiment 2, the encoding device C (300) according to Embodiment 3, or the encoding device D (400) according to Embodiment 4. The input frame memory 102 and the reference frame memory 103 are omitted in the figure.

The multiplexer 013 in the output control device 104 of the transmitter 1100 multiplexes the first encoded bit string and the second encoded bit string, which are outputted by the encoding device, in the finer unit in a picture, and transmits them. As the unit of multiplexing, the unit such as a slice specified by the coding standard may be employed, or a uniquely smaller unit may be employed.

A demultiplexer 833 in the input control device 801 of the receiver 1101 performs demultiplexing in the same units used by the multiplexer 013 of the transmitter 1100, and restores the first encoded bit string and the second encoded bit string. The restored first encoded bit string and second encoded bit string are selected by the switch 834 so that it may become a stream of the coding standard, and supplied to the general-purpose decoder 805.

The transmitter 1100 according to Embodiment 10 multiplexes the output of the encoding device A (100), the encoding device B (200), the encoding device C (300), or the encoding device D (400), in the finer unit in a picture, and transmits it, and the receiver 1101 reconstructs and decodes to the stream of the coding standard. The present embodiment has the following effects. That is, it is possible to reduce the capacity of the first output buffer 010 and the second output buffer 011 of the transmitter 1100; accordingly, the present configuration is effective in reducing the output delay on the transmitting side. The present configuration is also effective in easy smoothing of the bit rate.

Embodiment 11

A Picture Communication System

Figure 57:
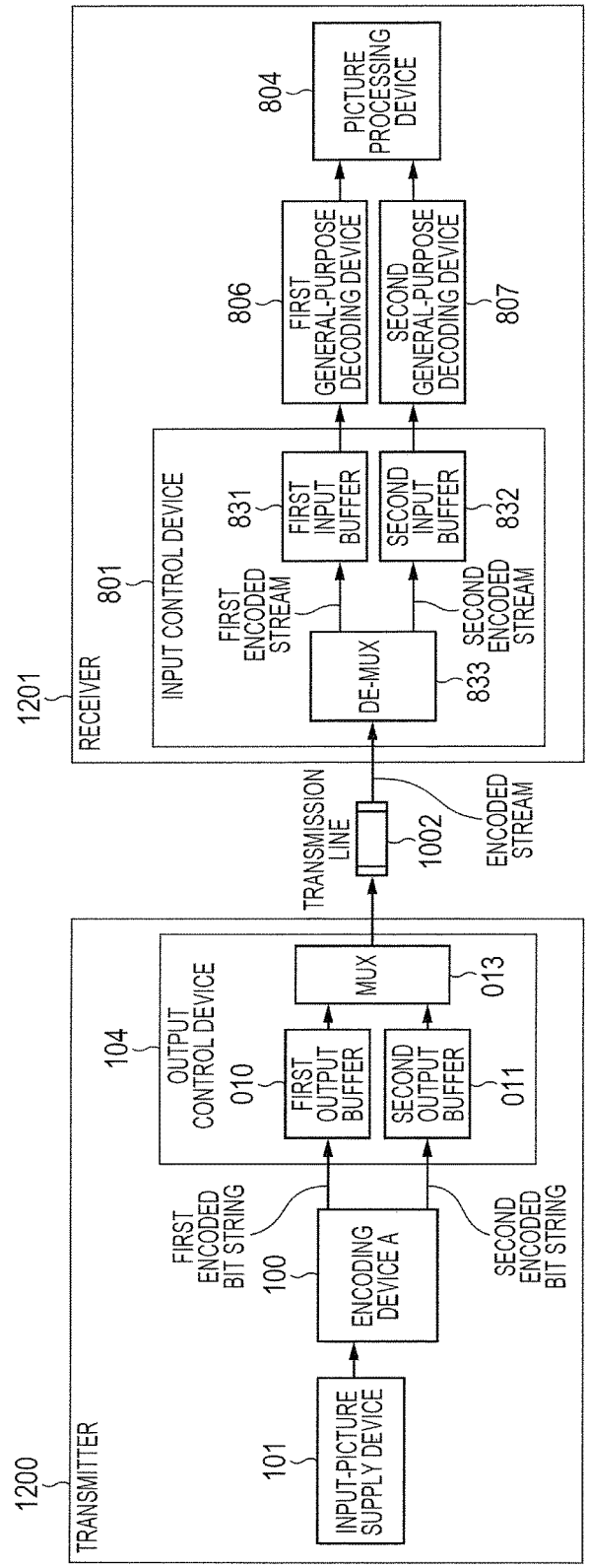
FIG. 57 is a block diagram illustrating an example of the entire configuration of a picture communication system according to Embodiment 11.

FIG. 57 is a block diagram illustrating an example of the entire configuration of a picture communication system according to Embodiment 11.

As is the case with the picture communication system according to Embodiment 10 illustrated in FIG. 56, a transmitter 1200 and a receiver 1201 are coupled via a transmission line 1002. The transmitter 1200 is comprised of the input-picture supply device 101, the encoding device A (100), and the output control device 104. Differing from the receiver 1101 in the picture communication system according to Embodiment 10, the receiver 1201 is comprised of an input control device 801 and a picture processing device 804, and in addition, a first general-purpose decoding device 806, and a second general-purpose decoding device 807. Accordingly, the switch 834 in the input control device 801 is deleted.

As the encoding device in the transmitter 1200 according to Embodiment 11, the encoding device A (100) according to Embodiment 1 is adopted as is the case with Embodiment 9 and Embodiment 10. However, a similar system configuration is possible by adopting the encoding device B (200) according to Embodiment 2, the encoding device C (300) according to Embodiment 3, or the encoding device D (400) according to Embodiment 4. The input frame memory 102 and the reference frame memory 103 are omitted in the figure.

The first general-purpose decoding device 806 of the receiver 1201 inputs and decodes the first encoded stream in the first input buffer 831. In parallel with it, the second general-purpose decoding device 807 inputs and decodes the second encoded stream in the second input buffer 832. If necessary, the picture processing device 804 reconstructs the output picture of the first general-purpose decoding device 806 and the output picture of the second general-purpose decoding device 807.

In addition to the feature of Embodiment 10, the picture communication system according to Embodiment 11 has the feature that the decoding devices of the receiving side in the receiver 1201 operate in parallel. The present embodiment is effective in reducing the code buffering amount in both the transmission and the reception. The receiver 1200 can perform processing with low delay; therefore, the present embodiment is effective in realizing the configuration suitable for a system which demands low delay performance.

Embodiment 12

A Picture Communication System

Figure 58:
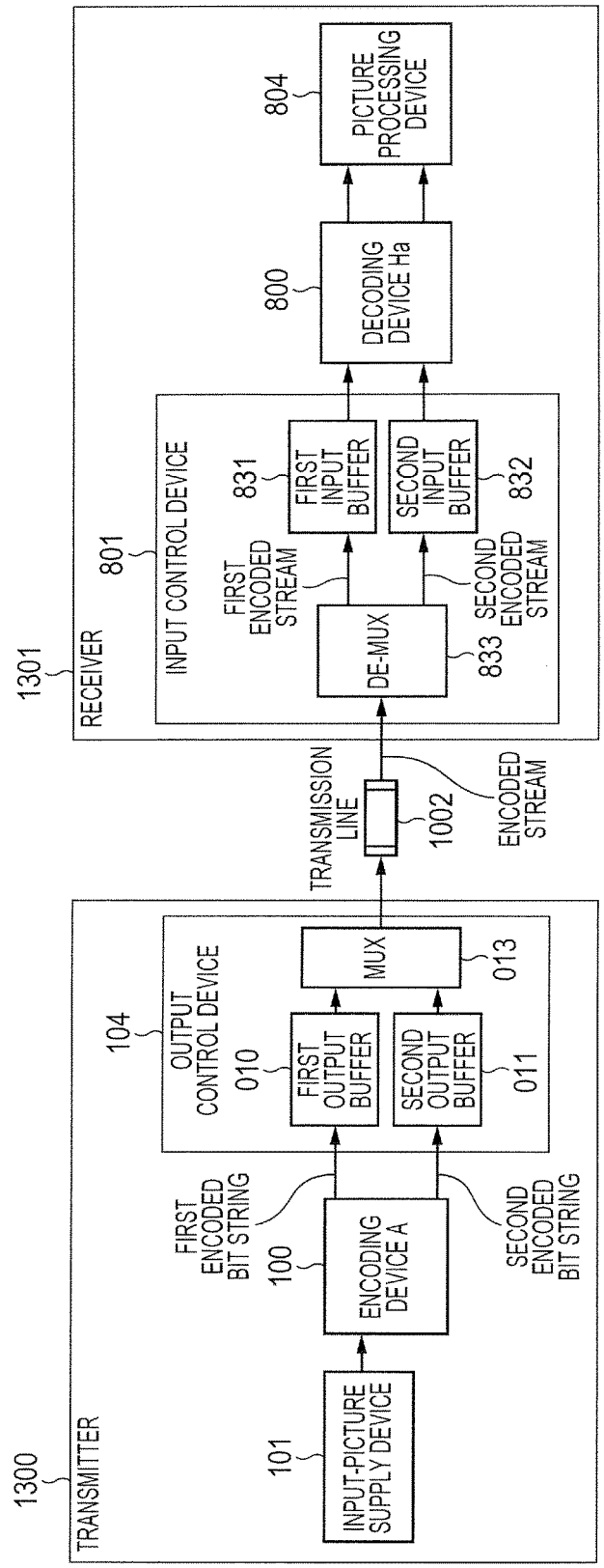
FIG. 58 is a block diagram illustrating an example of the entire configuration of a picture communication system according to Embodiment 12.

FIG. 58 is a block diagram illustrating an example of the entire configuration of a picture communication system according to Embodiment 12.

As is the case with the picture communication system according to Embodiment 11 illustrated in FIG. 57, a transmitter 1300 and a receiver 1301 are coupled via a transmission line 1002. The transmitter 1300 is comprised of the input-picture supply device 101, the encoding device A (100), and the output control device 104. The receiver 1301 is comprised of an input control device 801 and a picture processing device 804. Differing from the receiver 1201 in the picture communication system according to Embodiment 11, the receiver 1301 is further comprised of the decoding device Ha (800) according to Embodiment 8 in lieu of the first general-purpose decoding device 806 and the second general-purpose decoding device 807. At this time, it is a premise that the number of sheets of the B picture and the specification of the B picture reference region restrictions are decided identically beforehand, in the encoding device A (100) and the decoding device Ha (800)

A group of the encoding device A (100) and the decoding device Ha (800) can be replaced with a group of the encoding device C (300) according to Embodiment 3 and the decoding device Hb (810) according to Embodiment 8b, or a group of the encoding device D (400) according to Embodiment 4 and the decoding device Hb (810) according to Embodiment 8b. It is a premise also in these cases that the specification of the P picture reference region restrictions of the encoding device is decided beforehand.

The decoding device Ha (800) of the receiver 1301 decodes the first encoded stream and the second encoded stream according to the number of the B picture and the specification of B picture reference region restrictions decided beforehand.

The picture communication system according to Embodiment 12 is a system in which the receiving side knows the coding restrictions of the transmitting side beforehand, and the encoding device and the decoding device according to the present application are arranged on both the transmitting side and the receiving side. According to the present embodiment, there are following effects. It is possible to reduce the zone of the external memory and the capacity of the external memory, in the decoding device on the receiving side, as well as in the encoding device on the transmitting side.

In the case of the group of the encoding device A (100) and the decoding device Ha (800), no memory access in the B-picture encoding and the B-picture decoding is necessary.

In the case of the group of the encoding device C (300) and the decoding device Hb (810), no external memory access is necessary on the receiving side. It is also possible to reduce the system cost further.

In the case of the group of the encoding device D (400) and the decoding device Hb (810), no external memory access is necessary in all the transmission and the reception. It is also possible to reduce the system cost further.

As described above, the invention accomplished by the present inventors has been concretely explained based on the embodiments. However, it cannot be overemphasized that the present invention is not restricted to the embodiments as described above, and it can be changed variously in the range which does not deviate from the gist.

For example, the encoding device, the decoding device, other devices, the controller may be realized, for example by the dedicated hardware over a semiconductor integrated circuit, or they may be realized as a part of the function of the software operating on a processor.

What is claimed is:

1. A picture encoding device operable to encode a plurality of time-series pictures, the picture encoding device comprising:
    a first encoder;
    a second encoder which performs in parallel with the first encoder;
    an intermediate buffer; and
    an encoding target picture controller, and
    a field divider which divides a picture into a first field which includes an I picture and comprises even-numbered pixel lines, and a second field which includes a P picture and comprises odd-numbered pixel lines,
    wherein the first encoder uses picture information in a picture of an encoding target to encode the picture information of the first field of the picture concerned, creates a reference picture from an encoding result, and writes the reference picture in the intermediate buffer,
    wherein the second encoder refers to picture information in a picture of an encoding target and the reference picture stored in the intermediate buffer to encode the picture information of the second field of the picture concerned,
    wherein the encoding target picture controller makes the second encoder start encoding the picture with reference to the reference picture concerned, before a following reference picture is written in the intermediate buffer by the first encoder, and
    wherein the second encoder is coupled to the field divider in parallel with the first encoder.

2. The picture encoding device according to claim 1, wherein the encoding target picture controller supplies the first field and the second field to the first encoder and the second encoder, respectively,
    wherein the first encoder uses picture information in a field of an encoding target to encode the picture information of the picture concerned, creates a reference picture from the encoding result, and writes the reference picture in the intermediate buffer, and
    wherein the second encoder refers to picture information in a field of an encoding target and the reference picture stored in the intermediate buffer to encode the picture information of the field concerned.

3. The picture encoding device according to claim 1, wherein each of the time-series pictures includes a frame comprising a plurality of pixel lines, and the frame includes a plurality of macroblocks and comprises a first field comprised only of even-numbered pixel lines included in two macroblocks which adjoin mutually in an orthogonal direction to a pixel line among the macroblocks and a second field comprised only of odd-numbered pixel lines included in the two macroblocks concerned, wherein the encoding target picture controller supplies one of the first field and the second field to the first encoder and the other to the second encoder, wherein the first encoder refers to picture information in a field of an encoding target to encode the picture information of the picture concerned, creates a reference picture from the encoding result, and writes the reference picture in the intermediate buffer, and wherein the second encoder refers to picture information in a field of an encoding target and the reference picture stored in the intermediate buffer to encode the picture information of the field concerned.

4. The picture encoding device according to claim 3, wherein the encoding target picture controller supplies selectively one of the first field and the second field to the first encoder and an other one to the second encoder, by making the selection for every two macroblocks concerned.

5. The picture encoding device according to claim 1, wherein the first field includes pixel lines only of the even-numbered pixel lines.

6. The picture encoding device according to claim 5, wherein the second field includes pixel lines only of the odd-numbered pixel lines.

7. A picture encoding device operable to encode a plurality of time-series pictures, the picture encoding device comprising:

a first encoder;

a second encoder which performs in parallel with the first encoder;

an intermediate buffer;

an encoding target picture controller; and a field divider which divides a picture into a first field which includes an I picture and comprises an even-numbered column picture which comprises even-numbered pixels of each pixel lines, and a second field which includes a P picture and comprises an odd-numbered column picture which comprises odd-numbered pixels of each pixel lines, wherein the encoding target picture controller supplies one of the first column picture and the second column picture to the first encoder and the other to the second encoder, wherein the first encoder refers to picture information in the first field to encode the first field creates a reference picture from an encoding result, and writes the reference picture in the intermediate buffer, wherein the second encoder refers to picture information in the second field and the reference picture stored in the intermediate buffer to encode the second field, and wherein the second encoder is coupled to the field divider in parallel with the first encoder.

8. The picture encoding device according to claim 7, wherein the encoding target picture controller supplies selectively one of the first column picture and the second column picture and an other one to the second encoder, by making the selection for every two macroblocks concerned.

9. A picture decoding device operable to decode a plurality of time-series pictures from a first and a second encoded stream supplied from a first encoder and a second encoder, respectively, the picture decoding device comprising:

a first decoder;

a second decoder which performs in parallel with the first decoder;

an intermediate buffer; and a decoding target image controller, wherein the first decoder refers only to the first encoded stream to decode picture information of a corresponding picture, creates a reference picture from a decoding result, and writes the reference picture to the intermediate buffer, wherein the second decoder refers to the second encoded stream and the reference picture stored in the intermediate buffer to decode picture information of a picture corresponding to the second encoded stream, wherein the decoding target image controller makes the second decoder start decoding a picture with reference to the reference picture concerned, before a following reference picture is written in the intermediate buffer from the first decoder, wherein the first encoded stream comprises even-numbered pixel lines of a picture including an I picture, wherein the second encoded stream comprises odd-numbered pixel lines of a picture including a P picture, and wherein the second encoder is coupled to a field divider in parallel with the first encoder, the field divider dividing a picture into the picture including the I picture and the picture including the P picture.

10. A picture communication system, comprising:

a transmitter including a picture encoding device and an output control device;

a transmission line; and a receiver including a picture decoding device, wherein the picture encoding device is operable to encode a plurality of time-series pictures, and comprises:

a first encoder;

a second encoder which performs in parallel with the first encoder;

an intermediate buffer;

an encoding target picture controller; and a field divider which divides a picture into a first field which includes an I picture and comprises even-numbered pixel lines, and a second field which includes a P picture and comprises odd-numbered pixel line, wherein the first encoder refers to picture information in a picture of an encoding target to encode the picture information of the first field of the picture concerned, outputs a first encoded bit string, creates a reference picture from the encoding result, and writes the reference picture in the intermediate buffer, wherein the second encoder refers to picture information in a picture of an encoding target and the reference picture stored in the intermediate buffer, to encode the picture information of the second field of the picture concerned and outputs a second encoded bit string, wherein the encoding target picture controller makes the second encoder start encoding a picture with reference to the reference picture concerned, before a following reference picture is written in the intermediate buffer by the first encoder, wherein the output control device applies time-division multiplexing to the first encoded bit string and the second encoded bit string, and sends them out to the transmission line as an encoded stream, wherein the receiver supplies the encoded stream inputted from the transmission line to the picture decoding device, and makes the picture decoding device decode the encoded stream, and wherein the second encoder is coupled to the field divider in parallel with the first encoder.

11. The picture communication system according to claim 10, wherein the output control device applies time-division multiplexing to the first encoded bit string and the second encoded bit string in a unit finer than a picture, and sends them out to the transmission line as an encoded stream, wherein the receiver further comprises an input control device, and wherein the input control device applies demultiplexing to the encoded stream inputted from the transmission line, divides the encoded stream into a first encoded bit stream corresponding to the first encoded bit string, and a second encoded bit stream corresponding to the second encoded bit string, and supplies the first encoded bit stream and the second encoded bit stream to the picture decoding device.

12. The picture communication system according to claim 10, wherein the first field includes pixel lines only of the even-numbered pixel lines.

13. The picture communication system according to claim 12, wherein the second field includes pixel lines only of the odd-numbered pixel lines.

* * * * *